US012088425B2

(12) United States Patent
Cohn et al.

(10) Patent No.: US 12,088,425 B2
(45) Date of Patent: *Sep. 10, 2024

(54) BIDIRECTIONAL SECURITY SENSOR COMMUNICATION FOR A PREMISES SECURITY SYSTEM

(71) Applicant: iControl Networks, Inc., Philadelphia, PA (US)

(72) Inventors: Alan Wade Cohn, Austin, TX (US); Lewis Clay Dearman, Taylor, TX (US); James Edward Kitchen, Round Rock, TX (US)

(73) Assignee: iControl Networks, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,803

(22) Filed: Jul. 14, 2023

(65) Prior Publication Data

US 2023/0362029 A1 Nov. 9, 2023

Related U.S. Application Data

(63) Continuation of application No. 12/970,313, filed on Dec. 16, 2010, now Pat. No. 11,750,414.

(51) Int. Cl.
*H04L 12/28* (2006.01)
(52) U.S. Cl.
CPC .. *H04L 12/2827* (2013.01); *H04L 2012/2841* (2013.01)

(58) Field of Classification Search
CPC ...... G08B 25/008; G08B 25/14; G08B 25/10; G08B 13/08; G08B 25/009; G08B 25/004; H04L 12/2825; H04L 12/2834; H04L 67/125
See application file for complete search history.

(56) References Cited

U.S. PATENT DOCUMENTS

| 686,838 A | 11/1901 | Richard |
| 1,738,540 A | 12/1929 | Replogle et al. |
| 3,803,576 A | 4/1974 | Dobrzanski et al. |
| 3,852,541 A | 12/1974 | Altenberger |

(Continued)

FOREIGN PATENT DOCUMENTS

| AU | 2005223267 B2 | 12/2010 |
| AU | 2010297957 A1 | 5/2012 |

(Continued)

OTHER PUBLICATIONS

US Patent Application filed Sep. 22, 2023, entitled "Automation System User Interface", U.S. Appl. No. 18/472,477.

(Continued)

*Primary Examiner* — James J Yang
(74) *Attorney, Agent, or Firm* — BakerHostetler

(57) ABSTRACT

A security system architecture including bidirectional communication between a sensor control device and one or more sensor devices coupled to the controller is provided. Such functionality is provided by virtue of a bidirectional wireless transceiver and processor in each sensor device. Embodiments of the present invention further provide this functionality by virtue of a coordinating transceiver coupled to the security system controller for communication with the sensor devices.

36 Claims, 12 Drawing Sheets

(56) References Cited

U.S. PATENT DOCUMENTS

| | | |
|---|---|---|
| 4,006,460 A | 2/1977 | Jewitt et al. |
| 4,141,006 A | 2/1979 | Braxton |
| 4,206,449 A | 6/1980 | Apsell et al. |
| 4,257,038 A | 3/1981 | Rounds et al. |
| 4,286,331 A | 8/1981 | Anderson et al. |
| 4,304,970 A | 12/1981 | Fahey et al. |
| 4,351,023 A | 9/1982 | Richer |
| 4,363,031 A | 12/1982 | Reinowitz |
| 4,459,582 A | 7/1984 | Sheahan et al. |
| 4,520,503 A | 5/1985 | Kirst et al. |
| 4,559,526 A | 12/1985 | Tani et al. |
| 4,559,527 A | 12/1985 | Kirby |
| 4,567,557 A | 1/1986 | Burns |
| 4,574,305 A | 3/1986 | Campbell et al. |
| 4,581,606 A | 4/1986 | Mallory |
| 4,591,834 A | 5/1986 | Kyle |
| D284,084 S | 6/1986 | Ferrara, Jr. |
| 4,641,127 A | 2/1987 | Hogan et al. |
| 4,652,859 A | 3/1987 | Van Wienen |
| 4,670,739 A | 6/1987 | Kelly, Jr. |
| 4,683,460 A | 7/1987 | Nakatsugawa |
| 4,694,282 A | 9/1987 | Tamura et al. |
| 4,716,973 A | 1/1988 | Cobern |
| 4,730,184 A | 3/1988 | Bach |
| 4,754,261 A | 6/1988 | Marino |
| 4,755,792 A | 7/1988 | Pezzolo et al. |
| 4,779,007 A | 10/1988 | Schlanger et al. |
| 4,785,289 A | 11/1988 | Chen |
| 4,801,924 A | 1/1989 | Burgmann et al. |
| 4,812,820 A | 3/1989 | Chatwin |
| 4,818,970 A | 4/1989 | Natale et al. |
| 4,833,339 A | 5/1989 | Luchaco et al. |
| 4,833,449 A | 5/1989 | Gaffigan |
| 4,855,713 A | 8/1989 | Brunius |
| 4,860,185 A | 8/1989 | Brewer et al. |
| 4,887,064 A | 12/1989 | Drori et al. |
| 4,897,630 A | 1/1990 | Nykerk |
| 4,918,623 A | 4/1990 | Lockitt et al. |
| 4,918,717 A | 4/1990 | Bissonnette et al. |
| 4,951,029 A | 8/1990 | Severson |
| 4,959,713 A | 9/1990 | Morotomi et al. |
| 4,962,473 A | 10/1990 | Crain |
| 4,980,666 A | 12/1990 | Hwang |
| 4,993,059 A | 2/1991 | Smith et al. |
| 4,994,787 A | 2/1991 | Kratt et al. |
| 4,996,646 A | 2/1991 | Farrington |
| 5,023,901 A | 6/1991 | Sloan et al. |
| 5,083,106 A | 1/1992 | Kostusiak et al. |
| 5,086,385 A | 2/1992 | Launey et al. |
| 5,091,780 A | 2/1992 | Pomerleau |
| 5,109,278 A | 4/1992 | Erickson et al. |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| 5,164,703 A | 11/1992 | Rickman |
| 5,164,979 A | 11/1992 | Choi |
| D337,569 S | 7/1993 | Kando |
| 5,227,776 A | 7/1993 | Starefoss |
| 5,237,305 A | 8/1993 | Ishikuro et al. |
| 5,245,694 A | 9/1993 | Zwern |
| 5,247,232 A | 9/1993 | Lin |
| 5,280,527 A | 1/1994 | Gullman et al. |
| 5,283,816 A | 2/1994 | Gomez Diaz |
| 5,299,971 A | 4/1994 | Hart |
| 5,319,394 A | 6/1994 | Dukek |
| 5,319,698 A | 6/1994 | Glidewell et al. |
| 5,334,974 A | 8/1994 | Simms et al. |
| 5,400,011 A | 3/1995 | Sutton |
| 5,400,246 A | 3/1995 | Wilson et al. |
| 5,406,260 A | 4/1995 | Cummings et al. |
| 5,410,343 A | 4/1995 | Coddington et al. |
| 5,412,708 A | 5/1995 | Katz |
| 5,414,409 A | 5/1995 | Voosen et al. |
| 5,414,833 A | 5/1995 | Hershey et al. |
| 5,428,293 A | 6/1995 | Sinclair et al. |
| 5,438,607 A | 8/1995 | Przygoda et al. |
| 5,446,445 A | 8/1995 | Bloomfield et al. |
| 5,448,290 A | 9/1995 | Vanzeeland |
| 5,452,344 A | 9/1995 | Larson |
| 5,465,081 A | 11/1995 | Todd |
| 5,471,194 A | 11/1995 | Guscott |
| 5,481,312 A | 1/1996 | Cash et al. |
| 5,483,224 A | 1/1996 | Rankin et al. |
| 5,486,812 A | 1/1996 | Todd |
| 5,499,014 A | 3/1996 | Greenwaldt |
| 5,499,196 A | 3/1996 | Pacheco |
| 5,510,975 A | 4/1996 | Ziegler, Jr. |
| 5,519,878 A | 5/1996 | Dolin, Jr. |
| RE35,268 E | 6/1996 | Frolov et al. |
| 5,525,966 A | 6/1996 | Parish |
| 5,526,428 A | 6/1996 | Arnold |
| 5,534,845 A | 7/1996 | Issa et al. |
| 5,541,585 A | 7/1996 | Duhame et al. |
| 5,543,778 A | 8/1996 | Stouffer |
| 5,546,072 A | 8/1996 | Creuseremee et al. |
| 5,546,074 A | 8/1996 | Bernal et al. |
| 5,546,447 A | 8/1996 | Skarbo et al. |
| 5,548,646 A | 8/1996 | Aziz et al. |
| 5,550,984 A | 8/1996 | Gelb |
| 5,557,254 A | 9/1996 | Johnson et al. |
| 5,565,843 A | 10/1996 | Meyvis |
| 5,570,079 A | 10/1996 | Dockery |
| 5,572,438 A | 11/1996 | Ehlers et al. |
| 5,578,989 A | 11/1996 | Pedtke |
| 5,579,197 A | 11/1996 | Mengelt et al. |
| 5,579,221 A | 11/1996 | Mun |
| D377,034 S | 12/1996 | Matsushita |
| 5,586,254 A | 12/1996 | Kondo et al. |
| 5,587,705 A | 12/1996 | Morris |
| 5,598,086 A | 1/1997 | Somerville |
| 5,602,918 A | 2/1997 | Chen et al. |
| 5,604,493 A | 2/1997 | Behlke |
| 5,606,615 A | 2/1997 | Lapointe et al. |
| 5,621,662 A | 4/1997 | Humphries et al. |
| 5,623,601 A | 4/1997 | Vu |
| 5,625,338 A | 4/1997 | Pildner et al. |
| 5,625,410 A | 4/1997 | Washino et al. |
| 5,629,687 A | 5/1997 | Sutton et al. |
| 5,630,216 A | 5/1997 | Mcewan |
| 5,631,630 A | 5/1997 | McSweeney |
| 5,638,046 A | 6/1997 | Malinowski |
| 5,650,773 A | 7/1997 | Chiarello |
| 5,651,070 A | 7/1997 | Blunt |
| 5,652,567 A | 7/1997 | Traxler |
| 5,654,694 A | 8/1997 | Newham |
| 5,675,321 A | 10/1997 | McBride |
| 5,680,131 A | 10/1997 | Utz |
| 5,682,133 A | 10/1997 | Johnson et al. |
| 5,686,885 A | 11/1997 | Bergman |
| 5,686,896 A | 11/1997 | Bergman |
| 5,689,235 A | 11/1997 | Sugimoto et al. |
| 5,689,708 A | 11/1997 | Regnier et al. |
| 5,691,697 A | 11/1997 | Carvalho et al. |
| 5,694,335 A | 12/1997 | Hollenberg |
| 5,694,595 A | 12/1997 | Jacobs et al. |
| 5,696,486 A | 12/1997 | Poliquin et al. |
| 5,696,898 A | 12/1997 | Baker et al. |
| D389,501 S | 1/1998 | Mascarenas et al. |
| 5,706,191 A | 1/1998 | Bassett et al. |
| 5,712,679 A | 1/1998 | Coles |
| 5,714,933 A | 2/1998 | Le Van Suu |
| 5,715,394 A | 2/1998 | Jabs |
| 5,717,378 A | 2/1998 | Malvaso et al. |
| 5,717,379 A | 2/1998 | Peters |
| 5,717,578 A | 2/1998 | Afzal |
| 5,719,551 A | 2/1998 | Flick |
| 5,726,912 A | 3/1998 | Krall et al. |
| 5,731,756 A | 3/1998 | Roddy |
| 5,736,927 A | 4/1998 | Stebbins et al. |
| 5,737,391 A | 4/1998 | Dame et al. |
| 5,748,084 A | 5/1998 | Isikoff |
| 5,748,089 A | 5/1998 | Sizemore |
| 5,757,616 A | 5/1998 | May et al. |

(56) References Cited

U.S. PATENT DOCUMENTS

| | | |
|---|---|---|
| 5,761,206 A | 6/1998 | Kackman |
| 5,774,051 A | 6/1998 | Kostusiak |
| 5,777,551 A | 7/1998 | Hess |
| 5,777,837 A | 7/1998 | Eckel et al. |
| 5,784,461 A | 7/1998 | Shaffer et al. |
| 5,784,463 A | 7/1998 | Chen et al. |
| 5,790,531 A | 8/1998 | Ellebracht et al. |
| 5,793,028 A | 8/1998 | Wagener et al. |
| 5,793,763 A | 8/1998 | Mayes et al. |
| 5,794,128 A | 8/1998 | Brockel et al. |
| 5,796,401 A | 8/1998 | Winer |
| 5,798,701 A | 8/1998 | Bernal et al. |
| 5,801,618 A | 9/1998 | Jenkins |
| 5,805,056 A | 9/1998 | Mueller et al. |
| 5,805,064 A | 9/1998 | Yorkey |
| 5,809,013 A | 9/1998 | Kackman |
| 5,809,265 A | 9/1998 | Blair et al. |
| 5,812,054 A | 9/1998 | Cohen |
| 5,819,124 A | 10/1998 | Somner et al. |
| 5,821,937 A | 10/1998 | Tonelli |
| 5,825,865 A | 10/1998 | Oberlander et al. |
| 5,838,226 A | 11/1998 | Houggy et al. |
| 5,844,599 A | 12/1998 | Hildin |
| 5,845,070 A | 12/1998 | Koichiro |
| 5,845,081 A | 12/1998 | Rangarajan et al. |
| 5,854,588 A | 12/1998 | Dockery |
| 5,859,966 A | 1/1999 | Hayman et al. |
| 5,861,804 A | 1/1999 | Fansa et al. |
| 5,864,614 A | 1/1999 | Farris et al. |
| 5,867,484 A | 2/1999 | Shaunfield |
| 5,867,495 A | 2/1999 | Elliott et al. |
| 5,874,952 A | 2/1999 | Morgan |
| 5,875,395 A | 2/1999 | Holmes |
| 5,877,696 A | 3/1999 | Powell |
| 5,877,957 A | 3/1999 | Bennett |
| 5,880,775 A | 3/1999 | Ross |
| 5,881,226 A | 3/1999 | Veneklase |
| 5,886,697 A | 3/1999 | Naughton et al. |
| 5,886,894 A | 3/1999 | Rakoff |
| 5,892,442 A | 4/1999 | Ozery |
| 5,898,831 A | 4/1999 | Hall et al. |
| 5,905,438 A | 5/1999 | Weiss et al. |
| 5,907,279 A | 5/1999 | Bruins et al. |
| 5,909,183 A | 6/1999 | Borgstahl et al. |
| 5,914,655 A | 6/1999 | Clifton et al. |
| 5,924,069 A | 7/1999 | Kowalkowski et al. |
| 5,926,209 A | 7/1999 | Glatt |
| 5,933,098 A | 8/1999 | Haxton |
| 5,940,387 A | 8/1999 | Humpleman |
| 5,943,394 A | 8/1999 | Ader et al. |
| 5,952,815 A | 9/1999 | Rouillard et al. |
| 5,955,946 A | 9/1999 | Beheshti et al. |
| 5,958,053 A | 9/1999 | Denker |
| 5,959,528 A | 9/1999 | Right et al. |
| 5,959,529 A | 9/1999 | Kail, IV |
| 5,963,916 A | 10/1999 | Kaplan |
| 5,967,975 A | 10/1999 | Ridgeway |
| 5,974,547 A | 10/1999 | Klimenko |
| D416,910 S | 11/1999 | Vasquez |
| 5,982,418 A | 11/1999 | Ely |
| 5,991,795 A | 11/1999 | Howard et al. |
| 5,995,838 A | 11/1999 | Oda et al. |
| 5,999,525 A | 12/1999 | Krishnaswamy et al. |
| 6,002,430 A | 12/1999 | McCall et al. |
| 6,009,320 A | 12/1999 | Dudley |
| 6,011,321 A | 1/2000 | Stancu et al. |
| 6,011,921 A | 1/2000 | Takahashi et al. |
| 6,032,036 A | 2/2000 | Maystre et al. |
| 6,037,991 A | 3/2000 | Thro et al. |
| 6,038,289 A | 3/2000 | Sands |
| 6,040,770 A | 3/2000 | Britton |
| 6,049,272 A | 4/2000 | Lee et al. |
| 6,049,273 A | 4/2000 | Jess |
| 6,049,598 A | 4/2000 | Peters et al. |
| 6,052,052 A | 4/2000 | Delmonaco |
| 6,058,115 A | 5/2000 | Sawyer et al. |
| 6,060,994 A | 5/2000 | Chen |
| 6,067,346 A | 5/2000 | Akhteruzzaman |
| 6,067,440 A | 5/2000 | Diefes |
| 6,069,655 A | 5/2000 | Seeley et al. |
| 6,078,253 A | 6/2000 | Fowler |
| 6,078,257 A | 6/2000 | Ferraro |
| 6,078,649 A | 6/2000 | Small et al. |
| 6,085,030 A | 7/2000 | Whitehead et al. |
| 6,085,238 A | 7/2000 | Yuasa et al. |
| 6,091,771 A | 7/2000 | Seeley et al. |
| 6,094,134 A | 7/2000 | Cohen |
| 6,097,429 A | 8/2000 | Seeley et al. |
| 6,104,785 A | 8/2000 | Chen |
| 6,107,918 A | 8/2000 | Klein et al. |
| 6,107,930 A | 8/2000 | Behlke et al. |
| 6,108,034 A | 8/2000 | Kim |
| 6,112,015 A | 8/2000 | Planas et al. |
| 6,112,237 A | 8/2000 | Donaldson et al. |
| 6,117,182 A | 9/2000 | Alpert et al. |
| 6,124,882 A | 9/2000 | Voois et al. |
| 6,128,653 A | 10/2000 | Del et al. |
| 6,134,303 A | 10/2000 | Chen |
| 6,134,591 A | 10/2000 | Nickles |
| 6,138,249 A | 10/2000 | Nolet |
| 6,139,177 A | 10/2000 | Venkatraman et al. |
| 6,140,987 A | 10/2000 | Stein et al. |
| 6,144,993 A | 11/2000 | Fukunaga et al. |
| 6,154,133 A | 11/2000 | Ross et al. |
| 6,157,649 A | 12/2000 | Peirce et al. |
| 6,157,943 A | 12/2000 | Meyer |
| 6,161,182 A | 12/2000 | Nadooshan |
| 6,167,186 A | 12/2000 | Kawasaki et al. |
| 6,167,253 A | 12/2000 | Farris et al. |
| 6,181,341 B1 | 1/2001 | Shinagawa |
| 6,192,282 B1 | 2/2001 | Smith et al. |
| 6,192,418 B1 | 2/2001 | Hale et al. |
| 6,198,475 B1 | 3/2001 | Kunimatsu et al. |
| 6,198,479 B1 | 3/2001 | Humpleman et al. |
| 6,208,247 B1 * | 3/2001 | Agre ............... G01V 1/223 340/854.6 |
| 6,208,379 B1 | 3/2001 | Oya et al. |
| 6,208,952 B1 | 3/2001 | Goertzel et al. |
| 6,209,011 B1 | 3/2001 | Vong et al. |
| 6,211,783 B1 | 4/2001 | Wang |
| 6,215,404 B1 | 4/2001 | Morales |
| 6,218,938 B1 | 4/2001 | Lin |
| 6,219,677 B1 | 4/2001 | Howard |
| 6,226,031 B1 | 5/2001 | Barraclough et al. |
| 6,229,429 B1 | 5/2001 | Horon |
| 6,230,271 B1 | 5/2001 | Wadlow et al. |
| 6,239,892 B1 | 5/2001 | Davidson |
| 6,243,683 B1 | 6/2001 | Peters |
| 6,246,320 B1 | 6/2001 | Monroe |
| 6,252,883 B1 | 6/2001 | Schweickart et al. |
| 6,259,440 B1 | 7/2001 | Vaughan et al. |
| 6,268,789 B1 | 7/2001 | Diamant et al. |
| 6,271,752 B1 | 8/2001 | Vaios |
| 6,275,227 B1 | 8/2001 | DeStefano |
| 6,281,790 B1 | 8/2001 | Kimmel et al. |
| 6,282,569 B1 | 8/2001 | Wallis et al. |
| 6,286,038 B1 | 9/2001 | Reichmeyer et al. |
| 6,288,716 B1 | 9/2001 | Humpleman et al. |
| 6,289,382 B1 | 9/2001 | Bowman-Amuah |
| 6,292,766 B1 | 9/2001 | Mattos et al. |
| 6,292,827 B1 | 9/2001 | Raz |
| 6,295,346 B1 | 9/2001 | Markowitz et al. |
| 6,295,558 B1 | 9/2001 | Davis et al. |
| 6,314,425 B1 | 11/2001 | Serbinis et al. |
| 6,320,506 B1 | 11/2001 | Ferraro |
| 6,323,897 B1 | 11/2001 | Kogane et al. |
| D451,529 S | 12/2001 | Vasquez |
| 6,327,044 B1 | 12/2001 | Shima |
| 6,331,122 B1 | 12/2001 | Wu |
| 6,332,193 B1 | 12/2001 | Glass et al. |
| 6,341,274 B1 | 1/2002 | Leon |
| 6,347,393 B1 | 2/2002 | Alpert et al. |
| 6,351,213 B1 | 2/2002 | Hirsch et al. |
| 6,351,271 B1 | 2/2002 | Mainwaring et al. |

(56) References Cited

U.S. PATENT DOCUMENTS

| | | | |
|---|---|---|---|
| 6,351,595 B1 | 2/2002 | Kim |
| 6,351,829 B1 | 2/2002 | Dupont et al. |
| 6,353,853 B1 | 3/2002 | Gravlin |
| 6,353,891 B1 | 3/2002 | Borella et al. |
| 6,359,560 B1 | 3/2002 | Budge et al. |
| 6,363,417 B1 | 3/2002 | Howard et al. |
| 6,363,422 B1 | 3/2002 | Hunter et al. |
| 6,366,211 B1 | 4/2002 | Parker |
| 6,369,695 B2 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,378,109 B1 | 4/2002 | Young et al. |
| 6,385,772 B1 | 5/2002 | Courtney |
| 6,392,538 B1 | 5/2002 | Shere |
| 6,396,531 B1 | 5/2002 | Gerszberg et al. |
| 6,400,265 B1 | 6/2002 | Saylor et al. |
| 6,405,348 B1 | 6/2002 | Fallah-Tehrani et al. |
| 6,411,802 B1 | 6/2002 | Cardina et al. |
| D460,472 S | 7/2002 | Wang |
| 6,418,037 B1 | 7/2002 | Zhang |
| 6,421,080 B1 | 7/2002 | Lambert |
| 6,430,629 B1 | 8/2002 | Smyers |
| 6,433,683 B1 | 8/2002 | Robinson |
| 6,434,604 B1 | 8/2002 | Harada et al. |
| 6,434,700 B1 | 8/2002 | Alonso et al. |
| 6,437,692 B1 | 8/2002 | Petite et al. |
| 6,441,723 B1 | 8/2002 | Mansfield et al. |
| 6,441,731 B1 | 8/2002 | Hess |
| 6,442,241 B1 | 8/2002 | Tsumpes |
| 6,445,291 B2 | 9/2002 | Addy et al. |
| 6,446,111 B1 | 9/2002 | Lowery |
| 6,446,192 B1 | 9/2002 | Narasimhan et al. |
| 6,452,490 B1 | 9/2002 | Garland et al. |
| 6,452,923 B1 | 9/2002 | Gerszberg et al. |
| 6,452,924 B1 | 9/2002 | Golden et al. |
| 6,453,687 B2 | 9/2002 | Sharood et al. |
| D464,328 S | 10/2002 | Vasquez et al. |
| D464,948 S | 10/2002 | Vasquez et al. |
| 6,462,507 B2 | 10/2002 | Fisher, Jr. |
| 6,462,663 B1 | 10/2002 | Wilson et al. |
| 6,467,084 B1 | 10/2002 | Howard et al. |
| 6,473,407 B1 | 10/2002 | Ditmer et al. |
| 6,476,858 B1 | 11/2002 | Ramirez et al. |
| 6,480,901 B1 | 11/2002 | Weber et al. |
| 6,486,896 B1 | 11/2002 | Ubillos |
| 6,493,020 B1 | 12/2002 | Stevenson et al. |
| 6,496,927 B1 | 12/2002 | McGrane et al. |
| 6,499,131 B1 | 12/2002 | Savithri et al. |
| 6,504,479 B1 | 1/2003 | Lemons et al. |
| 6,507,589 B1 | 1/2003 | Ramasubramani et al. |
| 6,508,709 B1 | 1/2003 | Karmarkar |
| 6,515,968 B1 | 2/2003 | Combar et al. |
| 6,526,581 B1 | 2/2003 | Edson |
| 6,529,230 B1 | 3/2003 | Chong |
| 6,529,589 B1 | 3/2003 | Nelson et al. |
| 6,529,723 B1 | 3/2003 | Bentley |
| 6,535,110 B1 | 3/2003 | Arora et al. |
| 6,542,075 B2 | 4/2003 | Barker et al. |
| 6,542,992 B1 | 4/2003 | Peirce et al. |
| 6,549,130 B1 | 4/2003 | Joao |
| 6,552,647 B1 | 4/2003 | Thiessen et al. |
| 6,553,336 B1 | 4/2003 | Johnson et al. |
| 6,559,769 B2 | 5/2003 | Anthony et al. |
| 6,563,800 B1 | 5/2003 | Salo et al. |
| 6,563,910 B2 | 5/2003 | Menard et al. |
| 6,567,122 B1 | 5/2003 | Anderson et al. |
| 6,567,502 B2 | 5/2003 | Zellner et al. |
| 6,574,234 B1 | 6/2003 | Myer et al. |
| 6,580,424 B1 | 6/2003 | Krumm |
| 6,580,950 B1 | 6/2003 | Johnson et al. |
| 6,587,046 B2 | 7/2003 | Joao |
| 6,587,235 B1 | 7/2003 | Chaudhuri et al. |
| 6,587,455 B1 | 7/2003 | Ray et al. |
| 6,587,736 B2 | 7/2003 | Howard et al. |
| 6,587,739 B1 | 7/2003 | Abrams et al. |
| 6,591,094 B1 | 7/2003 | Bentley |
| 6,593,856 B1 | 7/2003 | Madau |
| 6,597,703 B1 | 7/2003 | Li et al. |
| 6,601,086 B1 | 7/2003 | Howard et al. |
| 6,603,488 B2 | 8/2003 | Humpleman et al. |
| 6,609,127 B1 | 8/2003 | Lee et al. |
| 6,611,206 B2 | 8/2003 | Eshelman et al. |
| 6,615,088 B1 | 9/2003 | Myer et al. |
| 6,621,827 B1 | 9/2003 | Rezvani et al. |
| 6,624,750 B1 * | 9/2003 | Marman ............... G08B 25/10 340/521 |
| 6,631,416 B2 | 10/2003 | Bendinelli et al. |
| 6,636,893 B1 | 10/2003 | Fong |
| 6,643,355 B1 | 11/2003 | Tsumpes |
| 6,643,652 B2 | 11/2003 | Helgeson et al. |
| 6,643,669 B1 | 11/2003 | Novak et al. |
| 6,643,795 B1 | 11/2003 | Sicola et al. |
| 6,648,682 B1 | 11/2003 | Wu |
| 6,658,091 B1 | 12/2003 | Naidoo et al. |
| 6,661,340 B1 | 12/2003 | Saylor et al. |
| 6,662,340 B2 | 12/2003 | Rawat et al. |
| 6,665,004 B1 | 12/2003 | Paff |
| 6,667,688 B1 | 12/2003 | Menard et al. |
| 6,674,767 B1 | 1/2004 | Kadyk et al. |
| 6,675,365 B2 | 1/2004 | Elzinga |
| 6,680,730 B1 | 1/2004 | Shields et al. |
| 6,680,935 B1 | 1/2004 | Kung et al. |
| 6,686,838 B1 | 2/2004 | Rezvani et al. |
| 6,690,411 B2 | 2/2004 | Naidoo et al. |
| 6,690,719 B1 | 2/2004 | Raphaeli et al. |
| 6,693,530 B1 | 2/2004 | Dowens et al. |
| 6,693,545 B2 | 2/2004 | Brown et al. |
| 6,697,103 B1 | 2/2004 | Fernandez et al. |
| 6,704,786 B1 | 3/2004 | Gupta et al. |
| 6,716,101 B1 | 4/2004 | Meadows et al. |
| 6,720,990 B1 | 4/2004 | Walker et al. |
| 6,721,689 B2 | 4/2004 | Markle et al. |
| 6,721,740 B1 | 4/2004 | Skinner et al. |
| 6,721,747 B2 | 4/2004 | Lipkin |
| 6,721,802 B1 | 4/2004 | Wright et al. |
| 6,727,811 B1 | 4/2004 | Fendis |
| 6,728,233 B1 * | 4/2004 | Park ............... H04W 28/18 370/335 |
| 6,728,688 B1 | 4/2004 | Hirsch et al. |
| 6,738,824 B1 | 5/2004 | Blair |
| 6,741,171 B2 | 5/2004 | Palka et al. |
| 6,741,977 B1 | 5/2004 | Nagaya et al. |
| 6,754,181 B1 | 6/2004 | Elliott et al. |
| 6,754,717 B1 | 6/2004 | Day et al. |
| 6,756,896 B2 | 6/2004 | Ford |
| 6,756,988 B1 | 6/2004 | Wang et al. |
| 6,756,998 B1 | 6/2004 | Bilger |
| 6,759,956 B2 * | 7/2004 | Menard ............... G16Z 99/00 340/539.18 |
| 6,762,686 B1 | 7/2004 | Tabe |
| 6,763,377 B1 | 7/2004 | Belknap et al. |
| 6,766,353 B1 | 7/2004 | Lin et al. |
| 6,771,181 B1 | 8/2004 | Hughen, Jr. |
| 6,778,085 B2 | 8/2004 | Faulkner et al. |
| 6,779,019 B1 | 8/2004 | Mousseau et al. |
| 6,781,509 B1 | 8/2004 | Oppedahl et al. |
| 6,785,542 B1 | 8/2004 | Blight et al. |
| 6,789,147 B1 | 9/2004 | Kessler et al. |
| 6,795,322 B2 | 9/2004 | Aihara et al. |
| 6,795,863 B1 | 9/2004 | Doty, Jr. |
| 6,798,344 B2 | 9/2004 | Faulkner et al. |
| 6,804,638 B2 | 10/2004 | Fiedler |
| 6,810,409 B1 | 10/2004 | Fry et al. |
| 6,810,420 B1 | 10/2004 | Buse et al. |
| 6,823,223 B1 | 11/2004 | Gonzales et al. |
| 6,826,173 B1 | 11/2004 | Kung et al. |
| 6,826,233 B1 | 11/2004 | Oosawa |
| 6,829,478 B1 | 12/2004 | Layton et al. |
| 6,834,208 B2 | 12/2004 | Gonzales et al. |
| 6,836,214 B2 | 12/2004 | Choi |
| 6,850,252 B1 | 2/2005 | Hoffberg |
| 6,856,236 B2 | 2/2005 | Christensen et al. |

(56) References Cited

U.S. PATENT DOCUMENTS

| | | |
|---|---|---|
| 6,857,026 B1 | 2/2005 | Cain |
| 6,859,831 B1 | 2/2005 | Gelvin et al. |
| 6,865,690 B2 | 3/2005 | Kocin |
| 6,871,193 B1 | 3/2005 | Campbell et al. |
| 6,873,256 B2 | 3/2005 | Lemelson et al. |
| 6,885,362 B2 | 4/2005 | Suomela |
| D504,889 S | 5/2005 | Andre et al. |
| 6,891,838 B1 | 5/2005 | Petite et al. |
| 6,912,429 B1 | 6/2005 | Bilger |
| 6,914,533 B2 | 7/2005 | Petite |
| 6,918,112 B2 | 7/2005 | Bourke-Dunphy et al. |
| 6,920,502 B2 | 7/2005 | Araujo et al. |
| 6,920,615 B1 | 7/2005 | Campbell et al. |
| 6,922,701 B1 | 7/2005 | Ananian et al. |
| 6,928,148 B2 | 8/2005 | Simon et al. |
| 6,930,598 B2 | 8/2005 | Weiss |
| 6,930,599 B2 | 8/2005 | Naidoo et al. |
| 6,930,730 B2 | 8/2005 | Maxson et al. |
| 6,931,445 B2 | 8/2005 | Davis |
| 6,941,258 B2 | 9/2005 | Van et al. |
| 6,943,681 B2 | 9/2005 | Rezvani et al. |
| 6,956,477 B2 | 10/2005 | Chun |
| 6,957,075 B1 | 10/2005 | Iverson |
| 6,957,186 B1 | 10/2005 | Guheen et al. |
| 6,957,275 B1 | 10/2005 | Sekiguchi |
| 6,959,341 B1 | 10/2005 | Leung |
| 6,959,393 B2 | 10/2005 | Hollis et al. |
| 6,963,908 B1 | 11/2005 | Lynch et al. |
| 6,963,981 B1 | 11/2005 | Bailey et al. |
| 6,965,294 B1 | 11/2005 | Elliott et al. |
| 6,965,313 B1 | 11/2005 | Saylor et al. |
| 6,970,183 B1 | 11/2005 | Monroe |
| 6,971,063 B1 | 11/2005 | Rappaport et al. |
| 6,971,076 B2 | 11/2005 | Chen |
| 6,972,676 B1 | 12/2005 | Kimmel et al. |
| 6,975,220 B1 | 12/2005 | Foodman et al. |
| 6,977,485 B1 | 12/2005 | Wei |
| 6,983,432 B2 | 1/2006 | Hayes |
| 6,990,591 B1 | 1/2006 | Pearson |
| 6,993,658 B1 | 1/2006 | Engberg et al. |
| 6,999,562 B2 | 2/2006 | Winick |
| 6,999,992 B1 | 2/2006 | Deen et al. |
| 7,015,806 B2 | 3/2006 | Naidoo et al. |
| 7,016,970 B2 | 3/2006 | Harumoto et al. |
| 7,019,639 B2 | 3/2006 | Stilp |
| 7,020,697 B1 | 3/2006 | Goodman et al. |
| 7,020,701 B1 | 3/2006 | Gelvin et al. |
| 7,023,913 B1 | 4/2006 | Monroe |
| 7,023,914 B2 | 4/2006 | Furukawa et al. |
| 7,023,975 B2 | 4/2006 | Mansfield et al. |
| 7,024,676 B1 | 4/2006 | Klopfenstein |
| 7,028,328 B2 | 4/2006 | Kogane et al. |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,035,907 B1 | 4/2006 | Decasper et al. |
| 7,039,391 B2 | 5/2006 | Rezvani et al. |
| 7,042,880 B1 | 5/2006 | Voit et al. |
| 7,043,537 B1 | 5/2006 | Pratt |
| 7,047,088 B2 | 5/2006 | Nakamura et al. |
| 7,047,092 B2 | 5/2006 | Wimsatt |
| 7,047,180 B1 | 5/2006 | Mathews et al. |
| 7,050,388 B2 | 5/2006 | Kim et al. |
| 7,053,764 B2 | 5/2006 | Stilp |
| 7,053,765 B1 | 5/2006 | Clark |
| 7,068,164 B1 | 6/2006 | Duncan et al. |
| 7,072,934 B2 | 7/2006 | Helgeson et al. |
| 7,073,140 B1 | 7/2006 | Li et al. |
| 7,075,429 B2 | 7/2006 | Marshall |
| 7,079,020 B2 | 7/2006 | Stilp |
| 7,080,046 B1 | 7/2006 | Rezvani et al. |
| 7,081,813 B2 | 7/2006 | Winick et al. |
| 7,082,460 B2 | 7/2006 | Hansen et al. |
| 7,084,756 B2 | 8/2006 | Stilp |
| 7,085,814 B1 | 8/2006 | Gandhi et al. |
| 7,085,937 B1 | 8/2006 | Rezvani et al. |
| 7,086,018 B2 | 8/2006 | Noriyuki |
| 7,099,944 B1 | 8/2006 | Anschutz et al. |
| 7,099,994 B2 | 8/2006 | Thayer et al. |
| 7,103,152 B2 | 9/2006 | Naidoo et al. |
| 7,106,176 B2 | 9/2006 | La et al. |
| 7,107,322 B1 | 9/2006 | Freeny, Jr. |
| 7,110,774 B1 | 9/2006 | Davis et al. |
| 7,111,072 B1 | 9/2006 | Matthews et al. |
| 7,113,090 B1 | 9/2006 | Saylor et al. |
| 7,113,099 B2 | 9/2006 | Tyroler et al. |
| 7,114,554 B2 | 10/2006 | Bergman et al. |
| 7,119,609 B2 | 10/2006 | Naidoo et al. |
| 7,119,674 B2 | 10/2006 | Sefton |
| 7,120,139 B1 | 10/2006 | Kung et al. |
| 7,120,232 B2 | 10/2006 | Naidoo et al. |
| 7,120,233 B2 | 10/2006 | Naidoo et al. |
| 7,126,473 B1 | 10/2006 | Powell |
| 7,130,383 B2 | 10/2006 | Naidoo et al. |
| 7,130,585 B1 | 10/2006 | Ollis et al. |
| 7,134,138 B2 | 11/2006 | Scherr |
| 7,136,711 B1 | 11/2006 | Duncan et al. |
| 7,142,503 B1 | 11/2006 | Grant et al. |
| 7,145,898 B1 | 12/2006 | Elliott |
| 7,147,147 B1 | 12/2006 | Enright et al. |
| 7,148,810 B2 | 12/2006 | Bhat |
| 7,149,798 B2 | 12/2006 | Rezvani et al. |
| 7,149,814 B2 | 12/2006 | Neufeld et al. |
| 7,158,026 B2 | 1/2007 | Feldkamp et al. |
| 7,158,776 B1 | 1/2007 | Estes et al. |
| 7,158,920 B2 | 1/2007 | Ishikawa |
| 7,164,883 B2 | 1/2007 | Rappaport et al. |
| 7,164,907 B2 | 1/2007 | Cochran et al. |
| 7,166,987 B2 | 1/2007 | Lee et al. |
| 7,171,466 B2 | 1/2007 | Van Der Meulen |
| 7,171,686 B1 | 1/2007 | Jansen et al. |
| 7,174,018 B1 | 2/2007 | Patil et al. |
| 7,174,564 B1 | 2/2007 | Weatherspoon et al. |
| 7,180,889 B1 | 2/2007 | Kung et al. |
| 7,181,207 B1 | 2/2007 | Chow et al. |
| 7,181,517 B1 | 2/2007 | Iavergne et al. |
| 7,181,571 B2 | 2/2007 | Jiang et al. |
| 7,181,716 B1 | 2/2007 | Dahroug |
| 7,183,907 B2 | 2/2007 | Simon et al. |
| 7,184,428 B1 | 2/2007 | Gerszberg et al. |
| 7,184,848 B2 | 2/2007 | Krzyzanowski et al. |
| 7,187,279 B2 | 3/2007 | Chung |
| 7,187,986 B2 | 3/2007 | Johnson et al. |
| 7,194,003 B2 | 3/2007 | Danner et al. |
| 7,194,446 B1 | 3/2007 | Bromley et al. |
| 7,197,125 B1 | 3/2007 | Prasad et al. |
| 7,203,486 B2 | 4/2007 | Patel |
| 7,209,945 B2 | 4/2007 | Hicks et al. |
| 7,212,570 B2 | 5/2007 | Akiyama et al. |
| 7,213,061 B1 | 5/2007 | Hite et al. |
| 7,218,217 B2 | 5/2007 | Adonailo et al. |
| 7,222,359 B2 | 5/2007 | Freund et al. |
| 7,229,012 B1 | 6/2007 | Enright et al. |
| 7,237,267 B2 | 6/2007 | Rayes et al. |
| 7,240,327 B2 | 7/2007 | Singh et al. |
| 7,246,044 B2 | 7/2007 | Imamura et al. |
| 7,248,150 B2 | 7/2007 | Mackjust et al. |
| 7,248,161 B2 | 7/2007 | Spoltore et al. |
| 7,249,177 B1 | 7/2007 | Miller |
| 7,249,317 B1 | 7/2007 | Nakagawa et al. |
| 7,250,854 B2 | 7/2007 | Rezvani et al. |
| 7,250,859 B2 | 7/2007 | Martin et al. |
| 7,254,779 B1 | 8/2007 | Rezvani et al. |
| 7,254,833 B1 | 8/2007 | Cornelius et al. |
| 7,262,690 B2 | 8/2007 | Heaton et al. |
| 7,277,010 B2 | 10/2007 | Joao |
| 7,292,142 B2 | 11/2007 | Simon et al. |
| 7,293,083 B1 | 11/2007 | Ranous et al. |
| 7,298,253 B2 | 11/2007 | Petricoin et al. |
| 7,305,461 B2 | 12/2007 | Ullman |
| 7,310,115 B2 | 12/2007 | Tanimoto |
| 7,313,102 B2 | 12/2007 | Stephenson et al. |
| 7,313,231 B2 | 12/2007 | Reid |
| D558,460 S | 1/2008 | Yu et al. |

(56) References Cited

U.S. PATENT DOCUMENTS

| | | |
|---|---|---|
| D558,756 S | 1/2008 | Andre et al. |
| 7,315,886 B1 | 1/2008 | Meenan et al. |
| 7,337,217 B2 | 2/2008 | Wang |
| 7,337,473 B2 | 2/2008 | Chang et al. |
| 7,339,895 B2 | 3/2008 | Ozaki et al. |
| 7,340,314 B1 | 3/2008 | Duncan et al. |
| 7,343,619 B2 | 3/2008 | Ofek et al. |
| 7,345,580 B2 | 3/2008 | Akamatsu et al. |
| 7,346,338 B1 | 3/2008 | Calhoun et al. |
| 7,349,682 B1 | 3/2008 | Bennett et al. |
| 7,349,761 B1 | 3/2008 | Cruse |
| 7,349,967 B2 | 3/2008 | Wang |
| 7,356,372 B1 | 4/2008 | Duncan et al. |
| 7,359,843 B1 | 4/2008 | Keller et al. |
| 7,362,221 B2 | 4/2008 | Katz |
| 7,367,045 B2 | 4/2008 | Ofek et al. |
| 7,370,115 B2 | 5/2008 | Bae et al. |
| 7,383,339 B1 | 6/2008 | Meenan et al. |
| 7,383,522 B2 | 6/2008 | Murgai et al. |
| 7,391,298 B1 | 6/2008 | Campbell et al. |
| 7,403,838 B2 | 7/2008 | Deen et al. |
| 7,409,045 B2 | 8/2008 | Naidoo et al. |
| 7,409,451 B1 | 8/2008 | Meenan et al. |
| 7,412,447 B2 | 8/2008 | Hilbert et al. |
| 7,425,101 B2 | 9/2008 | Cheng |
| 7,428,585 B1 | 9/2008 | Owens et al. |
| 7,430,614 B2 | 9/2008 | Shen et al. |
| 7,437,753 B2 | 10/2008 | Nahum |
| 7,440,434 B2 | 10/2008 | Chaskar et al. |
| 7,440,767 B2 | 10/2008 | Ballay et al. |
| 7,447,775 B1 | 11/2008 | Zhu et al. |
| 7,454,731 B2 | 11/2008 | Oh et al. |
| 7,457,869 B2 | 11/2008 | Kernan |
| 7,466,223 B2 | 12/2008 | Sefton |
| 7,466,710 B1 | 12/2008 | Clemm et al. |
| 7,469,139 B2 | 12/2008 | Van De Groenendaal |
| 7,469,294 B1 | 12/2008 | Luo et al. |
| 7,469,381 B2 | 12/2008 | Ording |
| 7,469,391 B2 | 12/2008 | Carrere et al. |
| D584,738 S | 1/2009 | Kim et al. |
| D585,399 S | 1/2009 | Hwang |
| 7,477,629 B2 | 1/2009 | Tsirtsis et al. |
| 7,479,949 B2 | 1/2009 | Jobs et al. |
| 7,480,713 B2 | 1/2009 | Ullman |
| 7,480,724 B2 | 1/2009 | Zimler et al. |
| 7,483,958 B1 | 1/2009 | Elabbady et al. |
| 7,490,350 B1 | 2/2009 | Murotake et al. |
| 7,493,651 B2 | 2/2009 | Vaenskae et al. |
| 7,498,695 B2 | 3/2009 | Gaudreau et al. |
| 7,502,672 B1 | 3/2009 | Kolls |
| 7,506,052 B2 | 3/2009 | Qian et al. |
| 7,509,687 B2 | 3/2009 | Ofek et al. |
| 7,511,614 B2 | 3/2009 | Stilp et al. |
| 7,512,965 B1 | 3/2009 | Amdur et al. |
| 7,526,539 B1 | 4/2009 | Hsu |
| 7,526,762 B1 | 4/2009 | Astala et al. |
| 7,528,723 B2 | 5/2009 | Fast et al. |
| 7,535,880 B1 | 5/2009 | Hinman et al. |
| 7,542,721 B1 | 6/2009 | Bonner et al. |
| 7,549,134 B1 | 6/2009 | Li et al. |
| 7,551,071 B2 | 6/2009 | Bennett et al. |
| 7,554,934 B2 | 6/2009 | Abraham et al. |
| 7,558,379 B2 | 7/2009 | Winick |
| 7,558,862 B1 | 7/2009 | Tyukasz et al. |
| 7,558,903 B2 | 7/2009 | Kinstler |
| 7,562,323 B1 | 7/2009 | Bai et al. |
| 7,564,855 B1 | 7/2009 | Georgiou |
| 7,568,018 B1 | 7/2009 | Hove et al. |
| 7,571,459 B2 | 8/2009 | Ganesh et al. |
| 7,577,420 B2 | 8/2009 | Srinivasan et al. |
| 7,583,191 B2 | 9/2009 | Zinser |
| 7,584,263 B1 | 9/2009 | Hicks et al. |
| 7,587,464 B2 | 9/2009 | Moorer et al. |
| 7,590,953 B2 | 9/2009 | Chang |
| 7,595,816 B1 | 9/2009 | Enright et al. |
| 7,596,622 B2 | 9/2009 | Owen et al. |
| D602,014 S | 10/2009 | Andre et al. |
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,606,767 B1 | 10/2009 | Couper et al. |
| 7,610,555 B2 | 10/2009 | Klein et al. |
| 7,610,559 B1 | 10/2009 | Humpleman et al. |
| 7,619,512 B2 | 11/2009 | Trundle et al. |
| 7,620,427 B2 | 11/2009 | Shanahan |
| 7,627,665 B2 | 12/2009 | Barker et al. |
| 7,633,385 B2 | 12/2009 | Cohn et al. |
| 7,634,519 B2 | 12/2009 | Creamer et al. |
| 7,639,157 B1 | 12/2009 | Whitley et al. |
| 7,651,530 B2 | 1/2010 | Winick |
| 7,653,911 B2 | 1/2010 | Doshi et al. |
| 7,671,729 B2 | 3/2010 | Hershkovitz et al. |
| 7,679,503 B2 | 3/2010 | Mason et al. |
| 7,681,201 B2 | 3/2010 | Dale et al. |
| 7,684,418 B2 | 3/2010 | Scott et al. |
| 7,696,873 B2 | 4/2010 | Sharma et al. |
| 7,697,028 B1 | 4/2010 | Johnson |
| 7,701,970 B2 | 4/2010 | Krits et al. |
| 7,702,421 B2 | 4/2010 | Sullivan et al. |
| 7,702,782 B1 | 4/2010 | Pai |
| D615,083 S | 5/2010 | Andre et al. |
| 7,711,796 B2 | 5/2010 | Gutt et al. |
| 7,720,654 B2 | 5/2010 | Hollis |
| 7,730,223 B1 | 6/2010 | Bavor et al. |
| 7,733,371 B1 | 6/2010 | Monroe |
| 7,734,020 B2 | 6/2010 | Elliot et al. |
| 7,734,286 B2 | 6/2010 | Almeda et al. |
| 7,734,906 B2 | 6/2010 | Orlando et al. |
| 7,739,596 B2 | 6/2010 | Clarke-Martin et al. |
| 7,739,658 B2 | 6/2010 | Watson et al. |
| 7,747,975 B2 | 6/2010 | Dinter et al. |
| 7,751,409 B1 | 7/2010 | Carolan |
| 7,755,472 B2 | 7/2010 | Grossman |
| 7,755,506 B1 | 7/2010 | Clegg et al. |
| 7,756,928 B1 | 7/2010 | Meenan et al. |
| 7,761,275 B2 | 7/2010 | Chopra et al. |
| 7,787,863 B2 | 8/2010 | Van De Groenendaal |
| 7,804,760 B2 | 9/2010 | Schmukler et al. |
| D624,896 S | 10/2010 | Park et al. |
| D626,437 S | 11/2010 | Lee et al. |
| 7,825,793 B1 | 11/2010 | Spillman et al. |
| 7,827,252 B2 | 11/2010 | Hopmann et al. |
| 7,844,699 B1 | 11/2010 | Horrocks et al. |
| 7,847,675 B1 | 12/2010 | Thyen et al. |
| 7,855,635 B2 | 12/2010 | Cohn et al. |
| 7,859,404 B2 * | 12/2010 | Chul Lee ............ G08B 25/008 340/545.7 |
| 7,882,466 B2 | 2/2011 | Ishikawa |
| 7,882,537 B2 | 2/2011 | Okajo et al. |
| 7,884,855 B2 | 2/2011 | Ortiz |
| 7,890,612 B2 | 2/2011 | Todd et al. |
| 7,890,915 B2 | 2/2011 | Celik et al. |
| 7,899,732 B2 | 3/2011 | Van et al. |
| 7,904,074 B2 | 3/2011 | Karaoguz et al. |
| 7,904,187 B2 | 3/2011 | Hoffberg et al. |
| 7,911,341 B2 | 3/2011 | Raji et al. |
| 7,912,447 B2 | 3/2011 | Bennett et al. |
| 7,917,624 B2 | 3/2011 | Gidwani |
| D636,769 S | 4/2011 | Wood et al. |
| 7,921,686 B2 | 4/2011 | Bagepalli et al. |
| 7,928,840 B2 | 4/2011 | Kim et al. |
| 7,930,365 B2 | 4/2011 | Dixit et al. |
| D637,596 S | 5/2011 | Akana et al. |
| 7,949,960 B2 | 5/2011 | Roessler et al. |
| D639,805 S | 6/2011 | Song et al. |
| D640,663 S | 6/2011 | Arnholt et al. |
| 7,956,736 B2 | 6/2011 | Cohn et al. |
| 7,957,326 B1 | 6/2011 | Christie, IV |
| 7,970,863 B1 | 6/2011 | Fontaine |
| D641,018 S | 7/2011 | Lee et al. |
| 7,974,235 B2 | 7/2011 | Ghozati et al. |
| D642,563 S | 8/2011 | Akana et al. |
| 8,001,219 B2 | 8/2011 | Moorer et al. |

(56) References Cited

U.S. PATENT DOCUMENTS

| | | |
|---|---|---|
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant et al. |
| 8,032,881 B2 * | 10/2011 | Holmberg ................ G06F 8/65 717/177 |
| 8,042,049 B2 | 10/2011 | Killian et al. |
| 8,044,411 B2 | 10/2011 | Hayashi et al. |
| 8,046,721 B2 | 10/2011 | Chaudhri et al. |
| 8,069,194 B1 | 11/2011 | Manber et al. |
| D650,381 S | 12/2011 | Park et al. |
| 8,073,931 B2 | 12/2011 | Dawes et al. |
| 8,086,702 B2 | 12/2011 | Baum et al. |
| 8,086,703 B2 | 12/2011 | Baum et al. |
| D654,460 S | 2/2012 | Kim et al. |
| D654,497 S | 2/2012 | Lee |
| 8,122,131 B2 | 2/2012 | Baum et al. |
| 8,125,184 B2 | 2/2012 | Raji et al. |
| D656,137 S | 3/2012 | Chung et al. |
| 8,140,658 B1 | 3/2012 | Gelvin et al. |
| 8,144,836 B2 | 3/2012 | Naidoo et al. |
| 8,149,849 B2 | 4/2012 | Osborn et al. |
| 8,159,519 B2 | 4/2012 | Kurtz et al. |
| 8,159,945 B2 | 4/2012 | Muro et al. |
| 8,160,425 B2 | 4/2012 | Kisliakov |
| 8,196,064 B2 | 6/2012 | Krzyzanowski et al. |
| 8,205,181 B1 | 6/2012 | Hunyady et al. |
| 8,205,181 B1 | 6/2012 | Singla et al. |
| 8,209,400 B2 | 6/2012 | Baum et al. |
| D663,298 S | 7/2012 | Song et al. |
| D664,540 S | 7/2012 | Kim et al. |
| 8,214,494 B1 | 7/2012 | Slavin |
| 8,214,496 B2 | 7/2012 | Gutt et al. |
| 8,219,254 B2 | 7/2012 | O'Connor |
| 8,229,812 B2 | 7/2012 | Raleigh |
| 8,230,466 B2 | 7/2012 | Cockrell et al. |
| D664,954 S | 8/2012 | Kim et al. |
| D666,198 S | 8/2012 | Van et al. |
| 8,239,477 B2 | 8/2012 | Sharma et al. |
| 8,244,550 B2 | 8/2012 | Sim et al. |
| D667,395 S | 9/2012 | Lee |
| D667,396 S | 9/2012 | Koh |
| D667,397 S | 9/2012 | Koh |
| D667,398 S | 9/2012 | Koh |
| D667,399 S | 9/2012 | Koh |
| 8,269,376 B1 | 9/2012 | Elberbaum |
| 8,269,623 B2 | 9/2012 | Addy |
| 8,271,629 B1 | 9/2012 | Winters et al. |
| 8,271,881 B2 | 9/2012 | Moorer et al. |
| 8,272,053 B2 | 9/2012 | Markham et al. |
| 8,275,830 B2 | 9/2012 | Raleigh |
| D668,650 S | 10/2012 | Han |
| D668,651 S | 10/2012 | Kim et al. |
| D668,652 S | 10/2012 | Kim et al. |
| D669,469 S | 10/2012 | Kang |
| D670,692 S | 11/2012 | Akana et al. |
| D671,514 S | 11/2012 | Kim et al. |
| 8,311,526 B2 | 11/2012 | Forstall et al. |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji et al. |
| 8,335,854 B2 | 12/2012 | Eldering |
| 8,336,010 B1 | 12/2012 | Chang et al. |
| D673,561 S | 1/2013 | Hyun et al. |
| D673,948 S | 1/2013 | Andre et al. |
| D673,950 S | 1/2013 | Li et al. |
| D674,369 S | 1/2013 | Jaewoong |
| D675,203 S | 1/2013 | Yang |
| 8,350,694 B1 | 1/2013 | Trundle et al. |
| 8,363,791 B2 | 1/2013 | Gupta et al. |
| D675,588 S | 2/2013 | Park |
| D675,612 S | 2/2013 | Andre et al. |
| D676,443 S | 2/2013 | Canizares et al. |
| D676,819 S | 2/2013 | Choi |
| 8,373,313 B2 | 2/2013 | Garcia et al. |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |
| 8,396,766 B1 | 3/2013 | Enright et al. |
| 8,400,767 B2 | 3/2013 | Yeom et al. |
| D679,706 S | 4/2013 | Tang et al. |
| D680,151 S | 4/2013 | Katori |
| D680,524 S | 4/2013 | Feng et al. |
| D681,032 S | 4/2013 | Akana et al. |
| 8,413,204 B2 | 4/2013 | White et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn et al. |
| D684,553 S | 6/2013 | Kim et al. |
| D684,968 S | 6/2013 | Smith et al. |
| 8,456,293 B1 | 6/2013 | Trundle et al. |
| 8,473,619 B2 | 6/2013 | Baum et al. |
| D685,778 S | 7/2013 | Fahrendorff et al. |
| D685,783 S | 7/2013 | Bryan et al. |
| 8,478,450 B2 | 7/2013 | Lu et al. |
| 8,478,844 B2 | 7/2013 | Baum et al. |
| 8,478,871 B2 | 7/2013 | Gutt et al. |
| 8,483,853 B1 | 7/2013 | Lambourne |
| 8,493,202 B1 | 7/2013 | Trundle et al. |
| 8,499,038 B1 | 7/2013 | Vucurevich |
| 8,520,068 B2 | 8/2013 | Naidoo et al. |
| 8,520,072 B1 | 8/2013 | Slavin et al. |
| 8,525,664 B2 | 9/2013 | Hadizad et al. |
| 8,543,665 B2 | 9/2013 | Ansari et al. |
| D692,042 S | 10/2013 | Dawes et al. |
| 8,554,478 B2 | 10/2013 | Hartman |
| 8,560,041 B2 | 10/2013 | Flaherty et al. |
| 8,570,993 B2 | 10/2013 | Austin et al. |
| 8,584,199 B1 | 11/2013 | Chen et al. |
| 8,595,377 B1 | 11/2013 | Apgar et al. |
| D695,735 S | 12/2013 | Kitchen et al. |
| 8,599,018 B2 | 12/2013 | Kellen et al. |
| 8,612,591 B2 | 12/2013 | Dawes et al. |
| 8,619,136 B2 | 12/2013 | Howarter et al. |
| 8,634,533 B2 | 1/2014 | Strasters |
| 8,635,350 B2 | 1/2014 | Gutt et al. |
| 8,635,499 B2 | 1/2014 | Cohn et al. |
| 8,638,211 B2 | 1/2014 | Cohn et al. |
| 8,649,386 B2 | 2/2014 | Ansari et al. |
| 8,650,320 B1 | 2/2014 | Merrick et al. |
| 8,666,560 B2 | 3/2014 | Lu et al. |
| 8,675,071 B1 | 3/2014 | Slavin et al. |
| 8,700,769 B2 | 4/2014 | Alexander et al. |
| 8,704,821 B2 | 4/2014 | Kulkarni et al. |
| 8,713,132 B2 | 4/2014 | Baum et al. |
| 8,723,671 B2 | 5/2014 | Foisy et al. |
| 8,730,834 B2 | 5/2014 | Marusca et al. |
| 8,738,765 B2 | 5/2014 | Wyatt et al. |
| 8,812,654 B2 | 8/2014 | Gelvin et al. |
| 8,817,809 B2 | 8/2014 | Gage |
| 8,819,178 B2 | 8/2014 | Baum et al. |
| 8,825,871 B2 | 9/2014 | Baum et al. |
| 8,832,244 B2 | 9/2014 | Gelvin et al. |
| 8,836,467 B1 | 9/2014 | Cohn et al. |
| 8,868,678 B2 | 10/2014 | Hildreth et al. |
| 8,885,552 B2 | 11/2014 | Bedingfield et al. |
| 8,902,740 B2 | 12/2014 | Hicks, III |
| 8,914,526 B1 | 12/2014 | Lindquist et al. |
| 8,914,837 B2 | 12/2014 | Ahmed et al. |
| 8,935,236 B2 | 1/2015 | Morita et al. |
| 8,937,539 B2 | 1/2015 | Sharma et al. |
| 8,937,658 B2 | 1/2015 | Hicks et al. |
| 8,953,479 B2 | 2/2015 | Hall et al. |
| 8,953,749 B2 | 2/2015 | Naidoo et al. |

(56) References Cited

U.S. PATENT DOCUMENTS

| | | |
|---|---|---|
| 8,963,713 B2 | 2/2015 | Dawes et al. |
| 8,976,763 B2 | 3/2015 | Shrestha et al. |
| 8,983,534 B2 | 3/2015 | Patel |
| 8,988,217 B2 | 3/2015 | Piccolo, III |
| 8,988,221 B2 | 3/2015 | Raji et al. |
| 8,989,922 B2 | 3/2015 | Jones et al. |
| 8,996,665 B2 | 3/2015 | Baum et al. |
| 9,047,753 B2 | 6/2015 | Dawes et al. |
| 9,059,863 B2 | 6/2015 | Baum et al. |
| 9,064,394 B1 | 6/2015 | Trundle |
| 9,094,407 B1 | 7/2015 | Matthieu et al. |
| 9,100,446 B2 | 8/2015 | Cohn et al. |
| 9,141,276 B2 | 9/2015 | Dawes et al. |
| 9,144,143 B2 | 9/2015 | Raji et al. |
| 9,146,548 B2 | 9/2015 | Chambers et al. |
| 9,147,337 B2 | 9/2015 | Cohn et al. |
| 9,160,784 B2 | 10/2015 | Jeong et al. |
| 9,164,669 B1 | 10/2015 | Yaksick et al. |
| 9,170,707 B1 | 10/2015 | Laska et al. |
| 9,172,532 B1 | 10/2015 | Fuller et al. |
| 9,172,533 B2 | 10/2015 | Fielder |
| 9,172,553 B2 | 10/2015 | Dawes et al. |
| 9,172,605 B2 | 10/2015 | Hardy et al. |
| 9,189,934 B2 | 11/2015 | Jentoft et al. |
| 9,191,228 B2 | 11/2015 | Fulker et al. |
| 9,202,362 B2 | 12/2015 | Hyland et al. |
| 9,246,921 B1 | 1/2016 | Vlaminck et al. |
| 9,286,772 B2 | 3/2016 | Shapiro et al. |
| 9,287,727 B1 | 3/2016 | Egan |
| 9,300,921 B2 | 3/2016 | Naidoo et al. |
| 9,306,809 B2 | 4/2016 | Dawes et al. |
| 9,310,864 B1 | 4/2016 | Klein et al. |
| 9,373,014 B1 | 6/2016 | Mehranfar |
| 9,412,248 B1 | 8/2016 | Cohn et al. |
| 9,426,720 B2 | 8/2016 | Cohn et al. |
| 9,450,776 B2 | 9/2016 | Baum et al. |
| 9,462,041 B1 | 10/2016 | Hagins et al. |
| 9,510,065 B2 | 11/2016 | Cohn et al. |
| 9,529,344 B1 | 12/2016 | Hagins et al. |
| 9,531,593 B2 | 12/2016 | Baum et al. |
| 9,553,738 B2 | 1/2017 | Meenan et al. |
| 9,600,945 B2 | 3/2017 | Naidoo et al. |
| 9,609,003 B1 | 3/2017 | Chmielewski et al. |
| 9,613,524 B1 | 4/2017 | Lamb et al. |
| 9,621,408 B2 | 4/2017 | Gutt et al. |
| 9,674,199 B2 | 6/2017 | Vlaminck et al. |
| 9,721,461 B2 | 8/2017 | Zeng et al. |
| 9,729,342 B2 | 8/2017 | Cohn et al. |
| 9,761,123 B2 | 9/2017 | Ramasubbu et al. |
| 9,779,595 B2 | 10/2017 | Thibault |
| 9,805,587 B2 | 10/2017 | Lamb |
| 9,819,911 B2 | 11/2017 | K V et al. |
| 9,824,234 B2 | 11/2017 | Cho et al. |
| 9,843,458 B2 | 12/2017 | Cronin |
| 9,876,651 B2 | 1/2018 | Cho et al. |
| 9,882,985 B1 | 1/2018 | Esam et al. |
| 9,978,238 B2 | 5/2018 | Fadell et al. |
| 9,979,625 B2 | 5/2018 | McLaughlin et al. |
| 10,002,507 B2 | 6/2018 | Wilson et al. |
| 10,025,473 B2 | 7/2018 | Sarao et al. |
| 10,051,078 B2 | 8/2018 | Burd et al. |
| 10,062,245 B2 | 8/2018 | Fulker et al. |
| 10,062,273 B2 | 8/2018 | Raji et al. |
| 10,078,958 B2 | 9/2018 | Cohn et al. |
| 10,079,839 B1 | 9/2018 | Bryan et al. |
| 10,108,272 B1 | 10/2018 | Debates et al. |
| 10,120,354 B1 | 11/2018 | Rolston et al. |
| 10,237,757 B2 | 3/2019 | Raleigh et al. |
| 10,257,474 B2 | 4/2019 | Nadathur et al. |
| 10,264,138 B2 | 4/2019 | Raleigh et al. |
| 10,354,517 B1 | 7/2019 | King |
| 10,380,873 B1 | 8/2019 | Halverson |
| 10,430,887 B1 | 10/2019 | Parker et al. |
| 10,687,270 B2 | 6/2020 | Atsushi |
| 10,782,681 B1 | 9/2020 | Slavin |
| 10,796,557 B2 | 10/2020 | Sundermeyer et al. |
| 10,868,712 B1 | 12/2020 | Hutz |
| 11,037,433 B2 | 6/2021 | Baum et al. |
| 11,132,888 B2 | 9/2021 | Cohn et al. |
| 11,175,793 B2 | 11/2021 | Fulker et al. |
| 11,184,322 B2 | 11/2021 | Dawes et al. |
| 11,194,320 B2 | 12/2021 | Cohn et al. |
| 11,201,755 B2 | 12/2021 | Dawes et al. |
| 11,223,998 B2 | 1/2022 | Cohn et al. |
| 11,417,159 B2 | 8/2022 | Li et al. |
| 2001/0012775 A1 | 8/2001 | Modzelesky et al. |
| 2001/0016501 A1 | 8/2001 | King |
| 2001/0022836 A1 | 9/2001 | Bremer et al. |
| 2001/0025349 A1 | 9/2001 | Sharood et al. |
| 2001/0029585 A1 | 10/2001 | Simon et al. |
| 2001/0030597 A1 | 10/2001 | Inoue et al. |
| 2001/0034209 A1 | 10/2001 | Tong et al. |
| 2001/0034754 A1 | 10/2001 | Elwahab et al. |
| 2001/0034759 A1 | 10/2001 | Chiles et al. |
| 2001/0036192 A1 | 11/2001 | Chiles et al. |
| 2001/0042137 A1 | 11/2001 | Ota et al. |
| 2001/0044835 A1 | 11/2001 | Schober et al. |
| 2001/0046366 A1 | 11/2001 | Susskind |
| 2001/0047474 A1 | 11/2001 | Takagi et al. |
| 2001/0048030 A1 | 12/2001 | Sharood et al. |
| 2001/0053207 A1 | 12/2001 | Jeon et al. |
| 2001/0054115 A1 | 12/2001 | Ferguson et al. |
| 2002/0000913 A1 | 1/2002 | Hamamoto et al. |
| 2002/0003575 A1 | 1/2002 | Marchese |
| 2002/0004828 A1 | 1/2002 | Davis et al. |
| 2002/0005894 A1 | 1/2002 | Foodman et al. |
| 2002/0016639 A1 | 2/2002 | Smith et al. |
| 2002/0018057 A1 | 2/2002 | Sano |
| 2002/0018478 A1 | 2/2002 | Takeyama et al. |
| 2002/0019751 A1 | 2/2002 | Rothschild et al. |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0028696 A1 | 3/2002 | Hirayama et al. |
| 2002/0031120 A1 | 3/2002 | Rakib |
| 2002/0032853 A1 | 3/2002 | Preston et al. |
| 2002/0035633 A1 | 3/2002 | Bose et al. |
| 2002/0037004 A1 | 3/2002 | Bossemeyer et al. |
| 2002/0038380 A1 | 3/2002 | Brawn et al. |
| 2002/0046280 A1 | 4/2002 | Fujita |
| 2002/0046301 A1 | 4/2002 | Shannon et al. |
| 2002/0052719 A1 | 5/2002 | Alexander et al. |
| 2002/0052913 A1 | 5/2002 | Yamada et al. |
| 2002/0055977 A1 | 5/2002 | Nishi |
| 2002/0059078 A1 | 5/2002 | Valdes et al. |
| 2002/0059148 A1 | 5/2002 | Rosenhaft et al. |
| 2002/0059637 A1 | 5/2002 | Rakib |
| 2002/0068558 A1 | 6/2002 | Janik |
| 2002/0068984 A1 | 6/2002 | Alexander et al. |
| 2002/0072868 A1 | 6/2002 | Bartone et al. |
| 2002/0075153 A1 | 6/2002 | Dahl |
| 2002/0080771 A1 | 6/2002 | Krumel |
| 2002/0083342 A1 | 6/2002 | Webb et al. |
| 2002/0085488 A1 | 7/2002 | Kobayashi |
| 2002/0091815 A1 | 7/2002 | Anderson et al. |
| 2002/0099809 A1 | 7/2002 | Lee |
| 2002/0099829 A1 | 7/2002 | Richards et al. |
| 2002/0099854 A1 | 7/2002 | Jorgensen |
| 2002/0101858 A1 | 8/2002 | Stuart et al. |
| 2002/0103898 A1 | 8/2002 | Moyer et al. |
| 2002/0103927 A1 | 8/2002 | Parent |
| 2002/0107910 A1 | 8/2002 | Zhao |
| 2002/0109580 A1 | 8/2002 | Shreve et al. |
| 2002/0111698 A1 | 8/2002 | Graziano et al. |
| 2002/0114439 A1 | 8/2002 | Dunlap |
| 2002/0116117 A1 | 8/2002 | Martens et al. |
| 2002/0119800 A1 | 8/2002 | Jaggers et al. |
| 2002/0120696 A1 | 8/2002 | Mousseau et al. |
| 2002/0120698 A1 | 8/2002 | Tamargo |
| 2002/0120790 A1 | 8/2002 | Schwalb |
| 2002/0126009 A1 | 9/2002 | Oyagi et al. |
| 2002/0128728 A1 | 9/2002 | Murakami et al. |
| 2002/0131404 A1 | 9/2002 | Mehta et al. |
| 2002/0133539 A1 | 9/2002 | Monday |

(56) References Cited

U.S. PATENT DOCUMENTS

| | | |
|---|---|---|
| 2002/0133578 A1 | 9/2002 | Wu |
| 2002/0136167 A1 | 9/2002 | Steele et al. |
| 2002/0143805 A1 | 10/2002 | Hayes et al. |
| 2002/0143923 A1 | 10/2002 | Alexander |
| 2002/0150086 A1 | 10/2002 | Bailey et al. |
| 2002/0152298 A1 | 10/2002 | Kikta et al. |
| 2002/0152432 A1 | 10/2002 | Fleming |
| 2002/0156564 A1 | 10/2002 | Preston et al. |
| 2002/0156899 A1 | 10/2002 | Sekiguchi |
| 2002/0161885 A1 | 10/2002 | Childers et al. |
| 2002/0163534 A1 | 11/2002 | Choi et al. |
| 2002/0163997 A1 | 11/2002 | Bergman et al. |
| 2002/0164953 A1 | 11/2002 | Curtis |
| 2002/0164997 A1 | 11/2002 | Parry |
| 2002/0165006 A1 | 11/2002 | Haller et al. |
| 2002/0166125 A1 | 11/2002 | Fulmer |
| 2002/0174367 A1 | 11/2002 | Kimmel et al. |
| 2002/0174434 A1 | 11/2002 | Lee et al. |
| 2002/0177428 A1 | 11/2002 | Menard et al. |
| 2002/0177482 A1 | 11/2002 | Cheong et al. |
| 2002/0178100 A1 | 11/2002 | Koveos |
| 2002/0178211 A1 | 11/2002 | Singhal et al. |
| 2002/0180579 A1 | 12/2002 | Nagaoka et al. |
| 2002/0184301 A1 | 12/2002 | Parent |
| 2002/0184527 A1 | 12/2002 | Chun et al. |
| 2002/0186683 A1 | 12/2002 | Buck et al. |
| 2002/0188723 A1 | 12/2002 | Choi et al. |
| 2002/0191636 A1 | 12/2002 | Hallenbeck |
| 2003/0004088 A1 | 1/2003 | Ushio et al. |
| 2003/0005030 A1 | 1/2003 | Sutton et al. |
| 2003/0006879 A1 | 1/2003 | Kang et al. |
| 2003/0009552 A1 | 1/2003 | Benfield et al. |
| 2003/0009553 A1 | 1/2003 | Benfield et al. |
| 2003/0010243 A1 | 1/2003 | Roller |
| 2003/0023839 A1 | 1/2003 | Burkhardt et al. |
| 2003/0025599 A1 | 2/2003 | Monroe |
| 2003/0028294 A1 | 2/2003 | Yanagi |
| 2003/0028398 A1 | 2/2003 | Yamashita et al. |
| 2003/0030548 A1 | 2/2003 | Kovacs et al. |
| 2003/0031165 A1 | 2/2003 | James |
| 2003/0038730 A1 | 2/2003 | Mafuku et al. |
| 2003/0038849 A1 | 2/2003 | Craven et al. |
| 2003/0039242 A1 | 2/2003 | Richard |
| 2003/0040813 A1 | 2/2003 | Gonzales et al. |
| 2003/0041137 A1 | 2/2003 | Horie et al. |
| 2003/0041167 A1 | 2/2003 | French et al. |
| 2003/0046557 A1 | 3/2003 | Miller et al. |
| 2003/0050731 A1 | 3/2003 | Rosenblum |
| 2003/0050737 A1 | 3/2003 | Robert |
| 2003/0051009 A1 | 3/2003 | Shah et al. |
| 2003/0051026 A1 | 3/2003 | Carter et al. |
| 2003/0052905 A1 | 3/2003 | Gordon et al. |
| 2003/0052923 A1 | 3/2003 | Porter |
| 2003/0056012 A1 | 3/2003 | Modeste et al. |
| 2003/0056014 A1 | 3/2003 | Verberkt et al. |
| 2003/0059005 A1 | 3/2003 | Meyerson et al. |
| 2003/0060900 A1 | 3/2003 | Lo et al. |
| 2003/0061344 A1 | 3/2003 | Monroe |
| 2003/0061621 A1 | 3/2003 | Petty et al. |
| 2003/0065757 A1 | 4/2003 | Mentze et al. |
| 2003/0065784 A1 | 4/2003 | Herrod |
| 2003/0065791 A1 | 4/2003 | Garg et al. |
| 2003/0067923 A1 | 4/2003 | Ju et al. |
| 2003/0069854 A1 | 4/2003 | Hsu et al. |
| 2003/0069948 A1 | 4/2003 | Ma et al. |
| 2003/0071724 A1 | 4/2003 | D Amico |
| 2003/0071840 A1 | 4/2003 | Huang et al. |
| 2003/0073406 A1 | 4/2003 | Benjamin et al. |
| 2003/0074090 A1 | 4/2003 | Becka et al. |
| 2003/0081768 A1 | 5/2003 | Caminschi |
| 2003/0084165 A1 | 5/2003 | Nellberg et al. |
| 2003/0090473 A1 | 5/2003 | Joshi |
| 2003/0096590 A1 | 5/2003 | Satoh |
| 2003/0101243 A1 | 5/2003 | Donahue et al. |
| 2003/0101459 A1 | 5/2003 | Edson |
| 2003/0103088 A1 | 6/2003 | Dresti et al. |
| 2003/0105850 A1 | 6/2003 | Lean et al. |
| 2003/0110262 A1 | 6/2003 | Hasan et al. |
| 2003/0110302 A1 | 6/2003 | Hodges et al. |
| 2003/0112866 A1 | 6/2003 | Yu et al. |
| 2003/0113100 A1 | 6/2003 | Hecht et al. |
| 2003/0115345 A1 | 6/2003 | Chien et al. |
| 2003/0120593 A1 | 6/2003 | Bansal et al. |
| 2003/0123419 A1 | 7/2003 | Rangnekar et al. |
| 2003/0123634 A1 | 7/2003 | Chee |
| 2003/0126236 A1 | 7/2003 | Marl et al. |
| 2003/0128114 A1 | 7/2003 | Quigley |
| 2003/0128115 A1 | 7/2003 | Giacopelli et al. |
| 2003/0132018 A1 | 7/2003 | Okita et al. |
| 2003/0134590 A1 | 7/2003 | Suda et al. |
| 2003/0137426 A1 | 7/2003 | Anthony et al. |
| 2003/0137991 A1 | 7/2003 | Doshi et al. |
| 2003/0147534 A1 | 8/2003 | Ablay et al. |
| 2003/0149671 A1 | 8/2003 | Yamamoto et al. |
| 2003/0153325 A1 | 8/2003 | Veerepalli et al. |
| 2003/0155757 A1 | 8/2003 | Larsen et al. |
| 2003/0158609 A1 | 8/2003 | Chiu |
| 2003/0158635 A1 | 8/2003 | Pillar et al. |
| 2003/0159135 A1 | 8/2003 | Hiller et al. |
| 2003/0163514 A1 | 8/2003 | Waldschmidt |
| 2003/0169728 A1 | 9/2003 | Choi |
| 2003/0172145 A1 | 9/2003 | Nguyen |
| 2003/0174051 A1 | 9/2003 | Naitou |
| 2003/0174154 A1 | 9/2003 | Yukie et al. |
| 2003/0174648 A1 | 9/2003 | Wang et al. |
| 2003/0174717 A1 | 9/2003 | Zabarski et al. |
| 2003/0177236 A1 | 9/2003 | Goto et al. |
| 2003/0182396 A1 | 9/2003 | Reich et al. |
| 2003/0182640 A1 | 9/2003 | Alani et al. |
| 2003/0184436 A1 | 10/2003 | Seales et al. |
| 2003/0187920 A1 | 10/2003 | Redkar |
| 2003/0187938 A1 | 10/2003 | Mousseau et al. |
| 2003/0189509 A1 | 10/2003 | Hayes et al. |
| 2003/0193991 A1 | 10/2003 | Lansford |
| 2003/0196115 A1 | 10/2003 | Karp |
| 2003/0197847 A1 | 10/2003 | Shinoda |
| 2003/0198938 A1 | 10/2003 | Murray et al. |
| 2003/0200325 A1 | 10/2003 | Krishnaswamy et al. |
| 2003/0201889 A1 | 10/2003 | Zulkowski |
| 2003/0208610 A1 | 11/2003 | Rochetti et al. |
| 2003/0210126 A1 | 11/2003 | Kanazawa |
| 2003/0214775 A1 | 11/2003 | Fukuta et al. |
| 2003/0216143 A1 | 11/2003 | Roese et al. |
| 2003/0217136 A1 | 11/2003 | Cho et al. |
| 2003/0225883 A1 | 12/2003 | Greaves et al. |
| 2003/0227382 A1 | 12/2003 | Breed |
| 2003/0227439 A1 | 12/2003 | Lee et al. |
| 2003/0229779 A1 | 12/2003 | Morais et al. |
| 2003/0230934 A1 | 12/2003 | Cordelli et al. |
| 2003/0233155 A1 | 12/2003 | Slemmer et al. |
| 2003/0233332 A1 | 12/2003 | Keeler et al. |
| 2003/0233429 A1 | 12/2003 | Matte et al. |
| 2003/0233549 A1 | 12/2003 | Hatakeyama et al. |
| 2003/0233583 A1 | 12/2003 | Carley |
| 2003/0233594 A1 | 12/2003 | Earl |
| 2003/0236841 A1 | 12/2003 | Epshteyn |
| 2004/0003051 A1 | 1/2004 | Krzyzanowski et al. |
| 2004/0003241 A1 | 1/2004 | Sengodan et al. |
| 2004/0005039 A1 | 1/2004 | White et al. |
| 2004/0008724 A1 | 1/2004 | Devine et al. |
| 2004/0015572 A1 | 1/2004 | Kang |
| 2004/0034697 A1 | 2/2004 | Fairhurst et al. |
| 2004/0034798 A1 | 2/2004 | Yamada et al. |
| 2004/0036615 A1 | 2/2004 | Candela |
| 2004/0037295 A1 | 2/2004 | Tanaka et al. |
| 2004/0039459 A1 | 2/2004 | Daugherty et al. |
| 2004/0049321 A1 | 3/2004 | Lehr et al. |
| 2004/0054789 A1 | 3/2004 | Breh et al. |
| 2004/0056665 A1 | 3/2004 | Iwanaga et al. |
| 2004/0064351 A1 | 4/2004 | Mikurak |
| 2004/0068583 A1 | 4/2004 | Monroe et al. |
| 2004/0068657 A1 | 4/2004 | Alexander et al. |
| 2004/0068668 A1 | 4/2004 | Lor et al. |
| 2004/0075738 A1 | 4/2004 | Burke et al. |

(56) References Cited

U.S. PATENT DOCUMENTS

| | | |
|---|---|---|
| 2004/0078825 A1 | 4/2004 | Murphy |
| 2004/0083015 A1 | 4/2004 | Patwari |
| 2004/0086093 A1 | 5/2004 | Schranz |
| 2004/0093492 A1 | 5/2004 | Daude et al. |
| 2004/0095943 A1 | 5/2004 | Korotin |
| 2004/0102859 A1 | 5/2004 | Bennett |
| 2004/0103308 A1 | 5/2004 | Paller |
| 2004/0107027 A1 | 6/2004 | Boudrieau |
| 2004/0107299 A1 | 6/2004 | Lee et al. |
| 2004/0111294 A1 | 6/2004 | McNally et al. |
| 2004/0113770 A1 | 6/2004 | Falk et al. |
| 2004/0113778 A1 | 6/2004 | Script et al. |
| 2004/0113937 A1 | 6/2004 | Sawdey et al. |
| 2004/0117068 A1 | 6/2004 | Lee |
| 2004/0117330 A1 | 6/2004 | Ehlers et al. |
| 2004/0117462 A1 | 6/2004 | Bodin et al. |
| 2004/0117465 A1 | 6/2004 | Bodin et al. |
| 2004/0125146 A1 | 7/2004 | Gerlach et al. |
| 2004/0125782 A1 | 7/2004 | Chang |
| 2004/0125931 A1 | 7/2004 | Archer |
| 2004/0133689 A1 | 7/2004 | Vasisht |
| 2004/0136386 A1 | 7/2004 | Miller et al. |
| 2004/0137915 A1 | 7/2004 | Diener et al. |
| 2004/0139227 A1 | 7/2004 | Takeda |
| 2004/0143428 A1 | 7/2004 | Rappaport et al. |
| 2004/0143602 A1 | 7/2004 | Ruiz et al. |
| 2004/0143749 A1 | 7/2004 | Tajalli et al. |
| 2004/0153171 A1 | 8/2004 | Brandt et al. |
| 2004/0155757 A1 | 8/2004 | Litwin et al. |
| 2004/0160309 A1 | 8/2004 | Stilp |
| 2004/0163073 A1 | 8/2004 | Krzyzanowski et al. |
| 2004/0163118 A1 | 8/2004 | Mottur |
| 2004/0163705 A1 | 8/2004 | Uhler |
| 2004/0169288 A1 | 9/2004 | Hsieh et al. |
| 2004/0170120 A1 | 9/2004 | Reunamaki et al. |
| 2004/0170155 A1 | 9/2004 | Omar et al. |
| 2004/0172657 A1 | 9/2004 | Phillips et al. |
| 2004/0177163 A1 | 9/2004 | Casey et al. |
| 2004/0181693 A1 | 9/2004 | Milliot et al. |
| 2004/0183756 A1 | 9/2004 | Freitas et al. |
| 2004/0189471 A1 | 9/2004 | Ciarcia et al. |
| 2004/0189871 A1 | 9/2004 | Kurosawa et al. |
| 2004/0196844 A1 | 10/2004 | Hagino |
| 2004/0198386 A1 | 10/2004 | Dupray |
| 2004/0199645 A1 | 10/2004 | Rouhi |
| 2004/0201472 A1 | 10/2004 | McGunn et al. |
| 2004/0202351 A1 | 10/2004 | Park et al. |
| 2004/0204806 A1 | 10/2004 | Chen et al. |
| 2004/0212494 A1 | 10/2004 | Stilp |
| 2004/0212687 A1 | 10/2004 | Patwari |
| 2004/0213150 A1 | 10/2004 | Krause et al. |
| 2004/0215694 A1 | 10/2004 | Podolsky |
| 2004/0215700 A1 | 10/2004 | Shenfield et al. |
| 2004/0215750 A1 | 10/2004 | Stilp |
| 2004/0215955 A1 | 10/2004 | Tamai et al. |
| 2004/0218591 A1 | 11/2004 | Ogawa et al. |
| 2004/0220830 A1 | 11/2004 | Moreton et al. |
| 2004/0223605 A1 | 11/2004 | Donnelly |
| 2004/0225516 A1 | 11/2004 | Bruskotter et al. |
| 2004/0225719 A1 | 11/2004 | Kisley et al. |
| 2004/0225878 A1 | 11/2004 | Costa-Requena et al. |
| 2004/0229569 A1 | 11/2004 | Franz |
| 2004/0243714 A1 | 12/2004 | Wynn et al. |
| 2004/0243835 A1 | 12/2004 | Terzis et al. |
| 2004/0243996 A1 | 12/2004 | Sheehy et al. |
| 2004/0246339 A1 | 12/2004 | Doshima et al. |
| 2004/0249613 A1 | 12/2004 | Sprogis et al. |
| 2004/0249922 A1 | 12/2004 | Hackman et al. |
| 2004/0253926 A1 | 12/2004 | Gross |
| 2004/0257433 A1 | 12/2004 | Lia et al. |
| 2004/0258032 A1 | 12/2004 | Kawamura |
| 2004/0260407 A1 | 12/2004 | Wimsatt |
| 2004/0260527 A1 | 12/2004 | Stanculescu |
| 2004/0263314 A1 | 12/2004 | Dorai et al. |
| 2004/0263625 A1 | 12/2004 | Ishigami et al. |
| 2004/0263626 A1 | 12/2004 | Piccionelli |
| 2004/0266493 A1 | 12/2004 | Bahl et al. |
| 2004/0267385 A1 | 12/2004 | Lingemann |
| 2004/0267937 A1 | 12/2004 | Klemets |
| 2004/0268298 A1 | 12/2004 | Miller et al. |
| 2005/0002335 A1 | 1/2005 | Adamczyk et al. |
| 2005/0002408 A1 | 1/2005 | Lee |
| 2005/0002417 A1 | 1/2005 | Kelly et al. |
| 2005/0007967 A1 | 1/2005 | Keskar et al. |
| 2005/0010866 A1 | 1/2005 | Humpleman et al. |
| 2005/0015458 A1 | 1/2005 | La |
| 2005/0015805 A1 | 1/2005 | Ryuichi |
| 2005/0021309 A1 | 1/2005 | Alexander et al. |
| 2005/0021626 A1 | 1/2005 | Prajapat et al. |
| 2005/0021826 A1 | 1/2005 | Kumar |
| 2005/0022210 A1 | 1/2005 | Zintel et al. |
| 2005/0023858 A1 | 2/2005 | Bingle et al. |
| 2005/0024203 A1 | 2/2005 | Wolfe |
| 2005/0027881 A1 | 2/2005 | Figueira et al. |
| 2005/0030928 A1 | 2/2005 | Virtanen et al. |
| 2005/0031108 A1 | 2/2005 | Eshun et al. |
| 2005/0033513 A1 | 2/2005 | Gasbarro |
| 2005/0038325 A1 | 2/2005 | Moll |
| 2005/0038326 A1 | 2/2005 | Mathur |
| 2005/0044061 A1 | 2/2005 | Klemow |
| 2005/0048957 A1 | 3/2005 | Casey et al. |
| 2005/0049746 A1 | 3/2005 | Rosenblum |
| 2005/0050214 A1 | 3/2005 | Nishiyama et al. |
| 2005/0052831 A1 | 3/2005 | Chen |
| 2005/0055575 A1 | 3/2005 | Evans et al. |
| 2005/0055716 A1 | 3/2005 | Louie et al. |
| 2005/0057361 A1 | 3/2005 | Giraldo et al. |
| 2005/0060163 A1 | 3/2005 | Barsness et al. |
| 2005/0060411 A1 | 3/2005 | Coulombe et al. |
| 2005/0066045 A1 | 3/2005 | Johnson et al. |
| 2005/0066912 A1 | 3/2005 | Korbitz et al. |
| 2005/0069098 A1 | 3/2005 | Kalervo et al. |
| 2005/0071483 A1 | 3/2005 | Motoyama |
| 2005/0075764 A1 | 4/2005 | Horst et al. |
| 2005/0079855 A1 | 4/2005 | Jethi et al. |
| 2005/0079863 A1 | 4/2005 | Macaluso |
| 2005/0081161 A1 | 4/2005 | MacInnes et al. |
| 2005/0086093 A1 | 4/2005 | Hammad et al. |
| 2005/0086126 A1 | 4/2005 | Patterson |
| 2005/0086211 A1 | 4/2005 | Mayer |
| 2005/0086366 A1 | 4/2005 | Luebke et al. |
| 2005/0088983 A1 | 4/2005 | Wesslen et al. |
| 2005/0089023 A1 | 4/2005 | Barkley et al. |
| 2005/0090915 A1 | 4/2005 | Geiwitz |
| 2005/0091435 A1 | 4/2005 | Han et al. |
| 2005/0091696 A1 | 4/2005 | Wolfe et al. |
| 2005/0096753 A1 | 5/2005 | Arling et al. |
| 2005/0101314 A1 | 5/2005 | Levi |
| 2005/0102152 A1 | 5/2005 | Hodges |
| 2005/0102497 A1 | 5/2005 | Buer |
| 2005/0105530 A1 | 5/2005 | Kono |
| 2005/0108091 A1 | 5/2005 | Sotak et al. |
| 2005/0108369 A1 | 5/2005 | Sather et al. |
| 2005/0111660 A1 | 5/2005 | Hosoda |
| 2005/0114432 A1 | 5/2005 | Hodges et al. |
| 2005/0114528 A1 | 5/2005 | Suito |
| 2005/0114900 A1 | 5/2005 | Ladd et al. |
| 2005/0117602 A1 | 6/2005 | Carrigan et al. |
| 2005/0117732 A1 | 6/2005 | Arpin |
| 2005/0119767 A1 | 6/2005 | Kiwimagi et al. |
| 2005/0119913 A1 | 6/2005 | Hornreich et al. |
| 2005/0120082 A1 | 6/2005 | Hesselink et al. |
| 2005/0125083 A1 | 6/2005 | Kiko |
| 2005/0128083 A1 | 6/2005 | Puzio et al. |
| 2005/0128093 A1 | 6/2005 | Genova et al. |
| 2005/0128314 A1 | 6/2005 | Ishino |
| 2005/0144044 A1 | 6/2005 | Godschall et al. |
| 2005/0144312 A1 | 6/2005 | Kadyk et al. |
| 2005/0144645 A1 | 6/2005 | Casey et al. |
| 2005/0148356 A1 | 7/2005 | Ferguson et al. |
| 2005/0149639 A1 | 7/2005 | Vrielink et al. |
| 2005/0149746 A1 | 7/2005 | Lu et al. |
| 2005/0154494 A1 | 7/2005 | Ahmed |
| 2005/0154774 A1 | 7/2005 | Giaffreda et al. |

(56) References Cited

U.S. PATENT DOCUMENTS

| | | |
|---|---|---|
| 2005/0155757 A1 | 7/2005 | Paton |
| 2005/0156568 A1 | 7/2005 | Yueh |
| 2005/0156737 A1 | 7/2005 | Al-Khateeb |
| 2005/0159823 A1 | 7/2005 | Hayes et al. |
| 2005/0159911 A1 | 7/2005 | Funk et al. |
| 2005/0169288 A1 | 8/2005 | Kamiwada et al. |
| 2005/0177515 A1 | 8/2005 | Kalavade et al. |
| 2005/0179531 A1 | 8/2005 | Tabe |
| 2005/0181196 A1 | 8/2005 | Aylward et al. |
| 2005/0182681 A1 | 8/2005 | Bruskotter et al. |
| 2005/0184865 A1 | 8/2005 | Han |
| 2005/0185618 A1 | 8/2005 | Friday et al. |
| 2005/0187677 A1 | 8/2005 | Walker |
| 2005/0188315 A1 | 8/2005 | Campbell et al. |
| 2005/0197847 A1 | 9/2005 | Smith |
| 2005/0198216 A1 | 9/2005 | Behera et al. |
| 2005/0200474 A1 | 9/2005 | Behnke |
| 2005/0204076 A1 | 9/2005 | Cumpson et al. |
| 2005/0207429 A1 | 9/2005 | Akita et al. |
| 2005/0216302 A1 | 9/2005 | Raji et al. |
| 2005/0220123 A1 | 10/2005 | Wybenga et al. |
| 2005/0222933 A1 | 10/2005 | Wesby |
| 2005/0229016 A1 | 10/2005 | Addy |
| 2005/0232242 A1 | 10/2005 | Karaoguz et al. |
| 2005/0232284 A1 | 10/2005 | Karaoguz et al. |
| 2005/0234568 A1 | 10/2005 | Chung et al. |
| 2005/0237182 A1 | 10/2005 | Wang |
| 2005/0246119 A1 | 11/2005 | Koodali |
| 2005/0246408 A1 | 11/2005 | Chung |
| 2005/0249199 A1 | 11/2005 | Albert et al. |
| 2005/0253709 A1 | 11/2005 | Baker |
| 2005/0256608 A1 | 11/2005 | King et al. |
| 2005/0257013 A1 | 11/2005 | Ma |
| 2005/0257260 A1 | 11/2005 | Lenoir et al. |
| 2005/0259673 A1 | 11/2005 | Lu et al. |
| 2005/0262241 A1 | 11/2005 | Gubbi et al. |
| 2005/0266826 A1 | 12/2005 | Vlad |
| 2005/0267605 A1 | 12/2005 | Lee et al. |
| 2005/0270151 A1 | 12/2005 | Winick |
| 2005/0273831 A1 | 12/2005 | Slomovich et al. |
| 2005/0276389 A1 | 12/2005 | Hinkson et al. |
| 2005/0277434 A1 | 12/2005 | Tuomi et al. |
| 2005/0280964 A1 | 12/2005 | Richmond et al. |
| 2005/0281196 A1 | 12/2005 | Tornetta et al. |
| 2005/0282557 A1 | 12/2005 | Mikko et al. |
| 2005/0285934 A1 | 12/2005 | Carter |
| 2005/0285941 A1 | 12/2005 | Haigh et al. |
| 2005/0286518 A1 | 12/2005 | Park et al. |
| 2006/0007005 A1 | 1/2006 | Yui et al. |
| 2006/0009863 A1 | 1/2006 | Lingemann |
| 2006/0015943 A1 | 1/2006 | Mahieu |
| 2006/0018328 A1 | 1/2006 | Mody et al. |
| 2006/0018479 A1 | 1/2006 | Chen |
| 2006/0022816 A1 | 2/2006 | Yukawa |
| 2006/0023847 A1 | 2/2006 | Tyroler et al. |
| 2006/0026017 A1 | 2/2006 | Walker |
| 2006/0026301 A1 | 2/2006 | Maeda et al. |
| 2006/0028997 A1 | 2/2006 | Mcfarland |
| 2006/0031426 A1 | 2/2006 | Mesarina et al. |
| 2006/0031436 A1 | 2/2006 | Sakata et al. |
| 2006/0031852 A1 | 2/2006 | Chu et al. |
| 2006/0036750 A1 | 2/2006 | Ladd et al. |
| 2006/0041655 A1 | 2/2006 | Holloway et al. |
| 2006/0045074 A1 | 3/2006 | Lee |
| 2006/0050692 A1 | 3/2006 | Petrescu et al. |
| 2006/0050862 A1 | 3/2006 | Shen et al. |
| 2006/0051122 A1 | 3/2006 | Kawazu et al. |
| 2006/0052884 A1 | 3/2006 | Staples et al. |
| 2006/0053447 A1 | 3/2006 | Krzyzanowski et al. |
| 2006/0053459 A1 | 3/2006 | Simerly et al. |
| 2006/0053491 A1 | 3/2006 | Khuti et al. |
| 2006/0058923 A1 | 3/2006 | Kruk et al. |
| 2006/0063534 A1 | 3/2006 | Kokkonen et al. |
| 2006/0064305 A1 | 3/2006 | Alonso |
| 2006/0064478 A1 | 3/2006 | Sirkin |
| 2006/0067344 A1 | 3/2006 | Sakurai |
| 2006/0067356 A1 | 3/2006 | Kim et al. |
| 2006/0067484 A1 | 3/2006 | Elliot et al. |
| 2006/0071773 A1 | 4/2006 | Ahmed et al. |
| 2006/0072470 A1 | 4/2006 | Moore et al. |
| 2006/0075235 A1 | 4/2006 | Renkis |
| 2006/0077254 A1 | 4/2006 | Shu et al. |
| 2006/0078344 A1 | 4/2006 | Kawazu et al. |
| 2006/0080380 A1 | 4/2006 | Aizu et al. |
| 2006/0080465 A1 | 4/2006 | Conzola et al. |
| 2006/0082651 A1 | 4/2006 | Hirafuji et al. |
| 2006/0088092 A1 | 4/2006 | Chen et al. |
| 2006/0092955 A1 | 5/2006 | Durbin et al. |
| 2006/0093365 A1 | 5/2006 | Dybsetter et al. |
| 2006/0094400 A1 | 5/2006 | Beachem et al. |
| 2006/0101062 A1 | 5/2006 | Godman et al. |
| 2006/0103510 A1 | 5/2006 | Chen et al. |
| 2006/0104312 A1 | 5/2006 | Friar |
| 2006/0105713 A1 | 5/2006 | Zheng et al. |
| 2006/0106933 A1 | 5/2006 | Huang et al. |
| 2006/0109113 A1 | 5/2006 | Reyes et al. |
| 2006/0109860 A1 | 5/2006 | Matsunaga et al. |
| 2006/0109966 A1 | 5/2006 | Sasakura et al. |
| 2006/0111095 A1 | 5/2006 | Weigand |
| 2006/0114842 A1 | 6/2006 | Miyamoto et al. |
| 2006/0121924 A1 | 6/2006 | Rengaraju et al. |
| 2006/0122774 A1 | 6/2006 | Nou |
| 2006/0123212 A1 | 6/2006 | Yagawa |
| 2006/0129837 A1 | 6/2006 | Im et al. |
| 2006/0130004 A1 | 6/2006 | Hughes et al. |
| 2006/0132302 A1 | 6/2006 | Stilp |
| 2006/0133412 A1 | 6/2006 | Callaghan |
| 2006/0136558 A1 | 6/2006 | Sheehan et al. |
| 2006/0142968 A1 | 6/2006 | Han et al. |
| 2006/0142978 A1 | 6/2006 | Suenbuel et al. |
| 2006/0143268 A1 | 6/2006 | Chatani |
| 2006/0145842 A1 | 7/2006 | Stilp |
| 2006/0153122 A1 | 7/2006 | Hinman et al. |
| 2006/0154642 A1 | 7/2006 | Scannell |
| 2006/0155851 A1 | 7/2006 | Ma et al. |
| 2006/0159032 A1 | 7/2006 | Ukrainetz et al. |
| 2006/0161270 A1 | 7/2006 | Luskin et al. |
| 2006/0161662 A1 | 7/2006 | Ng et al. |
| 2006/0161960 A1 | 7/2006 | Benoit |
| 2006/0167784 A1 | 7/2006 | Hoffberg |
| 2006/0167919 A1 | 7/2006 | Hsieh |
| 2006/0168013 A1 | 7/2006 | Wilson et al. |
| 2006/0168095 A1 | 7/2006 | Sharma et al. |
| 2006/0168178 A1 | 7/2006 | Hwang et al. |
| 2006/0168190 A1 | 7/2006 | Johan et al. |
| 2006/0171307 A1 | 8/2006 | Gopalakrishnan et al. |
| 2006/0176146 A1 | 8/2006 | Krishan et al. |
| 2006/0176167 A1 | 8/2006 | Dohrmann |
| 2006/0181406 A1 | 8/2006 | Petite et al. |
| 2006/0182100 A1 | 8/2006 | Li et al. |
| 2006/0187900 A1 | 8/2006 | Akbar |
| 2006/0189311 A1 | 8/2006 | Cromer et al. |
| 2006/0190458 A1 | 8/2006 | Mishina et al. |
| 2006/0190529 A1 | 8/2006 | Morozumi et al. |
| 2006/0197660 A1 | 9/2006 | Luebke et al. |
| 2006/0200845 A1 | 9/2006 | Foster et al. |
| 2006/0206220 A1 | 9/2006 | Amundson |
| 2006/0206246 A1 | 9/2006 | Walker |
| 2006/0208872 A1 | 9/2006 | Yu et al. |
| 2006/0208880 A1 | 9/2006 | Funk et al. |
| 2006/0209857 A1 | 9/2006 | Hicks |
| 2006/0215650 A1 | 9/2006 | Wollmershauser et al. |
| 2006/0217115 A1 | 9/2006 | Cassett et al. |
| 2006/0218244 A1 | 9/2006 | Rasmussen et al. |
| 2006/0218593 A1 | 9/2006 | Afshary et al. |
| 2006/0221184 A1 | 10/2006 | Vallone et al. |
| 2006/0222153 A1 | 10/2006 | Tarkoff et al. |
| 2006/0226972 A1 | 10/2006 | Smith |
| 2006/0229746 A1 | 10/2006 | Ollis et al. |
| 2006/0230270 A1 | 10/2006 | Goffin |
| 2006/0233372 A1 | 10/2006 | Shaheen et al. |
| 2006/0235963 A1 | 10/2006 | Wetherly et al. |
| 2006/0236050 A1 | 10/2006 | Sugimoto et al. |
| 2006/0238372 A1 | 10/2006 | Jung et al. |

(56) References Cited

U.S. PATENT DOCUMENTS

| | | |
|---|---|---|
| 2006/0238617 A1 | 10/2006 | Tamir |
| 2006/0242395 A1 | 10/2006 | Fausak |
| 2006/0244589 A1 | 11/2006 | Schranz |
| 2006/0245369 A1 | 11/2006 | Schimmelpfeng et al. |
| 2006/0246886 A1 | 11/2006 | Benco et al. |
| 2006/0246919 A1 | 11/2006 | Park et al. |
| 2006/0250235 A1 | 11/2006 | Astrin |
| 2006/0250578 A1 | 11/2006 | Pohl et al. |
| 2006/0251255 A1 | 11/2006 | Batta |
| 2006/0258342 A1 | 11/2006 | Fok et al. |
| 2006/0259951 A1 | 11/2006 | Forssell et al. |
| 2006/0265489 A1 | 11/2006 | Moore |
| 2006/0271695 A1 | 11/2006 | Lavian |
| 2006/0274764 A1 | 12/2006 | Mah et al. |
| 2006/0281435 A1 | 12/2006 | Shearer et al. |
| 2006/0282886 A1 | 12/2006 | Gaug |
| 2006/0288288 A1 | 12/2006 | Girgensohn et al. |
| 2006/0291507 A1 | 12/2006 | Sarosi et al. |
| 2006/0293100 A1 | 12/2006 | Walter |
| 2006/0294565 A1 | 12/2006 | Walter |
| 2007/0001818 A1 | 1/2007 | Small et al. |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0008099 A1 | 1/2007 | Kimmel et al. |
| 2007/0014248 A1 | 1/2007 | Fowlow |
| 2007/0027987 A1 | 2/2007 | Tripp et al. |
| 2007/0043478 A1 | 2/2007 | Ehlers et al. |
| 2007/0043954 A1 | 2/2007 | Fox |
| 2007/0046462 A1 | 3/2007 | Fancella |
| 2007/0047585 A1 | 3/2007 | Gillespie et al. |
| 2007/0052675 A1 | 3/2007 | Chang |
| 2007/0055770 A1 | 3/2007 | Karmakar et al. |
| 2007/0058627 A1 | 3/2007 | Smith et al. |
| 2007/0061018 A1 | 3/2007 | Callaghan et al. |
| 2007/0061020 A1 | 3/2007 | Bovee et al. |
| 2007/0061266 A1 | 3/2007 | Moore et al. |
| 2007/0061430 A1 | 3/2007 | Kim |
| 2007/0061878 A1 | 3/2007 | Hagiu et al. |
| 2007/0063836 A1 | 3/2007 | Hayden et al. |
| 2007/0063866 A1 | 3/2007 | Webb |
| 2007/0064714 A1 | 3/2007 | Bi et al. |
| 2007/0067780 A1 | 3/2007 | Kumar et al. |
| 2007/0079012 A1 | 4/2007 | Walker |
| 2007/0079151 A1 | 4/2007 | Connor et al. |
| 2007/0079385 A1 | 4/2007 | Williams et al. |
| 2007/0083668 A1 | 4/2007 | Kelsey et al. |
| 2007/0090944 A1 | 4/2007 | Du Breuil |
| 2007/0094716 A1 | 4/2007 | Farino et al. |
| 2007/0096981 A1 | 5/2007 | Abraham |
| 2007/0101345 A1 | 5/2007 | Takagi |
| 2007/0105072 A1 | 5/2007 | Koljonen |
| 2007/0106124 A1 | 5/2007 | Kuriyama et al. |
| 2007/0106536 A1 | 5/2007 | Moore |
| 2007/0106547 A1 | 5/2007 | Agrawal |
| 2007/0109975 A1 | 5/2007 | Reckamp et al. |
| 2007/0116020 A1 | 5/2007 | Cheever et al. |
| 2007/0117464 A1 | 5/2007 | Freeman |
| 2007/0118609 A1 | 5/2007 | Mullan et al. |
| 2007/0126875 A1 | 6/2007 | Miyamaki |
| 2007/0127510 A1 | 6/2007 | Bossemeyer et al. |
| 2007/0132576 A1 | 6/2007 | Kolavennu et al. |
| 2007/0136759 A1 | 6/2007 | Zhang et al. |
| 2007/0140267 A1 | 6/2007 | Yang |
| 2007/0142022 A1 | 6/2007 | Madonna et al. |
| 2007/0142044 A1 | 6/2007 | Fitzgerald et al. |
| 2007/0143400 A1 | 6/2007 | Kelley et al. |
| 2007/0143440 A1 | 6/2007 | Reckamp et al. |
| 2007/0146127 A1 | 6/2007 | Stilp et al. |
| 2007/0146484 A1 | 6/2007 | Horton et al. |
| 2007/0147419 A1 | 6/2007 | Tsujimoto et al. |
| 2007/0150616 A1 | 6/2007 | Baek et al. |
| 2007/0154010 A1 | 7/2007 | Wong |
| 2007/0155325 A1 | 7/2007 | Bambic et al. |
| 2007/0155423 A1 | 7/2007 | Carmody et al. |
| 2007/0156689 A1 | 7/2007 | Meek et al. |
| 2007/0160017 A1 | 7/2007 | Meier et al. |
| 2007/0161372 A1 | 7/2007 | Rogalski et al. |
| 2007/0162228 A1 | 7/2007 | Mitchell |
| 2007/0162680 A1 | 7/2007 | Mitchell |
| 2007/0164779 A1 | 7/2007 | Weston et al. |
| 2007/0168860 A1 | 7/2007 | Takayama et al. |
| 2007/0176766 A1 | 8/2007 | Cheng |
| 2007/0182543 A1 | 8/2007 | Luo |
| 2007/0182819 A1 | 8/2007 | Monroe |
| 2007/0183345 A1 | 8/2007 | Fahim et al. |
| 2007/0185989 A1 | 8/2007 | Corbett et al. |
| 2007/0192486 A1 | 8/2007 | Wilson et al. |
| 2007/0192863 A1 | 8/2007 | Kapoor et al. |
| 2007/0197236 A1 | 8/2007 | Ahn et al. |
| 2007/0198698 A1 | 8/2007 | Boyd et al. |
| 2007/0200658 A1 | 8/2007 | Yang |
| 2007/0208521 A1 | 9/2007 | Petite et al. |
| 2007/0214262 A1 | 9/2007 | Buchbinder et al. |
| 2007/0214264 A1 | 9/2007 | Koister |
| 2007/0216764 A1 | 9/2007 | Kwak |
| 2007/0216783 A1 | 9/2007 | Ortiz et al. |
| 2007/0218895 A1 | 9/2007 | Saito et al. |
| 2007/0223465 A1 | 9/2007 | Wang et al. |
| 2007/0223500 A1 | 9/2007 | Lee et al. |
| 2007/0226182 A1 | 9/2007 | Sobotka et al. |
| 2007/0230415 A1 | 10/2007 | Malik |
| 2007/0230744 A1 | 10/2007 | Dronge |
| 2007/0245223 A1 | 10/2007 | Siedzik et al. |
| 2007/0249323 A1 | 10/2007 | Lee et al. |
| 2007/0253361 A1 | 11/2007 | Pristas et al. |
| 2007/0255856 A1 | 11/2007 | Reckamp et al. |
| 2007/0256105 A1 | 11/2007 | Tabe |
| 2007/0257986 A1 | 11/2007 | Ivanov et al. |
| 2007/0260713 A1 | 11/2007 | Moorer et al. |
| 2007/0262857 A1 | 11/2007 | Jackson |
| 2007/0263782 A1 | 11/2007 | Stock et al. |
| 2007/0265866 A1 | 11/2007 | Fehling et al. |
| 2007/0271398 A1 | 11/2007 | Manchester et al. |
| 2007/0275703 A1 | 11/2007 | Lim et al. |
| 2007/0277111 A1 | 11/2007 | Bennett et al. |
| 2007/0282665 A1 | 12/2007 | Buehler et al. |
| 2007/0283001 A1 | 12/2007 | Spiess et al. |
| 2007/0283004 A1 | 12/2007 | Buehler |
| 2007/0287405 A1 | 12/2007 | Radtke |
| 2007/0288858 A1 | 12/2007 | Pereira |
| 2007/0290830 A1 | 12/2007 | Gurley |
| 2007/0291118 A1 | 12/2007 | Shu et al. |
| 2007/0296814 A1 | 12/2007 | Cooper et al. |
| 2007/0298772 A1 | 12/2007 | Owens et al. |
| 2008/0013531 A1 | 1/2008 | Elliott et al. |
| 2008/0013957 A1 | 1/2008 | Akers et al. |
| 2008/0025487 A1 | 1/2008 | Johan et al. |
| 2008/0027587 A1 | 1/2008 | Nickerson et al. |
| 2008/0040272 A1 | 2/2008 | Eskin |
| 2008/0042826 A1 | 2/2008 | Hevia et al. |
| 2008/0043107 A1 | 2/2008 | Coogan et al. |
| 2008/0046593 A1 | 2/2008 | Ando et al. |
| 2008/0048975 A1 | 2/2008 | Leibow |
| 2008/0052348 A1 | 2/2008 | Adler et al. |
| 2008/0056212 A1 | 3/2008 | Karaoguz et al. |
| 2008/0059533 A1 | 3/2008 | Krikorian |
| 2008/0059622 A1 | 3/2008 | Hite et al. |
| 2008/0065681 A1 | 3/2008 | Fontijn et al. |
| 2008/0065685 A1 | 3/2008 | Frank |
| 2008/0069121 A1 | 3/2008 | Adamson et al. |
| 2008/0072244 A1 | 3/2008 | Eker et al. |
| 2008/0074993 A1 | 3/2008 | Vainola |
| 2008/0082186 A1 | 4/2008 | Hood et al. |
| 2008/0084294 A1* | 4/2008 | Zhiying .......... H04W 12/102 340/539.22 |
| 2008/0084296 A1 | 4/2008 | Kutzik et al. |
| 2008/0086564 A1 | 4/2008 | Putman et al. |
| 2008/0091793 A1 | 4/2008 | Diroo et al. |
| 2008/0094204 A1 | 4/2008 | Kogan et al. |
| 2008/0095339 A1 | 4/2008 | Elliott et al. |
| 2008/0100705 A1 | 5/2008 | Kister et al. |
| 2008/0102845 A1 | 5/2008 | Zhao |

(56) References Cited

U.S. PATENT DOCUMENTS

| | | |
|---|---|---|
| 2008/0103608 A1 | 5/2008 | Gough et al. |
| 2008/0104215 A1 | 5/2008 | Excoffier et al. |
| 2008/0104516 A1 | 5/2008 | Lee |
| 2008/0109302 A1 | 5/2008 | Salokannel et al. |
| 2008/0109650 A1 | 5/2008 | Shim et al. |
| 2008/0112340 A1 | 5/2008 | Luebke |
| 2008/0112405 A1 | 5/2008 | Cholas et al. |
| 2008/0117029 A1 | 5/2008 | Dohrmann et al. |
| 2008/0117201 A1 | 5/2008 | Martinez et al. |
| 2008/0120405 A1 | 5/2008 | Son et al. |
| 2008/0122575 A1 | 5/2008 | Lavian et al. |
| 2008/0126535 A1 | 5/2008 | Zhu et al. |
| 2008/0128444 A1 | 6/2008 | Schininger et al. |
| 2008/0129484 A1 | 6/2008 | Dahl et al. |
| 2008/0130949 A1 | 6/2008 | Ivanov et al. |
| 2008/0133725 A1 | 6/2008 | Shaouy |
| 2008/0134165 A1 | 6/2008 | Anderson et al. |
| 2008/0134343 A1 | 6/2008 | Pennington et al. |
| 2008/0137572 A1 | 6/2008 | Park et al. |
| 2008/0140868 A1 | 6/2008 | Kalayjian et al. |
| 2008/0141303 A1 | 6/2008 | Walker et al. |
| 2008/0141341 A1 | 6/2008 | Vinogradov et al. |
| 2008/0144884 A1 | 6/2008 | Habibi |
| 2008/0147834 A1 | 6/2008 | Quinn et al. |
| 2008/0151037 A1 | 6/2008 | Kumarasamy et al. |
| 2008/0155080 A1 | 6/2008 | Marlow et al. |
| 2008/0155470 A1 | 6/2008 | Khedouri et al. |
| 2008/0162637 A1 | 7/2008 | Adamczyk et al. |
| 2008/0163355 A1 | 7/2008 | Chu |
| 2008/0165787 A1 | 7/2008 | Xu et al. |
| 2008/0170511 A1 | 7/2008 | Shorty et al. |
| 2008/0181239 A1 | 7/2008 | Wood et al. |
| 2008/0183483 A1 | 7/2008 | Hart |
| 2008/0183842 A1 | 7/2008 | Raji et al. |
| 2008/0189609 A1 | 8/2008 | Larson et al. |
| 2008/0189774 A1 | 8/2008 | Ansari et al. |
| 2008/0201468 A1 | 8/2008 | Titus |
| 2008/0201723 A1 | 8/2008 | Bottaro et al. |
| 2008/0208399 A1 | 8/2008 | Pham |
| 2008/0209505 A1 | 8/2008 | Ghai et al. |
| 2008/0209506 A1 | 8/2008 | Ghai et al. |
| 2008/0215450 A1 | 9/2008 | Gates et al. |
| 2008/0215613 A1 | 9/2008 | Grasso |
| 2008/0219239 A1 | 9/2008 | Bell et al. |
| 2008/0221715 A1 | 9/2008 | Krzyzanowski et al. |
| 2008/0227460 A1 | 9/2008 | David et al. |
| 2008/0229415 A1 | 9/2008 | Kapoor et al. |
| 2008/0235326 A1 | 9/2008 | Parsi et al. |
| 2008/0235600 A1 | 9/2008 | Harper et al. |
| 2008/0239075 A1 | 10/2008 | Mehrotra et al. |
| 2008/0240372 A1 | 10/2008 | Frenette |
| 2008/0240696 A1 | 10/2008 | Kucharyson |
| 2008/0259818 A1 | 10/2008 | Balassanian |
| 2008/0261540 A1 | 10/2008 | Rohani et al. |
| 2008/0262990 A1 | 10/2008 | Kapoor et al. |
| 2008/0262991 A1 | 10/2008 | Kapoor et al. |
| 2008/0263150 A1 | 10/2008 | Childers et al. |
| 2008/0266080 A1 | 10/2008 | Leung et al. |
| 2008/0266257 A1 | 10/2008 | Chiang |
| 2008/0271150 A1 | 10/2008 | Boerger et al. |
| 2008/0284580 A1 | 11/2008 | Babich et al. |
| 2008/0284587 A1 | 11/2008 | Saigh et al. |
| 2008/0284592 A1 | 11/2008 | Collins et al. |
| 2008/0288639 A1 | 11/2008 | Ruppert et al. |
| 2008/0294588 A1 | 11/2008 | Morris et al. |
| 2008/0295172 A1 | 11/2008 | Bohacek |
| 2008/0297599 A1 | 12/2008 | Donovan et al. |
| 2008/0303903 A1 | 12/2008 | Bentley et al. |
| 2008/0313316 A1 | 12/2008 | Hite et al. |
| 2008/0316024 A1 | 12/2008 | Chantelou et al. |
| 2009/0003172 A1 | 1/2009 | Yahata et al. |
| 2009/0003252 A1 | 1/2009 | Salomone et al. |
| 2009/0003820 A1 | 1/2009 | Law et al. |
| 2009/0007596 A1 | 1/2009 | Goldstein et al. |
| 2009/0013210 A1 | 1/2009 | McIntosh et al. |
| 2009/0018850 A1 | 1/2009 | Abhyanker |
| 2009/0019141 A1 | 1/2009 | Bush et al. |
| 2009/0022362 A1 | 1/2009 | Gagvani et al. |
| 2009/0024493 A1 | 1/2009 | Huang et al. |
| 2009/0036142 A1 | 2/2009 | Yan |
| 2009/0036159 A1 | 2/2009 | Chen |
| 2009/0041467 A1 | 2/2009 | Carleton et al. |
| 2009/0042649 A1 | 2/2009 | Hsieh et al. |
| 2009/0046664 A1 | 2/2009 | Aso |
| 2009/0049094 A1 | 2/2009 | Howell et al. |
| 2009/0049488 A1 | 2/2009 | Stransky |
| 2009/0051769 A1 | 2/2009 | Kuo et al. |
| 2009/0055760 A1 | 2/2009 | Whatcott et al. |
| 2009/0057427 A1 | 3/2009 | Geadelmann et al. |
| 2009/0063582 A1 | 3/2009 | Anna et al. |
| 2009/0066534 A1 | 3/2009 | Sivakkolundhu |
| 2009/0067395 A1 | 3/2009 | Curtis et al. |
| 2009/0070692 A1 | 3/2009 | Dawes et al. |
| 2009/0072988 A1 | 3/2009 | Haywood |
| 2009/0076211 A1 | 3/2009 | Yang et al. |
| 2009/0076879 A1 | 3/2009 | Sparks et al. |
| 2009/0077623 A1 | 3/2009 | Baum et al. |
| 2009/0079547 A1 | 3/2009 | Oksanen et al. |
| 2009/0083167 A1 | 3/2009 | Subbloie |
| 2009/0086660 A1 | 4/2009 | Sood et al. |
| 2009/0086740 A1 | 4/2009 | Al-Bakri et al. |
| 2009/0089822 A1 | 4/2009 | Wada |
| 2009/0092283 A1 | 4/2009 | Whillock et al. |
| 2009/0094671 A1 | 4/2009 | Kurapati et al. |
| 2009/0100176 A1 | 4/2009 | Hicks, III et al. |
| 2009/0100329 A1 | 4/2009 | Espinoza |
| 2009/0100460 A1 | 4/2009 | Hicks et al. |
| 2009/0100492 A1 | 4/2009 | Hicks et al. |
| 2009/0109959 A1 | 4/2009 | Elliott et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0144237 A1 | 6/2009 | Branam et al. |
| 2009/0158189 A1 | 6/2009 | Itani |
| 2009/0158292 A1 | 6/2009 | Rattner et al. |
| 2009/0161609 A1 | 6/2009 | Bergstrom |
| 2009/0172443 A1 | 7/2009 | Rothman et al. |
| 2009/0177298 A1 | 7/2009 | McFarland et al. |
| 2009/0177906 A1 | 7/2009 | Paniagua et al. |
| 2009/0180430 A1 | 7/2009 | Fadell |
| 2009/0182868 A1 | 7/2009 | McFate et al. |
| 2009/0187297 A1 | 7/2009 | Kish et al. |
| 2009/0189981 A1 | 7/2009 | Siann et al. |
| 2009/0193373 A1 | 7/2009 | Abbaspour et al. |
| 2009/0197539 A1 | 8/2009 | Shiba |
| 2009/0202250 A1 | 8/2009 | Dizechi et al. |
| 2009/0204693 A1 | 8/2009 | Andreev et al. |
| 2009/0221368 A1 | 9/2009 | Yen et al. |
| 2009/0224875 A1 | 9/2009 | Rabinowitz et al. |
| 2009/0228445 A1 | 9/2009 | Gangal |
| 2009/0240353 A1 | 9/2009 | Songkakul et al. |
| 2009/0240730 A1 | 9/2009 | Wood |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0254960 A1 | 10/2009 | Yarom et al. |
| 2009/0256708 A1 | 10/2009 | Hsiao et al. |
| 2009/0259515 A1 | 10/2009 | Belimpasakis et al. |
| 2009/0260052 A1 | 10/2009 | Bathula et al. |
| 2009/0260083 A1 | 10/2009 | Szeto et al. |
| 2009/0260430 A1 | 10/2009 | Zamfes |
| 2009/0261943 A1 | 10/2009 | Jana et al. |
| 2009/0265042 A1 | 10/2009 | Mollenkopf et al. |
| 2009/0265193 A1 | 10/2009 | Collins et al. |
| 2009/0270090 A1 | 10/2009 | Kawamura |
| 2009/0271042 A1 | 10/2009 | Voysey |
| 2009/0276728 A1 | 11/2009 | Doan et al. |
| 2009/0289787 A1 | 11/2009 | Dawson et al. |
| 2009/0289788 A1 | 11/2009 | Leblond |
| 2009/0292909 A1 | 11/2009 | Feder et al. |
| 2009/0303100 A1 | 12/2009 | Zemany |
| 2009/0307255 A1 | 12/2009 | Park |
| 2009/0307307 A1 | 12/2009 | Igarashi |

(56) References Cited

U.S. PATENT DOCUMENTS

| | | |
|---|---|---|
| 2009/0311995 A1 | 12/2009 | Himmelstein |
| 2009/0313693 A1 | 12/2009 | Rogers |
| 2009/0316671 A1 | 12/2009 | Rolf et al. |
| 2009/0319361 A1 | 12/2009 | Conrady |
| 2009/0322510 A1 | 12/2009 | Berger et al. |
| 2009/0324010 A1 | 12/2009 | Hou |
| 2009/0327483 A1 | 12/2009 | Thompson et al. |
| 2009/0327510 A1 | 12/2009 | Edelman et al. |
| 2010/0000791 A1 | 1/2010 | Alberty |
| 2010/0001812 A1 | 1/2010 | Kausch |
| 2010/0004949 A1 | 1/2010 | O'Brien |
| 2010/0008274 A1 | 1/2010 | Kneckt et al. |
| 2010/0009758 A1 | 1/2010 | Twitchell, Jr. |
| 2010/0011298 A1 | 1/2010 | Campbell et al. |
| 2010/0013917 A1 | 1/2010 | Hanna et al. |
| 2010/0023865 A1 | 1/2010 | Fulker et al. |
| 2010/0026481 A1 | 2/2010 | Oh et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0039958 A1 | 2/2010 | Ge et al. |
| 2010/0041380 A1 | 2/2010 | Hewes et al. |
| 2010/0042954 A1 | 2/2010 | Rosenblatt et al. |
| 2010/0045461 A1 | 2/2010 | Caler et al. |
| 2010/0067371 A1 | 3/2010 | Gogic et al. |
| 2010/0070618 A1 | 3/2010 | Kim et al. |
| 2010/0071053 A1 | 3/2010 | Ansari et al. |
| 2010/0074112 A1 | 3/2010 | Derr et al. |
| 2010/0077111 A1 | 3/2010 | Holmes et al. |
| 2010/0077347 A1 | 3/2010 | Kirtane et al. |
| 2010/0082744 A1 | 4/2010 | Raji et al. |
| 2010/0100269 A1 | 4/2010 | Ekhaguere et al. |
| 2010/0102951 A1 | 4/2010 | Rutledge |
| 2010/0121521 A1 | 5/2010 | Kiribayashi |
| 2010/0122091 A1 | 5/2010 | Huang et al. |
| 2010/0138758 A1 | 6/2010 | Mizumori et al. |
| 2010/0138764 A1 | 6/2010 | Hatambeiki et al. |
| 2010/0141762 A1 | 6/2010 | Siann et al. |
| 2010/0145485 A1 | 6/2010 | Duchene et al. |
| 2010/0150170 A1 | 6/2010 | Lee et al. |
| 2010/0159898 A1 | 6/2010 | Krzyzanowski et al. |
| 2010/0159967 A1 | 6/2010 | Pounds et al. |
| 2010/0164736 A1 | 7/2010 | Byers et al. |
| 2010/0165897 A1 | 7/2010 | Sood |
| 2010/0174643 A1 | 7/2010 | Schaefer et al. |
| 2010/0177749 A1 | 7/2010 | Essinger et al. |
| 2010/0177750 A1 | 7/2010 | Essinger et al. |
| 2010/0185857 A1 | 7/2010 | Neitzel et al. |
| 2010/0191352 A1 | 7/2010 | Quail |
| 2010/0197219 A1 | 8/2010 | Issa et al. |
| 2010/0204839 A1 | 8/2010 | Behm et al. |
| 2010/0210240 A1 | 8/2010 | Mahaffey et al. |
| 2010/0212012 A1 | 8/2010 | Touboul et al. |
| 2010/0218104 A1 | 8/2010 | Lewis |
| 2010/0222069 A1 | 9/2010 | Abraham et al. |
| 2010/0238286 A1 | 9/2010 | Boghossian et al. |
| 2010/0241711 A1 | 9/2010 | Ansari et al. |
| 2010/0241748 A1 | 9/2010 | Ansari et al. |
| 2010/0248681 A1 | 9/2010 | Phills |
| 2010/0267390 A1 | 10/2010 | Lin et al. |
| 2010/0274366 A1 | 10/2010 | Fata et al. |
| 2010/0275018 A1 | 10/2010 | Pedersen |
| 2010/0277302 A1 | 11/2010 | Cohn et al. |
| 2010/0277315 A1* | 11/2010 | Cohn ............... H04L 12/2816 340/541 |
| 2010/0279649 A1 | 11/2010 | Thomas |
| 2010/0280637 A1 | 11/2010 | Cohn et al. |
| 2010/0281135 A1 | 11/2010 | Cohn et al. |
| 2010/0281161 A1 | 11/2010 | Cohn et al. |
| 2010/0298024 A1 | 11/2010 | Choi |
| 2010/0299556 A1 | 11/2010 | Taylor et al. |
| 2010/0305779 A1 | 12/2010 | Hassan et al. |
| 2010/0308990 A1 | 12/2010 | Simon et al. |
| 2010/0321151 A1 | 12/2010 | Matsuura et al. |
| 2010/0325107 A1 | 12/2010 | Kenton et al. |
| 2010/0332164 A1 | 12/2010 | Aisa et al. |
| 2011/0000521 A1 | 1/2011 | Tachibana |
| 2011/0001898 A1 | 1/2011 | Mikubo et al. |
| 2011/0018998 A1 | 1/2011 | Guzik |
| 2011/0029875 A1 | 2/2011 | Milch |
| 2011/0030056 A1 | 2/2011 | Tokunaga |
| 2011/0037593 A1 | 2/2011 | Foisy et al. |
| 2011/0040415 A1 | 2/2011 | Nickerson et al. |
| 2011/0040877 A1 | 2/2011 | Foisy |
| 2011/0046792 A1 | 2/2011 | Imes et al. |
| 2011/0051638 A1 | 3/2011 | Jeon et al. |
| 2011/0058034 A1 | 3/2011 | Grass |
| 2011/0061011 A1 | 3/2011 | Hoguet |
| 2011/0068921 A1 | 3/2011 | Shafer |
| 2011/0080267 A1 | 4/2011 | Clare et al. |
| 2011/0087988 A1 | 4/2011 | Ray et al. |
| 2011/0093799 A1 | 4/2011 | Hatambeiki et al. |
| 2011/0096678 A1 | 4/2011 | Ketonen |
| 2011/0102588 A1 | 5/2011 | Trundle et al. |
| 2011/0107436 A1 | 5/2011 | Cholas et al. |
| 2011/0125333 A1 | 5/2011 | Gray |
| 2011/0125846 A1 | 5/2011 | Ham et al. |
| 2011/0128378 A1 | 6/2011 | Raji |
| 2011/0130112 A1 | 6/2011 | Saigh et al. |
| 2011/0131226 A1 | 6/2011 | Chandra et al. |
| 2011/0148572 A1 | 6/2011 | Ku |
| 2011/0156914 A1 | 6/2011 | Sheharri et al. |
| 2011/0169637 A1 | 7/2011 | Siegler et al. |
| 2011/0187497 A1 | 8/2011 | Chin |
| 2011/0197327 A1 | 8/2011 | Mcelroy et al. |
| 2011/0200052 A1 | 8/2011 | Mungo et al. |
| 2011/0208359 A1 | 8/2011 | Duchene et al. |
| 2011/0212706 A1 | 9/2011 | Mika |
| 2011/0213869 A1 | 9/2011 | Korsunsky et al. |
| 2011/0214157 A1 | 9/2011 | Korsunsky et al. |
| 2011/0218777 A1 | 9/2011 | Chen et al. |
| 2011/0219035 A1 | 9/2011 | Korsunsky et al. |
| 2011/0230139 A1 | 9/2011 | Nakahara |
| 2011/0230160 A1 | 9/2011 | Felgate |
| 2011/0231510 A1 | 9/2011 | Korsunsky et al. |
| 2011/0231564 A1 | 9/2011 | Korsunsky et al. |
| 2011/0234392 A1 | 9/2011 | Cohn et al. |
| 2011/0238660 A1 | 9/2011 | Riggs |
| 2011/0238855 A1 | 9/2011 | Korsunsky et al. |
| 2011/0246762 A1 | 10/2011 | Adams et al. |
| 2011/0257953 A1 | 10/2011 | Li et al. |
| 2011/0261195 A1 | 10/2011 | Martin et al. |
| 2011/0276699 A1 | 11/2011 | Pedersen |
| 2011/0283006 A1 | 11/2011 | Ramamurthy |
| 2011/0289517 A1 | 11/2011 | Sather et al. |
| 2011/0299546 A1 | 12/2011 | Prodan et al. |
| 2011/0302497 A1 | 12/2011 | Garrett et al. |
| 2011/0309929 A1 | 12/2011 | Myers |
| 2011/0314515 A1 | 12/2011 | Hernoud et al. |
| 2012/0001436 A1 | 1/2012 | Sami et al. |
| 2012/0005276 A1 | 1/2012 | Guo et al. |
| 2012/0014363 A1 | 1/2012 | Hassan et al. |
| 2012/0016607 A1 | 1/2012 | Cottrell et al. |
| 2012/0017268 A9 | 1/2012 | Dispensa |
| 2012/0020060 A1 | 1/2012 | Myer et al. |
| 2012/0023151 A1 | 1/2012 | Bennett et al. |
| 2012/0030130 A1 | 2/2012 | Smith et al. |
| 2012/0062370 A1 | 3/2012 | Feldstein et al. |
| 2012/0066608 A1 | 3/2012 | Sundermeyer et al. |
| 2012/0066632 A1 | 3/2012 | Sundermeyer et al. |
| 2012/0075469 A1 | 3/2012 | Oskin et al. |
| 2012/0081842 A1 | 4/2012 | Ewing et al. |
| 2012/0084184 A1 | 4/2012 | Raleigh et al. |
| 2012/0086552 A1 | 4/2012 | Fast et al. |
| 2012/0143383 A1 | 6/2012 | Cooperrider et al. |
| 2012/0150966 A1 | 6/2012 | Fan et al. |
| 2012/0154126 A1 | 6/2012 | Cohn et al. |
| 2012/0172027 A1 | 7/2012 | Partheesh et al. |
| 2012/0182245 A1 | 7/2012 | Hutton |
| 2012/0209951 A1 | 8/2012 | Enns et al. |
| 2012/0214502 A1 | 8/2012 | Qiang |
| 2012/0232788 A1 | 9/2012 | Diao |
| 2012/0240185 A1 | 9/2012 | Kapoor et al. |
| 2012/0242788 A1 | 9/2012 | Chuang et al. |

(56) References Cited

U.S. PATENT DOCUMENTS

| | | |
|---|---|---|
| 2012/0257061 A1 | 10/2012 | Edwards et al. |
| 2012/0259722 A1 | 10/2012 | Mikurak |
| 2012/0265892 A1 | 10/2012 | Ma et al. |
| 2012/0269199 A1 | 10/2012 | Chan et al. |
| 2012/0278877 A1 | 11/2012 | Baum et al. |
| 2012/0280790 A1 | 11/2012 | Gerhardt et al. |
| 2012/0290740 A1 | 11/2012 | Tewari et al. |
| 2012/0296486 A1 | 11/2012 | Marriam et al. |
| 2012/0307646 A1 | 12/2012 | Xia et al. |
| 2012/0309354 A1 | 12/2012 | Du |
| 2012/0313781 A1 | 12/2012 | Barker et al. |
| 2012/0314901 A1 | 12/2012 | Hanson et al. |
| 2012/0315848 A1 | 12/2012 | Smith et al. |
| 2012/0324566 A1 | 12/2012 | Baum et al. |
| 2012/0327242 A1 | 12/2012 | Barley et al. |
| 2012/0331109 A1 | 12/2012 | Baum et al. |
| 2013/0002880 A1 | 1/2013 | Levinson et al. |
| 2013/0038730 A1 | 2/2013 | Peterson et al. |
| 2013/0038800 A1 | 2/2013 | Yoo |
| 2013/0047123 A1 | 2/2013 | May et al. |
| 2013/0057384 A1 | 3/2013 | Morris et al. |
| 2013/0057695 A1 | 3/2013 | Huisking |
| 2013/0062951 A1 | 3/2013 | Raji et al. |
| 2013/0073746 A1 | 3/2013 | Singh et al. |
| 2013/0082835 A1 | 4/2013 | Shapiro et al. |
| 2013/0082836 A1 | 4/2013 | Watts |
| 2013/0085615 A1 | 4/2013 | Barker |
| 2013/0086618 A1 | 4/2013 | Klein et al. |
| 2013/0091209 A1 | 4/2013 | Bennett et al. |
| 2013/0091213 A1 | 4/2013 | Diab et al. |
| 2013/0094538 A1 | 4/2013 | Wang |
| 2013/0103207 A1 | 4/2013 | Ruff et al. |
| 2013/0111576 A1 | 5/2013 | Devine et al. |
| 2013/0115972 A1 | 5/2013 | Ziskind et al. |
| 2013/0120131 A1 | 5/2013 | Hicks, III |
| 2013/0125157 A1 | 5/2013 | Sharif-Ahmadi et al. |
| 2013/0136102 A1 | 5/2013 | Macwan et al. |
| 2013/0147799 A1 | 6/2013 | Hoguet |
| 2013/0154822 A1 | 6/2013 | Kumar et al. |
| 2013/0155229 A1 | 6/2013 | Thornton et al. |
| 2013/0157612 A1 | 6/2013 | Cordero et al. |
| 2013/0162571 A1 | 6/2013 | Tamegai |
| 2013/0163491 A1 | 6/2013 | Singh et al. |
| 2013/0163757 A1 | 6/2013 | Bellovin et al. |
| 2013/0173797 A1 | 7/2013 | Poirer et al. |
| 2013/0174239 A1 | 7/2013 | Kim et al. |
| 2013/0183924 A1 | 7/2013 | Saigh et al. |
| 2013/0184874 A1 | 7/2013 | Frader-Thompson et al. |
| 2013/0185026 A1 | 7/2013 | Vanker et al. |
| 2013/0191755 A1 | 7/2013 | Balog et al. |
| 2013/0205016 A1 | 8/2013 | Dupre et al. |
| 2013/0218959 A1 | 8/2013 | Sa et al. |
| 2013/0222133 A1 | 8/2013 | Schultz et al. |
| 2013/0223279 A1 | 8/2013 | Tinnakornsrisuphap et al. |
| 2013/0245837 A1 | 9/2013 | Grohman |
| 2013/0257611 A1 | 10/2013 | Lamb et al. |
| 2013/0258119 A1 | 10/2013 | Kim et al. |
| 2013/0261821 A1 | 10/2013 | Lu et al. |
| 2013/0266193 A1 | 10/2013 | Tiwari et al. |
| 2013/0271270 A1 | 10/2013 | Jamadagni et al. |
| 2013/0286942 A1 | 10/2013 | Bonar et al. |
| 2013/0311146 A1 | 11/2013 | Miller et al. |
| 2013/0314542 A1 | 11/2013 | Jackson |
| 2013/0318231 A1 | 11/2013 | Raji et al. |
| 2013/0318443 A1 | 11/2013 | Bachman et al. |
| 2013/0325935 A1 | 12/2013 | Kiley et al. |
| 2013/0331109 A1 | 12/2013 | Dhillon et al. |
| 2013/0344875 A1 | 12/2013 | Chowdhury |
| 2013/0346921 A1 | 12/2013 | Shiplacoff et al. |
| 2014/0006660 A1 | 1/2014 | Frei et al. |
| 2014/0024361 A1 | 1/2014 | Poon et al. |
| 2014/0032034 A1 | 1/2014 | Raptopoulos et al. |
| 2014/0033136 A1 | 1/2014 | Luke |
| 2014/0035726 A1 | 2/2014 | Schoner et al. |
| 2014/0053246 A1 | 2/2014 | Huang et al. |
| 2014/0068486 A1 | 3/2014 | Sellers et al. |
| 2014/0075464 A1 | 3/2014 | Mccrea |
| 2014/0095630 A1 | 4/2014 | Wohlert et al. |
| 2014/0098247 A1 | 4/2014 | Rao et al. |
| 2014/0108151 A1 | 4/2014 | Bookstaff |
| 2014/0109130 A1 | 4/2014 | Sugimoto et al. |
| 2014/0112405 A1 | 4/2014 | Jafarian et al. |
| 2014/0136242 A1 | 5/2014 | Weekes et al. |
| 2014/0136847 A1 | 5/2014 | Huang |
| 2014/0136936 A1 | 5/2014 | Patel et al. |
| 2014/0140575 A1 | 5/2014 | Wolf |
| 2014/0143695 A1 | 5/2014 | Sundermeyer et al. |
| 2014/0143851 A1 | 5/2014 | Baum et al. |
| 2014/0143854 A1 | 5/2014 | Lopez et al. |
| 2014/0146170 A1 | 5/2014 | Tofighbakhsh |
| 2014/0146171 A1 | 5/2014 | Brady et al. |
| 2014/0153695 A1 | 6/2014 | Yanagisawa et al. |
| 2014/0167928 A1 | 6/2014 | Burd et al. |
| 2014/0172957 A1 | 6/2014 | Baum et al. |
| 2014/0176797 A1 | 6/2014 | Silva et al. |
| 2014/0180968 A1 | 6/2014 | Song et al. |
| 2014/0188290 A1 | 7/2014 | Steinberg et al. |
| 2014/0188729 A1 | 7/2014 | Hong |
| 2014/0201291 A1 | 7/2014 | Russell |
| 2014/0208214 A1 | 7/2014 | Stern |
| 2014/0218517 A1 | 8/2014 | Kim et al. |
| 2014/0233951 A1 | 8/2014 | Cook |
| 2014/0236325 A1 | 8/2014 | Sasaki et al. |
| 2014/0245014 A1 | 8/2014 | Tuck et al. |
| 2014/0245160 A1 | 8/2014 | Bauer et al. |
| 2014/0254896 A1 | 9/2014 | Zhou et al. |
| 2014/0265359 A1 | 9/2014 | Cheng et al. |
| 2014/0266678 A1 | 9/2014 | Shapiro et al. |
| 2014/0266736 A1 | 9/2014 | Cretu-Petra |
| 2014/0278281 A1 | 9/2014 | Vaynriber et al. |
| 2014/0282048 A1 | 9/2014 | Shapiro et al. |
| 2014/0282934 A1 | 9/2014 | Miasnik et al. |
| 2014/0289384 A1 | 9/2014 | Kao et al. |
| 2014/0289388 A1 | 9/2014 | Ghosh et al. |
| 2014/0293046 A1 | 10/2014 | Ni |
| 2014/0298467 A1 | 10/2014 | Bhagwat et al. |
| 2014/0316616 A1 | 10/2014 | Kugelmass |
| 2014/0317660 A1 | 10/2014 | Cheung et al. |
| 2014/0319232 A1 | 10/2014 | Gourlay et al. |
| 2014/0328161 A1 | 11/2014 | Haddad et al. |
| 2014/0340216 A1 | 11/2014 | Puskarich |
| 2014/0359524 A1 | 12/2014 | Sasaki et al. |
| 2014/0368331 A1 | 12/2014 | Cohn et al. |
| 2014/0369584 A1 | 12/2014 | Fan et al. |
| 2014/0372599 A1 | 12/2014 | Gutt et al. |
| 2014/0372811 A1 | 12/2014 | Cohn et al. |
| 2014/0378110 A1 | 12/2014 | Chingon et al. |
| 2015/0009325 A1 | 1/2015 | Kardashov |
| 2015/0019714 A1 | 1/2015 | Shaashua et al. |
| 2015/0022666 A1 | 1/2015 | Kay et al. |
| 2015/0026796 A1 | 1/2015 | Alan et al. |
| 2015/0054947 A1 | 2/2015 | Dawes |
| 2015/0058250 A1 | 2/2015 | Stanzione et al. |
| 2015/0074206 A1 | 3/2015 | Baldwin |
| 2015/0074259 A1 | 3/2015 | Ansari et al. |
| 2015/0077553 A1 | 3/2015 | Dawes |
| 2015/0082414 A1 | 3/2015 | Dawes |
| 2015/0088982 A1 | 3/2015 | Johnson et al. |
| 2015/0097680 A1 | 4/2015 | Fadell et al. |
| 2015/0097949 A1 | 4/2015 | Ure et al. |
| 2015/0097961 A1 | 4/2015 | Ure et al. |
| 2015/0100167 A1 | 4/2015 | Sloo et al. |
| 2015/0106721 A1 | 4/2015 | Cha et al. |
| 2015/0130625 A1 | 5/2015 | Tuovinen |
| 2015/0140954 A1 | 5/2015 | Maier et al. |
| 2015/0142991 A1 | 5/2015 | Zaloom |
| 2015/0143395 A1 | 5/2015 | Reisman |
| 2015/0161875 A1 | 6/2015 | Cohn et al. |
| 2015/0170447 A1 | 6/2015 | Buzhardt |
| 2015/0192940 A1 | 7/2015 | Silva et al. |
| 2015/0193127 A1 | 7/2015 | Chai et al. |
| 2015/0205297 A1 | 7/2015 | Stevens et al. |
| 2015/0205465 A1 | 7/2015 | Robison et al. |
| 2015/0222601 A1 | 8/2015 | Metz et al. |

(56) References Cited

U.S. PATENT DOCUMENTS

| | | |
|---|---|---|
| 2015/0227118 A1 | 8/2015 | Wong |
| 2015/0256355 A1 | 9/2015 | Pera et al. |
| 2015/0261427 A1 | 9/2015 | Sasaki |
| 2015/0266577 A1 | 9/2015 | Jones et al. |
| 2015/0287310 A1 | 10/2015 | Deiiuliis et al. |
| 2015/0304804 A1 | 10/2015 | Lotito |
| 2015/0319006 A1 | 11/2015 | Plummer et al. |
| 2015/0319046 A1 | 11/2015 | Plummer et al. |
| 2015/0325106 A1 | 11/2015 | Dawes et al. |
| 2015/0331662 A1 | 11/2015 | Lambourne |
| 2015/0334087 A1 | 11/2015 | Dawes |
| 2015/0348554 A1 | 12/2015 | Orr et al. |
| 2015/0350031 A1 | 12/2015 | Burks et al. |
| 2015/0350735 A1 | 12/2015 | Crone |
| 2015/0358359 A1 | 12/2015 | Ghai et al. |
| 2015/0365217 A1 | 12/2015 | Scholten et al. |
| 2015/0365933 A1 | 12/2015 | Lee et al. |
| 2015/0371512 A1 | 12/2015 | Bennett et al. |
| 2015/0373149 A1 | 12/2015 | Lyons |
| 2015/0379355 A1 | 12/2015 | Kanga et al. |
| 2016/0004820 A1 | 1/2016 | Moore |
| 2016/0012715 A1 | 1/2016 | Raji et al. |
| 2016/0019778 A1 | 1/2016 | Raji et al. |
| 2016/0023475 A1 | 1/2016 | Bevier et al. |
| 2016/0027290 A1 | 1/2016 | English |
| 2016/0027295 A1 | 1/2016 | Raji et al. |
| 2016/0036944 A1 | 2/2016 | Kitchen et al. |
| 2016/0037389 A1 | 2/2016 | Tagg et al. |
| 2016/0042637 A1 | 2/2016 | Cahill |
| 2016/0055573 A1 | 2/2016 | Chen et al. |
| 2016/0062624 A1 | 3/2016 | Sundermeyer et al. |
| 2016/0063642 A1 | 3/2016 | Luciani et al. |
| 2016/0065413 A1 | 3/2016 | Sundermeyer et al. |
| 2016/0065414 A1 | 3/2016 | Sundermeyer et al. |
| 2016/0065653 A1 | 3/2016 | Chen et al. |
| 2016/0068264 A1 | 3/2016 | Ganesh et al. |
| 2016/0077935 A1 | 3/2016 | Zheng et al. |
| 2016/0080365 A1 | 3/2016 | Baker et al. |
| 2016/0087933 A1 | 3/2016 | Johnson et al. |
| 2016/0094421 A1 | 3/2016 | Bali et al. |
| 2016/0100348 A1 | 4/2016 | Cohn et al. |
| 2016/0107749 A1 | 4/2016 | Mucci |
| 2016/0116914 A1 | 4/2016 | Mucci |
| 2016/0127641 A1 | 5/2016 | Gove |
| 2016/0147919 A1 | 5/2016 | Yabe et al. |
| 2016/0150433 A1 | 5/2016 | Bergquist et al. |
| 2016/0156941 A9 | 6/2016 | Alao et al. |
| 2016/0161277 A1 | 6/2016 | Park et al. |
| 2016/0164923 A1 | 6/2016 | Dawes |
| 2016/0171853 A1 | 6/2016 | Naidoo et al. |
| 2016/0180719 A1 | 6/2016 | Wouhaybi et al. |
| 2016/0183073 A1 | 6/2016 | Saito et al. |
| 2016/0187995 A1 | 6/2016 | Rosewall |
| 2016/0189509 A1 | 6/2016 | Malhotra et al. |
| 2016/0189524 A1 | 6/2016 | Poder et al. |
| 2016/0189527 A1 | 6/2016 | Peterson et al. |
| 2016/0189549 A1 | 6/2016 | Marcus |
| 2016/0191265 A1 | 6/2016 | Cohn et al. |
| 2016/0191621 A1 | 6/2016 | Oh et al. |
| 2016/0192461 A1 | 6/2016 | Minsky |
| 2016/0196734 A1 | 7/2016 | Hicks, III |
| 2016/0202695 A1 | 7/2016 | Deroos et al. |
| 2016/0209072 A1 | 7/2016 | Golden et al. |
| 2016/0225240 A1 | 8/2016 | Voddhi et al. |
| 2016/0226732 A1 | 8/2016 | Kim et al. |
| 2016/0231916 A1 | 8/2016 | Dawes |
| 2016/0234075 A1 | 8/2016 | Sirpal et al. |
| 2016/0241633 A1 | 8/2016 | Overby et al. |
| 2016/0260135 A1 | 9/2016 | Zomet et al. |
| 2016/0261932 A1 | 9/2016 | Fadell et al. |
| 2016/0266579 A1 | 9/2016 | Chen et al. |
| 2016/0274759 A1 | 9/2016 | Dawes |
| 2016/0323731 A1 | 11/2016 | Mohammed et al. |
| 2016/0363337 A1 | 12/2016 | Steinberg et al. |
| 2016/0364089 A1 | 12/2016 | Blackman et al. |
| 2016/0371961 A1 | 12/2016 | Narang et al. |
| 2016/0371967 A1 | 12/2016 | Narang et al. |
| 2016/0373453 A1 | 12/2016 | Ruffner et al. |
| 2016/0378109 A1 | 12/2016 | Raffa et al. |
| 2017/0004714 A1 | 1/2017 | Rhee |
| 2017/0005818 A1 | 1/2017 | Gould |
| 2017/0006107 A1 | 1/2017 | Dawes et al. |
| 2017/0026440 A1 | 1/2017 | Cockrell et al. |
| 2017/0039413 A1 | 2/2017 | Nadler |
| 2017/0052513 A1 | 2/2017 | Raji et al. |
| 2017/0054570 A1 | 2/2017 | Hagins et al. |
| 2017/0054571 A1 | 2/2017 | Kitchen et al. |
| 2017/0054594 A1 | 2/2017 | Decenzo et al. |
| 2017/0063967 A1 | 3/2017 | Kitchen et al. |
| 2017/0063968 A1 | 3/2017 | Kitchen et al. |
| 2017/0068419 A1 | 3/2017 | Sundermeyer et al. |
| 2017/0070361 A1 | 3/2017 | Sundermeyer et al. |
| 2017/0070563 A1 | 3/2017 | Sundermeyer et al. |
| 2017/0092138 A1 | 3/2017 | Trundle et al. |
| 2017/0103646 A1 | 4/2017 | Naidoo et al. |
| 2017/0109999 A1 | 4/2017 | Cohn et al. |
| 2017/0111227 A1 | 4/2017 | Papageorgiou et al. |
| 2017/0118037 A1 | 4/2017 | Kitchen et al. |
| 2017/0124987 A1 | 5/2017 | Kim et al. |
| 2017/0127124 A9 | 5/2017 | Wilson et al. |
| 2017/0154507 A1 | 6/2017 | Dawes et al. |
| 2017/0155545 A1 | 6/2017 | Baum et al. |
| 2017/0180198 A1 | 6/2017 | Baum et al. |
| 2017/0180306 A1 | 6/2017 | Gutt et al. |
| 2017/0185277 A1 | 6/2017 | Sundermeyer et al. |
| 2017/0185278 A1 | 6/2017 | Sundermeyer et al. |
| 2017/0185281 A1 | 6/2017 | Park et al. |
| 2017/0187993 A1 | 6/2017 | Martch et al. |
| 2017/0192402 A1 | 7/2017 | Karp et al. |
| 2017/0225336 A1 | 8/2017 | Deyle et al. |
| 2017/0227965 A1 | 8/2017 | Decenzo et al. |
| 2017/0244573 A1 | 8/2017 | Baum et al. |
| 2017/0255452 A1 | 9/2017 | Barnes et al. |
| 2017/0257257 A1 | 9/2017 | Dawes |
| 2017/0278407 A1 | 9/2017 | Lemmey et al. |
| 2017/0279629 A1 | 9/2017 | Raji |
| 2017/0289323 A1 | 10/2017 | Gelvin et al. |
| 2017/0289360 A1 | 10/2017 | Baum et al. |
| 2017/0301216 A1 | 10/2017 | Cohn et al. |
| 2017/0302469 A1 | 10/2017 | Cohn et al. |
| 2017/0303257 A1 | 10/2017 | Yamada et al. |
| 2017/0310500 A1 | 10/2017 | Dawes |
| 2017/0330466 A1 | 11/2017 | Demetriades et al. |
| 2017/0331781 A1 | 11/2017 | Gutt et al. |
| 2017/0332055 A1 | 11/2017 | Henderson |
| 2017/0337806 A1 | 11/2017 | Cohn et al. |
| 2017/0353324 A1 | 12/2017 | Baum et al. |
| 2018/0004377 A1 | 1/2018 | Kitchen et al. |
| 2018/0012460 A1 | 1/2018 | Heitz, III et al. |
| 2018/0019890 A1 | 1/2018 | Dawes |
| 2018/0027517 A9 | 1/2018 | Noonan |
| 2018/0045159 A1 | 2/2018 | Patel |
| 2018/0054774 A1 | 2/2018 | Cohn et al. |
| 2018/0063248 A1 | 3/2018 | Dawes et al. |
| 2018/0063259 A1 | 3/2018 | Connelly et al. |
| 2018/0069862 A1 | 3/2018 | Cholas et al. |
| 2018/0069932 A1 | 3/2018 | Tiwari et al. |
| 2018/0082575 A1 | 3/2018 | El-Mankabady |
| 2018/0083831 A1 | 3/2018 | Baum et al. |
| 2018/0092046 A1 | 3/2018 | Egan et al. |
| 2018/0095155 A1 | 4/2018 | Soni et al. |
| 2018/0096568 A1 | 4/2018 | Cohn et al. |
| 2018/0107196 A1 | 4/2018 | Bian et al. |
| 2018/0146171 A1 | 5/2018 | Tofighbakhsh |
| 2018/0152342 A1 | 5/2018 | Karaoguz et al. |
| 2018/0183668 A1 | 6/2018 | Caldwell et al. |
| 2018/0191720 A1 | 7/2018 | Dawes |
| 2018/0191740 A1 | 7/2018 | Decenzo et al. |
| 2018/0191741 A1 | 7/2018 | Dawes et al. |
| 2018/0191742 A1 | 7/2018 | Dawes |
| 2018/0191807 A1 | 7/2018 | Dawes |
| 2018/0197387 A1 | 7/2018 | Dawes |
| 2018/0198688 A1 | 7/2018 | Dawes |
| 2018/0198755 A1 | 7/2018 | Domangue et al. |

(56) References Cited

U.S. PATENT DOCUMENTS

| | | |
|---|---|---|
| 2018/0198756 A1 | 7/2018 | Dawes |
| 2018/0198788 A1 | 7/2018 | Helen et al. |
| 2018/0198802 A1 | 7/2018 | Dawes |
| 2018/0198841 A1 | 7/2018 | Chmielewski et al. |
| 2018/0278701 A1 | 9/2018 | Diem |
| 2018/0307223 A1 | 10/2018 | Peeters et al. |
| 2018/0322759 A1 | 11/2018 | Devdas et al. |
| 2019/0014413 A1 | 1/2019 | Kallai et al. |
| 2019/0041547 A1 | 2/2019 | Rolf et al. |
| 2019/0058720 A1 | 2/2019 | Lindquist et al. |
| 2019/0073193 A1 | 3/2019 | Krispin |
| 2019/0073534 A1 | 3/2019 | Dvir et al. |
| 2019/0098089 A1 | 3/2019 | Shim et al. |
| 2019/0103030 A1 | 4/2019 | Banga et al. |
| 2019/0158304 A1 | 5/2019 | Sundermeyer et al. |
| 2019/0176985 A1 | 6/2019 | Mucci |
| 2019/0197256 A1 | 6/2019 | Lehnhardt et al. |
| 2019/0204836 A1 | 7/2019 | Rezvani |
| 2019/0239008 A1 | 8/2019 | Ambourne |
| 2019/0245798 A1 | 8/2019 | Short et al. |
| 2019/0265694 A1 | 8/2019 | Chen et al. |
| 2019/0289134 A1 | 9/2019 | Dawes |
| 2019/0347924 A1 | 11/2019 | Trundle et al. |
| 2019/0391545 A1 | 12/2019 | Trundle et al. |
| 2020/0014675 A1 | 1/2020 | Helms et al. |
| 2020/0026285 A1 | 1/2020 | Perrone |
| 2020/0029339 A1 | 1/2020 | Suzuki |
| 2020/0032887 A1 | 1/2020 | McBurney et al. |
| 2020/0036635 A1 | 1/2020 | Ohuchi |
| 2020/0076858 A1 | 3/2020 | Apsangi et al. |
| 2020/0089378 A1 | 3/2020 | Kitchen et al. |
| 2020/0094963 A1 | 3/2020 | Myslinski |
| 2020/0127891 A9 | 4/2020 | Johnson et al. |
| 2020/0137125 A1 | 4/2020 | Patnala et al. |
| 2020/0162890 A1 | 5/2020 | Spencer et al. |
| 2020/0186612 A1 | 6/2020 | Saint Clair |
| 2020/0196213 A1 | 6/2020 | Cheng et al. |
| 2020/0257721 A1 | 8/2020 | McKinnon et al. |
| 2020/0273277 A1 | 8/2020 | Kerning et al. |
| 2020/0279626 A1 | 9/2020 | Ansari et al. |
| 2020/0322577 A1 | 10/2020 | Raffa et al. |
| 2020/0328880 A1 | 10/2020 | Bolotin et al. |
| 2020/0328887 A1 | 10/2020 | Kostiainen et al. |
| 2020/0329136 A1 | 10/2020 | Gerhardt et al. |
| 2020/0333780 A1 | 10/2020 | Kerzner |
| 2020/0344309 A1 | 10/2020 | Gutt et al. |
| 2020/0349786 A1 | 11/2020 | Ho et al. |
| 2020/0366515 A1 | 11/2020 | Dawes et al. |
| 2020/0380851 A1 | 12/2020 | Farrand et al. |
| 2020/0394896 A1 | 12/2020 | Cohn et al. |
| 2020/0409316 A1 | 12/2020 | Raji et al. |
| 2020/0413320 A1 | 12/2020 | Cohn et al. |
| 2021/0014312 A1 | 1/2021 | Dawes et al. |
| 2021/0021710 A1 | 1/2021 | Stepanian |
| 2021/0029547 A1 | 1/2021 | Beachem et al. |
| 2021/0049895 A1 | 2/2021 | Sundermeyer et al. |
| 2021/0053136 A1 | 2/2021 | Rappl et al. |
| 2021/0068034 A1 | 3/2021 | Juhasz et al. |
| 2021/0081553 A1 | 3/2021 | Lemmey et al. |
| 2021/0099753 A1 | 4/2021 | Connelly et al. |
| 2021/0149348 A1 | 5/2021 | Raji et al. |
| 2021/0149466 A1 | 5/2021 | Raji et al. |
| 2021/0152517 A1 | 5/2021 | Dawes et al. |
| 2021/0153001 A1 | 5/2021 | Eisner |
| 2021/0180815 A1 | 6/2021 | Shamoon et al. |
| 2021/0191485 A1 | 6/2021 | Raji et al. |
| 2021/0200430 A1 | 7/2021 | Sundermeyer et al. |
| 2021/0226811 A1 | 7/2021 | Kitchen et al. |
| 2021/0233384 A1 | 7/2021 | Baum et al. |
| 2021/0250726 A1 | 8/2021 | Jones |
| 2021/0326451 A1 | 10/2021 | Mariano |
| 2021/0335123 A1 | 10/2021 | Trundle et al. |
| 2021/0367921 A1 | 11/2021 | Baum et al. |
| 2021/0377230 A1 | 12/2021 | Baum et al. |
| 2021/0383675 A1 | 12/2021 | Cohn et al. |
| 2021/0407279 A1 | 12/2021 | Baum et al. |
| 2022/0006779 A1 | 1/2022 | Baum et al. |
| 2022/0021552 A1 | 1/2022 | Ansari et al. |
| 2022/0027051 A1 | 1/2022 | Kant et al. |
| 2022/0029994 A1 | 1/2022 | Choyi et al. |
| 2022/0038440 A1 | 2/2022 | Boynton et al. |
| 2022/0057917 A1 | 2/2022 | Fulker et al. |
| 2022/0057925 A1 | 2/2022 | Dawes |
| 2022/0060969 A1 | 2/2022 | Cohn et al. |
| 2022/0070135 A1 | 3/2022 | Gerald et al. |
| 2022/0070262 A1 | 3/2022 | kitchen et al. |
| 2022/0073052 A1 | 3/2022 | Zhou et al. |
| 2022/0159334 A1 | 5/2022 | Wang et al. |
| 2022/0247624 A1 | 8/2022 | Johnson et al. |
| 2022/0415104 A1 | 12/2022 | McLachlan et al. |
| 2023/0057193 A1 | 2/2023 | Ansari et al. |

FOREIGN PATENT DOCUMENTS

| | | |
|---|---|---|
| AU | 2011250886 A1 | 1/2013 |
| AU | 2013284428 A1 | 2/2015 |
| AU | 2011305163 B2 | 12/2016 |
| AU | 2017201365 A1 | 3/2017 |
| AU | 2017201585 A1 | 3/2017 |
| BE | 1008939 A6 | 10/1996 |
| CA | 2203813 A1 | 6/1996 |
| CA | 2174482 A1 | 10/1997 |
| CA | 2346638 A1 | 4/2000 |
| CA | 2389958 A1 | 3/2003 |
| CA | 2878117 A1 | 1/2014 |
| CA | 2559842 C | 5/2014 |
| CA | 2992429 A1 | 12/2016 |
| CA | 2976682 A1 | 2/2018 |
| CA | 2976802 A1 | 2/2018 |
| CN | 1599999 A | 3/2005 |
| CN | 102834818 A | 12/2012 |
| CN | 102985915 A | 3/2013 |
| DE | 102004027893 A1 | 1/2006 |
| EP | 0295146 A2 | 12/1988 |
| EP | 0308046 A2 | 3/1989 |
| EP | 0591585 A1 | 4/1994 |
| EP | 1117214 A2 | 7/2001 |
| EP | 1119837 A1 | 8/2001 |
| EP | 0978111 | 11/2001 |
| EP | 1738540 A2 | 1/2007 |
| EP | 1881716 A1 | 1/2008 |
| EP | 2112784 A1 | 10/2009 |
| EP | 2188794 A1 | 5/2010 |
| EP | 2191351 A1 | 6/2010 |
| EP | 2327063 A1 | 6/2011 |
| EP | 2483788 A1 | 8/2012 |
| EP | 2569712 A1 | 3/2013 |
| EP | 2619686 A1 | 7/2013 |
| EP | 2868039 A2 | 5/2015 |
| EP | 3031206 A2 | 6/2016 |
| EP | 3285238 A2 | 2/2018 |
| EP | 3308222 A1 | 4/2018 |
| FR | 2584217 A1 | 1/1987 |
| FR | 2661023 A1 | 10/1991 |
| FR | 2793334 A1 | 11/2000 |
| GB | 2222288 A | 2/1990 |
| GB | 2273593 A | 6/1994 |
| GB | 2286423 A | 8/1995 |
| GB | 2291554 A | 1/1996 |
| GB | 2319373 A | 5/1998 |
| GB | 2320644 A | 6/1998 |
| GB | 2324630 A | 10/1998 |
| GB | 2325548 A | 11/1998 |
| GB | 2335523 A | 9/1999 |
| GB | 2349293 A | 10/2000 |
| GB | 2370400 A | 6/2002 |
| GB | 2375449 A | 11/2002 |
| GB | 2442628 A | 4/2008 |
| GB | 2442633 A | 4/2008 |
| GB | 2442640 A | 4/2008 |
| GB | 2428821 B | 6/2008 |
| IN | 45/2015 | 11/2015 |
| IN | 04/2016 | 1/2016 |
| JP | 63-033088 A | 2/1988 |

(56) References Cited

FOREIGN PATENT DOCUMENTS

| | | |
|---|---|---|
| JP | 05-167712 A | 7/1993 |
| JP | 06-339183 A | 12/1993 |
| JP | 08-227491 | 9/1996 |
| JP | 10-004451 A | 1/1998 |
| JP | 10-108156 A | 4/1998 |
| JP | 11-234277 A | 8/1999 |
| JP | 2000-006343 A | 1/2000 |
| JP | 2000-023146 A | 1/2000 |
| JP | 2000-278671 A | 10/2000 |
| JP | 2001-006088 A | 1/2001 |
| JP | 2001-006343 A | 1/2001 |
| JP | 2001-069209 A | 3/2001 |
| JP | 2002-055895 | 2/2002 |
| JP | 2002-185629 | 6/2002 |
| JP | 2003-085258 A | 3/2003 |
| JP | 2003-141659 A | 5/2003 |
| JP | 2003-281647 A | 10/2003 |
| JP | 2004-192659 A | 7/2004 |
| JP | 2006-094394 A | 4/2006 |
| JP | 2007-529826 A | 10/2007 |
| JP | 2009-213107 A | 9/2009 |
| JP | 2010-140091 A | 6/2010 |
| KR | 10-2005-0051577 A | 6/2005 |
| KR | 10-2005-0052826 A | 6/2005 |
| KR | 10-2006-0021605 A | 3/2006 |
| KR | 10-0771941 B1 | 10/2007 |
| TW | 340934 B | 9/1998 |
| TW | 1239176 B | 9/2005 |
| TW | 201101243 A | 1/2011 |
| TW | 201102976 A | 1/2011 |
| TW | 201102978 A | 1/2011 |
| TW | I340934 B | 4/2011 |
| TW | 201117141 A | 5/2011 |
| TW | 1480839 B | 4/2015 |
| TW | 1480840 B | 4/2015 |
| TW | 1509579 B | 11/2015 |
| TW | 1517106 B | 1/2016 |
| WO | 89/07855 A1 | 8/1989 |
| WO | 89/11187 A1 | 11/1989 |
| WO | 94/03881 A1 | 2/1994 |
| WO | 95/13944 A1 | 5/1995 |
| WO | 96/36301 A1 | 11/1996 |
| WO | 97/13230 A2 | 4/1997 |
| WO | 98/25243 A1 | 6/1998 |
| WO | 98/49663 A1 | 11/1998 |
| WO | 98/52343 A1 | 11/1998 |
| WO | 98/59256 A2 | 12/1998 |
| WO | 99/34339 A2 | 7/1999 |
| WO | 00/21053 A1 | 4/2000 |
| WO | 00/36812 A1 | 6/2000 |
| WO | 00/72598 A1 | 11/2000 |
| WO | 01/11586 A1 | 2/2001 |
| WO | 01/52478 A2 | 7/2001 |
| WO | 01/71489 A1 | 9/2001 |
| WO | 01/86622 A1 | 11/2001 |
| WO | 01/99078 A2 | 12/2001 |
| WO | 02/11444 A1 | 2/2002 |
| WO | 02/21300 A1 | 3/2002 |
| WO | 02/97584 A2 | 12/2002 |
| WO | 2002/100083 | 12/2002 |
| WO | 2003/026305 A1 | 3/2003 |
| WO | 03/40839 A1 | 5/2003 |
| WO | 03/49379 A1 | 6/2003 |
| WO | 03/98908 A1 | 11/2003 |
| WO | 2004/004222 A1 | 1/2004 |
| WO | 2004/077307 A1 | 9/2004 |
| WO | 2004/098127 A1 | 11/2004 |
| WO | 2004/107710 A1 | 12/2004 |
| WO | 2005/047990 A2 | 5/2005 |
| WO | 2005/091218 A2 | 9/2005 |
| WO | 2006/122487 A1 | 11/2006 |
| WO | 2007/038872 A1 | 4/2007 |
| WO | 2007/124453 A2 | 11/2007 |
| WO | 2008/056320 A1 | 5/2008 |
| WO | 2009/006670 A1 | 1/2009 |
| WO | 2009/023647 A1 | 2/2009 |
| WO | 2009/029590 A1 | 3/2009 |
| WO | 2009/029597 A1 | 3/2009 |
| WO | 2009/064795 A1 | 5/2009 |
| WO | 2009/145747 A1 | 12/2009 |
| WO | 2010/019624 A1 | 2/2010 |
| WO | 2010/025468 A1 | 3/2010 |
| WO | 2010/127009 A1 | 11/2010 |
| WO | 2010/127194 A2 | 11/2010 |
| WO | 2010/127200 A1 | 11/2010 |
| WO | 2010/127203 A1 | 11/2010 |
| WO | 2011/038409 A1 | 3/2011 |
| WO | 2011/063354 A1 | 5/2011 |
| WO | 2011/143273 A1 | 11/2011 |
| WO | 2012/040653 A1 | 3/2012 |
| WO | 2014/004911 A2 | 1/2014 |
| WO | 2015/021469 A2 | 2/2015 |
| WO | 2015/134520 A1 | 9/2015 |
| WO | 2015/176775 A1 | 11/2015 |
| WO | 2016/201033 A1 | 12/2016 |
| ZA | 201302668 | 6/2014 |

OTHER PUBLICATIONS

US Patent Application filed Sep. 22, 2023, entitled "Communication Protocols Over Internet Protocol (Ip) Networks", U.S. Appl. No. 18/472,408.

US Patent Application filed Sep. 22, 2023, entitled "Cross-Client Sensor User Interface in an Integrated Security Network", U.S. Appl. No. 18/472,628.

US Patent Application filed Sep. 25, 2023, entitled "Control System User Interface", U.S. Appl. No. 18/474,039.

US Patent Application filed Oct. 9, 2023, entitled "Integrated Security System With Parallel Processing Architecture", U.S. Appl. No. 18/483,080.

US Patent Application filed Oct. 9, 2023, entitled "Method and System for Managing Communication Connectivity", U.S. Appl. No. 18/483,196.

US Patent Application filed Oct. 26, 2023, entitled "Controlling Data Routing in Premises Management Systems", U.S. Appl. No. 18/495,430.

US Patent Application filed Nov. 6, 2023, entitled "Method, System and Apparatus for Automated Inventory Reporting of Security, Monitoring and Automation Hardware and Software at Customer Premises", U.S. Appl. No. 18/503,102.

US Patent Application filed Nov. 22, 2023, entitled "Communication Protocols Over Internet Protocol (IP) Networks", U.S. Appl. No. 18/517,821.

US Patent Application filed Nov. 27, 2023, entitled "Networked Touchscreen With Integrated Interfaces", U.S. Appl. No. 18/520,373.

Final Office Action mailed Sep. 14, 2011 for U.S. Appl. No. 12/197,931, filed Aug. 25, 2008.

Foreign communication from a related counterpart application-International Preliminary Examination Report, App No. PCT/US02/14450, Mar. 2, 2004, 4 pgs.

Foreign communication from a related counterpart application-International Search Report, App No. PCT/US02/14450, Dec. 17, 2002, 6 pgs.

Foreign communication from a related counterpart application—Written Opinion, App No. PCT/US02/14450, Oct. 21, 2003, 4 pgs.

Form PCT/ISA/210, "PCT International Search Report for the Application No. PCT/US05/08766 (ICON.P020)," May 23, 2006, 2 pages.

Form PCT/ISA/210, "PCT International Search Report for the Application No. PCT/US08/72831 (ICON.P001WO)," Nov. 4, 2008, 2 pages.

Form PCT/ISA/210, "PCT International Search Report for the Application No. PCT/US08/74246 (ICON.P003WO)," Nov. 14, 2008, 2 pages.

Form PCT/ISA/210, "PCT International Search Report for the Application No. PCT/US08/74260 (ICON.P002WO)," Nov. 13, 2008, 2 pages.

Form PCT/ISA/210, "PCT International Search Report for the Application No. PCT/US08/83254," Jan. 14, 2009, 2 pages.

(56) References Cited

OTHER PUBLICATIONS

Form PCT/ISA/210, "PCT International Search Report for the Application No. PCT/US09/53485 (ICON.P011WO)," Oct. 22, 2009, 2 pages.
Form PCT/ISA/210, "PCT International Search Report for the Application No. PCT/US09/55559 (ICON.P012WO)," Nov. 12, 2009, 2 pages.
Form PCT/ISA/210, "PCT International Search Report for the Application No. PCT/US10/50585 (ICON.P014WO)," Dec. 30, 2010, 2 pages.
Form PCT/ISA/210, "PCT International Search Report for the Application No. PCT/US10/57674 (ICON.P015WO)," Mar. 2, 2011, 2 pages.
Form PCT/ISA/210, "PCT International Search Report for the Application No. PCT/US11/34858 (ICON.P017WO)," Oct. 3, 2011, 2 pages.
Form PCT/ISA/210, "PCT International Search Report for the Application No. PCT/US11/35994 (ICON.P016WO)," Sep. 28, 2011, 2 pages.
Form PCT/ISA/210, "PCT International Search Report for the Application No. PCT/US11/53136 (ICON.P019WO)," Jan. 5, 2012, 2 pages.
Form PCT/ISA/220, "PCT Notification of Transmittal of the International Search Report and the Written Opinion fo the International Searching Authority, or the Declaration for the Application No. PCT/US08/74260," Nov. 13, 2008, 1 page.
Form PCT/ISA/220, "PCT Notification of Transmittal of the International Search Report and the Written Opinion of the International Searching Authority, or the Declaration for the Application No. PCT/US08/72831 (ICON.P001 WO)," Nov. 4, 2008, 1 page.
Form PCT/ISA/220, "PCT Notification of Transmittal of the International Search Report and the Written Opinion of the International Searching Authority, or the Declaration for the Application No. PCT/US08/74246 (ICON.P003WO)" Nov. 14, 2008, 1 page.
Form PCT/ISA/220, "PCT Notification of Transmittal of the International Search Report and the Written Opinion of the International Searching Authority, or the Declaration for the Application No. PCT/US08/83254," Jan. 14, 2009, 1 page.
Form PCT/ISA/220, "PCT Notification of Transmittal of the International Search Report and the Written Opinion of the International Searching Authority, or the Declaration for the Application No. PCT/US09/53485 (ICON.P011 WO), " Oct. 22, 2009, 1 page.
Form PCT/ISA/220, "PCT Notification of Transmittal of the International Search Report and the Written Opinion of the International Searching Authority, or the Declaration for the Application No. PCT/US09/55559 (ICON.P012WO)," Nov. 12, 2009, 1 page.
Form PCT/ISA/220, "PCT Notification of Transmittal of the International Search Report and the Written Opinion of the International Searching Authority, or the Declaration for the Application No. PCT/US10/50585 (ICON.P014WO)," Dec. 30, 2010, 1 page.
Form PCT/ISA/220, "PCT Notification of Transmittal of the International Search Report and the Written Opinion of the International Searching Authority, or the Declaration for the Application No. PCT/US10/57674 (ICON.P015WO)," Mar. 2, 2011, 1 page.
Form PCT/ISA/220, "PCT Notification of Transmittal of the International Search Report and the Written Opinion of the International Searching Authority, or the Declaration for the Application No. PCT/US11/35994 (ICON.P016WO)," Sep. 28, 2011, 1 page.
Form PCT/ISA/220, PCT Notification of Transmittal of the International Search Report and the Written Opinion of the International Searching Authority, or the Declaration for the Application No. PCT/US05/08766, May 23, 2006, 1 page.
Form PCT/ISA/237, " PCT Written Opinion ofthe International Searching Authority for the Application No. PCT/US05/08766 (ICON.P020)," May 23, 2006, 5 pages.
Form PCT/ISA/237, "PCT Written Opinion of the International Searching Authority for the Application No. PCT/US08/72831 (ICON.P001WO)," Nov. 4, 2008, 6 pages.
Form PCT/ISA/237, "PCT Written Opinion of the International Searching Authority for the Application No. PCT/US08/74246 (ICON.P003WO)," Nov. 14, 2008, 6 pages.
Form PCT/ISA/237, "PCT Written Opinion of the International Searching Authority for the Application No. PCT/US08/74260 (ICON.P002WO), " Nov. 13, 2008, 6 pages.
Form PCT/ISA/237, "PCT Written Opinion of the International Searching Authority for the Application No. PCT/US09/53485 (ICON.P011 WO)," Oct. 22, 2009, 8 pages.
Form PCT/ISA/237, "PCT Written Opinion of the International Searching Authority for the Application No. PCT/US09/55559 (ICON.P012WO)," Nov. 12, 2009, 6 pages.
Form PCT/ISA/237, "PCT Written Opinion of the International Searching Authority for the Application No. PCT/US10/50585 (ICON.P014WO)," Dec. 30, 2010, 7 pages.
Form PCT/ISA/237, "PCT Written Opinion of the International Searching Authority for the Application No. PCT/US10/57674 (ICON.P015WO), " Mar. 2, 2011, 6 pages.
Form PCT/ISA/237, "PCT Written Opinion of the International Searching Authority for the Application No. PCT/US11/34858 (ICON.P017WO)," Oct. 3, 2011, 8 pages.
Form PCT/ISA/237, "PCT Written Opinion of the International Searching Authority for the Application No. PCT/US11/35994 (ICON.P016WO)," Sep. 28, 2011, 11 pages.
Form PCT/ISA/237, "PCT Written Opinion of the International Searching Authority for the Application No. PCT/US11/53136 (ICON.P019WO), " Jan. 5, 2012.
Form PCT/ISA/237, "PCT Written Opinion of the International Searching Authority of the Application No. PCT/US08/83254 (ICON.P005WO)," Jan. 14, 2009, 7 pages.
Fujii et al., "Community security platform for individually maintained home computers: The Vigilante Network Project", Proceedings of the 21st IEEE Instrumentation and Measurement Technology Conference, 2004, vol. 2, pp. 891-894.
Gateway Registry Methods and Systems, U.S. Appl. No. 13/486,276, filed Jun. 1, 2012.
Genex OmniEye http://www.qenextech.com/prod01.htm, 1999 5 pages.
Gong, Li, A Software architecture for open service gateways, Internet Computing, IEEE 5.1, Jan.-Feb. 2001, 64-70.
Grayelectronics, "Digitizing TV cameras on TCP/IP Computer Networks," http://www.grayelectronics.com/default.htm, printed on Oct. 12, 1999 (2 pages).
GrayElectronics, http://www.grayelectronics.com; webpage accessed on Jan. 10, 2018.
GTI Genex Technologies, Inc. OmniEye.(Trademark). Product Brochure, Sep. 14, 1999 (5 pages).
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012, corresponds to W02011/143273 filed Nov. 17, 2011.
Indian Patent App. No. 3687/DELNP/2012, corresponds to W02011/038409 filed on Sep. 28, 2010.
Indicate. Memam-Webster.com Dictionary, Merriam-Webster, https://web.archive.org/web/20061209080613/https://www.merriam-webster.com/dictionary/indicate. Dec. 9, 2006.
International Search Report for Application No. PCT/US13/48324, mailed on Jan. 14, 2014, 2 pages.
International Search Report for Application No. PCT/US2014/050548, mailed on Mar. 18, 2015, 4 pages.
J. David Eisenberg, SVG Essentials: Producing Scalable Vector Graphics with XML. O'Reilly & Associates, Inc., Sebastopol, CA 2002.
K. Lee, D. Murray, D. Hughes and W. Joosen, "Extending sensor networks into the Cloud using Amazon Web Services," 2010 IEEE International Conference on Networked Embedded Systems for Enterprise Applications, 2010.
Kobayashi et al., "Creating worldwide community safety with present technology and privacy protection: The e-JIKEI Network project", Procedia-Social and Behavioral Sciences, 2010, vol. 2, pp. 6-13.

(56) References Cited

OTHER PUBLICATIONS

Lagotek Wireless Flome Automation System, May 2006 [retrieved on Aug. 22, 2012].
Network Working Group, Request for Comments H.Schulzrinne Apr. 1998.
Non-Final Office Action mailed Apr. 4, 2013 for U.S. Appl. No. 12/197,931, filed Aug. 25, 2008.
Non-Final Office Action mailed Mar. 4, 2013 for U.S. Appl. No. 13/400,477, filed Feb. 20, 2012.
Non-Final Office Action mailed May 5, 2010 for U.S. Appl. No. 12/189,780, filed Aug. 11, 2008.
Non-Final Office Action mailed May 5, 2010 for U.S. Appl. No. 12/189,785, filed Aug. 11, 2008.
Non-Final Office Action mailed Feb. 7, 2012 for U.S. Appl. No. 12/637,671, filed Dec. 14, 2009.
Non-Final Office Action mailed Feb. 7, 2013 for U.S. Appl. No. 12/970,313, filed Dec. 16, 2010.
Non-Final Office Action mailed Feb. 8, 2012 for U.S. Appl. No. 12/630,092, filed Dec. 3, 2009.
Non-Final Office Action mailed Apr. 9, 2012 for U.S. Appl. No. 12/771,624, filed Apr. 30, 2010.
Non-Final Office Action mailed Dec. 9, 2008 for U.S. Appl. No. 11/084,232, filed Mar. 16, 2005.
Non-Final Office Action mailed Aug. 10, 2012 for U.S. Appl. No. 12/771,471, filed Apr. 30, 2010.
Non-Final Office Action mailed Oct. 11, 2012 for U.S. Appl. No. 12/019,568, filed Jan. 24, 2008.
Non-Final Office Action mailed Apr. 12, 2012 for U.S. Appl. No. 12/770,365, filed Apr. 29, 2010.
Non-Final Office Action mailed Jul. 12, 2012 for U.S. Appl. No. 12/691,992, filed Jan. 22, 2010.
Non-Final Office Action mailed Oct. 12, 2012 for U.S. Appl. No. 12/630,092, filed Dec. 3, 2009.
Non-Final Office Action mailed Sep. 12, 2012 for U.S. Appl. No. 12/952,080, filed Nov. 22, 2010.
Non-Final Office Action mailed Jul. 13, 2010 for U.S. Appl. No. 12/019,568, filed Jan. 24, 2008.
Non-Final Office Action mailed Nov. 14, 2012 for U.S. Appl. No. 13/531,757, filed Jun. 25, 2012.
Non-Final Office Action mailed Sep. 14, 2010 for U.S. Appl. No. 11/084,232, filed Mar. 16, 2005.
Non-Final Office Action mailed Sep. 16, 2011 for U.S. Appl. No. 12/539,537, filed Aug. 11, 2009.
Non-Final Office Action mailed Sep. 17, 2012 for U.S. Appl. No. 12/189,780, filed Aug. 11, 2008.
Non-Final Office Action mailed Aug. 18, 2011 for U.S. Appl. No. 12/197,958, filed Aug. 25, 2008.
Non-Final Office Action mailed Feb. 18, 2011 for U.S. Appl. No. 12/630,092, filed Dec. 3, 2009.
Non-Final Office Action mailed Jan. 18, 2012 for U.S. Appl. No. 12/771,071, filed Apr. 30, 2010.
Non-Final Office Action mailed Jul. 21, 2010 for U.S. Appl. No. 12/630,092, filed Dec. 3, 2009.
Non-Final Office Action mailed Dec. 22, 2010 for U.S. Appl. No. 12/197,931, filed Aug. 25, 2008.
Non-Final Office Action mailed Jul. 22, 2013 for U.S. Appl. No. 12/630,092, filed Dec. 3, 2009.
Non-Final Office Action mailed Jan. 26, 2012 for U.S. Appl. No. 12/019,568, filed Jan. 24, 2008.
Non-Final Office Action mailed Nov. 26, 2010 for U.S. Appl. No. 12/197,958, filed Aug. 25, 2008.
Non-Final Office Action mailed Jun. 27, 2013 for U.S. Appl. No. 12/019,568, filed Jan. 24, 2008.
Non-Final Office Action mailed Dec. 30, 2009 for U.S. Appl. No. 11/084,232, filed Mar. 16, 2005.
Non-Final Office Action mailed May 30, 2008 for U.S. Appl. No. 11/084,232, filed Mar. 16, 2005.
Non-Final Office Action mailed Apr. 13, 2010 for U.S. Appl. No. 11/761,745, filed Jun. 12, 2007.
Non-Final Office Action mailed Feb. 21, 2013 for U.S. Appl. No. 12/771,372, filed Apr. 30, 2010.
Non-Final Office Action mailed Jan. 5, 2010 for U.S. Appl. No. 12/019,554, filed Jan. 24, 2008.
Non-Final Office Action mailed May 23, 2013 for U.S. Appl. No. 13/104,932, filed May 10, 2011.
Non-Final Office Action mailed May 23, 2013 for U.S. Appl. No. 13/104,936, filed May 10, 2011.
Non-Final Rejection Mailed on Jan. 20, 2023 for U.S. Appl. No. 17/712,911, 8 pages.
Notice of Allowance mailed May 14, 2013 for U.S. Appl. No. 12/637,671, filed Dec. 14, 2009.
Notice of Allowance mailed Oct. 25, 2012 for U.S. Appl. No. 11/084,232, filed Mar. 16, 2005.
Oxford Dictionary, Definition of "application", 2021, 2 pages (Year: 2021).
US Patent Application filed Jun. 1, 2022, entitled "Integrated Cloud System for Premises Automation", U.S. Appl. No. 17/804,941.
US Patent Application filed Jun. 8, 2022, entitled "Methods and Systems for Data Communication", U.S. Appl. No. 17/835,394.
US Patent Application filed Jun. 9, 2021, entitled "Premises Management Configuration and Control", U.S. Appl. No. 17/343,315.
US Patent Application filed Jun. 10, 2020, entitled "Method and System for Communicating With and Controlling an Alarm System From a Remote Server", U.S. Appl. No. 16/898,146.
US Patent Application filed Jun. 10, 2022, entitled "Media Content Management", U.S. Appl. No. 17/838,046.
US Patent Application filed Jun. 10, 2022, entitled "Method, System and Apparatus for Automated Reporting of Account and Sensor Zone Information to a Central Station", U.S. Appl. No. 17/806,341.
US Patent Application filed Jun. 18, 2021, entitled "Controlling Data Routing Among Networks", U.S. Appl. No. 17/304,342.
US Patent Application filed Jun. 22, 2022, entitled "Activation of Gateway Device", U.S. Appl. No. 17/808,146.
US Patent Application filed Jun. 22, 2022, entitled "Automation System User Interface With Three-Dimensional Display", U.S. Appl. No. 17/808,275.
US Patent Application filed Jun. 22, 2022, entitled "Communication Protocols in Integrated Systems", U.S. Appl. No. 17/808,118.
US Patent Application filed Jun. 24, 2020, entitled "Method and System for Processing Security Event Data", U.S. Appl. No. 16/910,967.
US Patent Application filed Jun. 27, 2018, entitled "Activation of Gateway Device", U.S. Appl. No. 16/020,499.
US Patent Application filed Jul. 1, 2022, entitled "Forming a Security Network Including Integrated Security System Components", U.S. Appl. No. 17/856,448.
US Patent Application filed Jul. 2, 2019, entitled "Communication Protocols in Integrated Systems", U.S. Appl. No. 16/460,712.
US Patent Application filed Jul. 3, 2018, entitled "WIFI-To-Serial Encapsulation In Systems", U.S. Appl. No. 16/026,703.
US Patent Application filed Jul. 9, 2020, entitled "Automation System With Mobile Interface", U.S. Appl. No. 16/925,026.
US Patent Application filed Jul. 12, 2018, entitled "Integrated Security System with Parallel Processing Architecture", U.S. Appl. No. 16/034,132.
US Patent Application filed Jul. 13, 2023, entitled "Methods and Systems for Data Communication", U.S. Appl. No. 18/351,636.
US Patent Application filed Jul. 20, 2018, entitled "Cross-Client Sensor User Interface in an Integrated Security Network", U.S. Appl. No. 16/041,291.
US Patent Application filed Jul. 21, 2023, entitled "Communication Protocols in Integrated Systems", U.S. Appl. No. 18/356,337.
US Patent Application filed Jul. 26, 2019, entitled "Device Integration Framework", U.S. Appl. No. 16/522,949.
US Patent Application filed Jul. 26, 2021, entitled "Notification of Event Subsequent To Communication Failure With Security System", U.S. Appl. No. 17/443,427.
US Patent Application filed Jul. 28, 2016, entitled "Method and System for Automatically Providing Alternate Network Access for Telecommunications", U.S. Appl. No. 15/222,416.
US Patent Application filed Jul. 30, 2021, entitled "Gateway Integrated With Premises Security System", U.S. Appl. No. 17/390,222.

(56) References Cited

OTHER PUBLICATIONS

US Patent Application filed Aug. 3, 2022, entitled "Premises Management Networking", U.S. Appl. No. 17/817,210.
US Patent Application filed Aug. 8, 2016, entitled "Security, Monitoring and Automation Controller Access and Use of Legacy Security Control Panel Information", U.S. Appl. No. 15/231,273.
US Patent Application filed Aug. 9, 2016, entitled "Controller and Interface for Home Security, Monitoring and Automation Having Customizable Audio Alerts for SMA Events", 15/232, 135.
US Patent Application filed Aug. 9, 2018, entitled "Method and System for Processing Security Event Data", U.S. Appl. No. 16/059,833.
US Patent Application filed Aug. 10, 2021, entitled "Media Content Management", U.S. Appl. No. 17/398,939.
US Patent Application filed Aug. 11, 2022, entitled "Security Network Integrating Security System and Network Devices", U.S. Appl. No. 17/819,083.
US Patent Application filed Aug. 16, 2021, entitled "Control System User Interface", U.S. Appl. No. 17/403,526.
US Patent Application filed Aug. 16, 2023, entitled "Mobile Premises Automation Platform", U.S. Appl. No. 18/450,878.
US Patent Application filed Aug. 21, 2018, entitled "Premises System Management Using Status Signal". U.S. Appl. No. 16/107,568.
US Patent Application filed Aug. 23, 2019, entitled "Premises System Management Using Status Signal", U.S. Appl. No. 16/549,837.
US Patent Application filed Aug. 23, 2021, entitled "Method and System for Providing Alternate Network Access", U.S. Appl. No. 17/409,528.
US Patent Application filed Aug. 25, 2023, entitled "Automation System With Mobile Interface", U.S. Appl. No. 18/456,355.
US Patent Application filed Aug. 26, 2020, entitled "Automation System User Interface With Three-Dimensional Display", U.S. Appl. No. 17/003,550.
US Patent Application filed Aug. 31, 2021, entitled "Networked Touchscreen With Integrated Interfaces", U.S. Appl. No. 17/463,267.
US Patent Application filed Sep. 1, 2023, entitled "Communication and Automation in a Premises Management System", U.S. Appl. No. 18/460,355.
US Patent Application filed Sep. 6, 2018, entitled "Takeover of Security Network", U.S. Appl. No. 16/123,695.
US Patent Application filed Sep. 7, 2021, entitled "Gateway Registry Methods and Systems", U.S. Appl. No. 17/468,188.
US Patent Application filed Sep. 8, 2021, entitled "User Interface in a Premises Network", U.S. Appl. No. 17/469,417.
US Patent Application filed Sep. 9, 2021, entitled "Premises System Management Using Status Signal" U.S. Appl. No. 17/470,732.
US Patent Application filed Sep. 10, 2020, entitled "Security System With Networked Touchscreen", U.S. Appl. No. 17/017,519.
US Patent Application filed Sep. 11, 2020, entitled "Management of Applications for a Device Located at a Premises", U.S. Appl. No. 17/018,901.
US Patent Application filed Sep. 17, 2018, entitled "Integrated Security System With Parallel Processing Architecture", U.S. Appl. No. 16/133,135.
US Patent Application filed Sep. 22, 2022, entitled "Forming a Security Network Including Integrated Security System Components and Network Devices", U.S. Appl. No. 17/934,443.
US Patent Application filed Sep. 27, 2019, entitled "Control System User Interface", U.S. Appl. No. 16/585,481.
US Patent Application filed Sep. 28, 2018, entitled "Control System User Interface", U.S. Appl. No. 16/146,715.
US Patent Application filed Sep. 28, 2018, entitled "Forming a Security Network Including Integrated Security System Components and Network Devices", U.S. Appl. No. 16/147,044.
US Patent Application filed Sep. 11, 2018, entitled "Premises Management Networking", U.S. Appl. No. 16/128,089.
US Patent Application filed Oct. 1, 2018, entitled "Integrated Security System With Parallel Processing Architecture", U.S. Appl. No. 16/148,387.
US Patent Application filed Oct. 1, 2018, entitled "Integrated Security System with Parallel Processing Architecture", U.S. Appl. No. 16/148,411.
US Patent Application filed Oct. 1, 2018, entitled "User Interface In A Premises Network", U.S. Appl. No. 16/148,572.
US Patent Application filed Oct. 3, 2018, entitled "Activation of a Home Automation Controller", U.S. Appl. No. 16/150,973.
US Patent Application filed Oct. 7, 2022, entitled "Security System With Networked Touchscreen", U.S. Appl. No. 18/045,018.
US Patent Application filed Oct. 8, 2020, entitled "Communication Protocols in Integrated Systems", U.S. Appl. No. 17/065,841.
US Patent Application filed Oct. 10, 2018, entitled "Method and System for Providing Alternate Network Access", U.S. Appl. No. 16/156,448.
US Patent Application filed Oct. 12, 2020, entitled "Integrated Security System With Paralle Processing Architecture", U.S. Appl. No. 17/068,584.
US Patent Application filed Oct. 12, 2020, entitled "Integrated Security System With Parallel Processing Architecture", U.S. Appl. No. 17/068,584.
US Patent Application filed Oct. 13, 2017, entitled "Notification of Event Subsequent to Communication Failure With Security System", U.S. Appl. No. 15/783,858.
US Patent Application filed Oct. 18, 2018, entitled "Generating Risk Profile Using Data of Home Monitoring and Security System", U.S. Appl. No. 16/164,114.
US Patent Application filed Oct. 18, 2019, entitled "Wifi-To-Serial Encapsulation in Systems", U.S. Appl. No. 16/656,874.
US Patent Application filed Oct. 25, 2021, entitled "Forming a Security Network Including Integrated Security System Components and Network Devices", U.S. Appl. No. 17/510,022.
US Patent Application filed Oct. 27, 2017, entitled "Security System With Networked Touchscreen", U.S. Appl. No. 15/796,421.
US Patent Application filed Nov. 10, 2020, entitled "Integrated Cloud System for Premises Automation", U.S. Appl. No. 17/094,120.
US Patent Application filed Nov. 15, 2021, entitled "Communication Protocols in Integrated Systems", U.S. Appl. No. 17/526,915.
US Patent Application filed Nov. 15, 2021, entitled "Integrated Cloud System With Lightweight Gateway for Premises Automation", U.S. Appl. No. 17/455,005.
US Patent Application filed Nov. 19, 2019, entitled "Integrated Cloud System With Lightweight Gateway for Premises Automation", U.S. Appl. No. 16/688,717.
US Patent Application filed Nov. 23, 2021, entitled "Security, Monitoring and Automation Controller Access and Use of Legacy Security Control Panel Information", U.S. Appl. No. 17/534,088.
US Patent Application filed Nov. 25, 2020, entitled "Premises Management Networking", U.S. Appl. No. 17/105,235.
US Patent Application filed Nov. 26, 2019, entitled "Communication Protocols Over Internet Protocol (IP) Networks", U.S. Appl. No. 16/696,657.
US Patent Application filed Nov. 28, 2017, entitled "Forming A Security Network Including Integrated Security System Components", U.S. Appl. No. 15/824,503.
US Patent Application filed Nov. 29, 18, entitled "Premise Management Systems and Methods", U.S. Appl. No. 16/204,442.
US Patent Application filed Nov. 29, 2022, entitled "Communication Protocols Over Internet Protocol (IP) Networks", U.S. Appl. No. 18/059,604.
US Patent Application filed Nov. 30, 2017, entitled "Controller and Interface for Home Security, Monitoring and Automation Having Customizable Audio Alerts for SMA Events", U.S. Appl. No. 15/828,030.
US Patent Application filed Nov. 30, 2022, entitled "Custom Content for Premises Management", U.S. Appl. No. 18/060,374.
US Patent Application filed Dec. 1, 2022, entitled "Controlling Data Routing in Premises Management Systems", U.S. Appl. No. 18/073,514.
US Patent Application filed Dec. 3, 2021, entitled "Communication Protocols in Integrated Systems", U.S. Appl. No. 17/542,302.
US Patent Application filed Dec. 3, 2021, entitled "Control System User Interface", U.S. Appl. No. 17/457,463.

(56) References Cited

OTHER PUBLICATIONS

US Patent Application filed Dec. 3, 2021, entitled "Method and System for Managing Communication Connectivity", U.S. Appl. No. 17/542,310.
US Patent Application filed Dec. 9, 2020, entitled "Integrated Security System With Parallel Processing Architecture", U.S. Appl. No. 17/115,936.
US Patent Application filed Dec. 14, 2018, entitled "Communication Protocols Over Internet Protocol (IP) Networks", U.S. Appl. No. 16/221,299.
US Patent Application filed Dec. 17, 2021, entitled "Cross-Client Sensor User Interface in an Integrated Security Network", U.S. Appl. No. 17/644,935.
US Patent Application filed Dec. 23, 2021, entitled "Defining and Implementing Sensor Triggered Response Rules", U.S. Appl. No. 17/645,889.
US Patent Application filed Dec. 27, 2018, entitled "Communication Protocols in Integrated Systems", U.S. Appl. No. 16/233,913.
US Patent Application filed Dec. 27, 2019, entitled "Premises Management Systems", U.S. Appl. No. 16/728,608.
US Patent Application filed Aug. 9, 18, entitled "Method and Systems for Processing Security Event Data", U.S. Appl. No. 16/059,833.
Valtchev, D., and I. Frankov. "Service gateway architecture for a smart home." Communications Magazine, IEEE 40.4 (2002): 126-132.
Visitalk, Communication with Vision, http://www.visitalk.jimbo.com; website accessed Jan. 10, 2018.
Wang et al, "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.
Wilkinson, S: "Logitech Harmony One Universal Remote" Ultimate AV magazine May 2008 (May 2008), XP002597782 Retrieved from the Internet : Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
Windows, Newton's Telecom Dictionary, 21st Edition, Mar. 2005, 937-938.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X. Li, R. Lu, X. Liang, X. Shen, J. Chen and X. Lin, "Smart community: an internet of things application," in IEEE Communications Magazine, vol. 49, No. 11, pp. 68-75, Nov. 2011, doi: 10.1109/MCOM.2011.6069711. (Year: 2011).
X10—ActiveHome, Home Automation Made Easy [retrieved on Nov. 4, 2003], 3 pages.
Yanni Zhai et al., Design of Smart Home Remote Monitoring System Based on Embedded System, 2011 IEEE 2nd International Conference on Computing, Control and Industrial Engineering, vol. 2, pp. 41-44.
US Patent Application filed Mar. 7, 2014, entitled "Security System Integrated With Social Media Platform", U.S. Appl. No. 14/201,133.
US Patent Application filed Mar. 10, 2014, entitled "Communication Protocols in Integrated Systems", U.S. Appl. No. 14/202,573.
US Patent Application filed Mar. 10, 2014, entitled "Communication Protocols in Integrated Systems", U.S. Appl. No. 14/202,592.
US Patent Application filed Mar. 10, 2014, entitled "Communication Protocols in Integrated Systems", U.S. Appl. No. 14/202,627.
US Patent Application filed Mar. 10, 2014, entitled "Communication Protocols in Integrated Systems", U.S. Appl. No. 14/202,685.
US Patent Application filed Mar. 10, 2014, entitled "Communication Protocols in Integrated Systems", U.S. Appl. No. 14/203,077.
US Patent Application filed Mar. 10, 2014, entitled "Communication Protocols in Integrated Systems", U.S. Appl. No. 14/203,084.
US Patent Application filed Mar. 10, 2014, entitled "Communication Protocols in Integrated Systems", U.S. Appl. No. 14/203,128.
US Patent Application filed Mar. 10, 2014, entitled "Communication Protocols in Integrated Systems", U.S. Appl. No. 14/203,141.
US Patent Application filed Mar. 10, 2014, entitled "Communication Protocols in Integrated Systems", U.S. Appl. No. 14/203,219.
US Patent Application filed Mar. 10, 2014, entitled "Communication Protocols Over Internet Protocol (IP) Networks", U.S. Appl. No. 14/202,505.
US Patent Application filed Mar. 10, 2014, entitled "Communication Protocols Over Internet Protocol (IP) Networks", U.S. Appl. No. 14/202,579.
US Patent Application filed Mar. 10, 2022, entitled "Virtual Device Systems and Methods", U.S. Appl. No. 17/691,774.
US Patent Application filed Mar. 11, 2020, entitled "Management of a Security System at a Premises", U.S. Appl. No. 16/816,134.
US Patent Application filed Mar. 15, 2021, entitled "Automation System User Interface", U.S. Appl. No. 17/202,279.
US Patent Application filed Mar. 17, 2021, entitled "Communication Protocols Over Internet Protocol (IP) Networks", U.S. Appl. No. 17/204,068.
US Patent Application filed Mar. 18, 2019, entitled "Server-Based Notification of Alarm Event Subsequent to Communication Failure With Armed Security System", U.S. Appl. No. 16/356,742.
US Patent Application filed Mar. 20, 2020, entitled "Security, Monitoring and Automation Controller Access and Use of Legacy Security Control Panel Information", U.S. Appl. No. 16/825,099.
US Patent Application filed Mar. 22, 2021, entitled "Premises Management Configuration and Control", U.S. Appl. No. 17/208,866.
US Patent Application filed Apr. 4, 2022, entitled "Control System User Interface", U.S. Appl. No. 17/712,911.
US Patent Application filed Apr. 6, 2022, entitled "Hardware Configurable Security, Monitoring and Automation Controller Having Modular Communication Protocol Interfaces", U.S. Appl. No. 17/714,499.
US Patent Application filed Apr. 8, 2021, entitled "System for Data Routing in Networks", U.S. Appl. No. 17/301,605.
US Patent Application filed Apr. 12, 2023, entitled "Integrated Security System With Parallel Processing Architecture", U.S. Appl. No. 18/299,394.
US Patent Application filed Apr. 14, 2022, entitled "Premises Management Configuration and Control", U.S. Appl. No. 17/659,259.
US Patent Application filed Apr. 14, 2022, entitled "Premises System Automation", U.S. Appl. No. 17/721,192.
US Patent Application filed Apr. 17, 2020, entitled "Method and System for Providing Alternate Network Access", U.S. Appl. No. 16/852,072.
US Patent Application filed Apr. 17, 2020, entitled "Networked Touchscreen With Integrated Interfaces", U.S. Appl. No. 16/852,058.
US Patent Application filed Apr. 17, 2023, entitled "Integrated Cloud System for Premises Automation", U.S. Appl. No. 18/301,626.
US Patent Application filed Apr. 17, 2023, entitled "Server-Based Notification of Alarm Event Subsequent to Communication Failure With Armed Security System", U.S. Appl. No. 18/301,923.
US Patent Application filed Apr. 18, 2022, entitled "Method and System for Processing Security Event Data", U.S. Appl. No. 17/723,101.
US Patent Application filed Apr. 18, 2023, entitled "Method and System for Providing Alternate Network Access", U.S. Appl. No. 18/302,661, U.S. Appl. No. 18/302,661.
US Patent Application filed Apr. 22, 2022, entitled "Communication Protocols in Integrated Systems", U.S. Appl. No. 17/727,470.
US Patent Application filed Apr. 23, 2019, entitled "Control System User Interface", U.S. Appl. No. 16/391,625.
US Patent Application filed Apr. 26, 2019, entitled "Custom Content for Premises Management", U.S. Appl. No. 16/396,368.
US Patent Application filed Apr. 27, 2023, entitled "Integrated Cloud System With Lightweight Gateway for Premises Automation", U.S. Appl. No. 18/307,985.
US Patent Application filed May 1, 2023, entitled "Premises System Management Using Status Signal", U.S. Appl. No. 18/310,294.
US patent application filed May 2, 2018, entitled "Automation System With Mobile Interface", U.S. Appl. No. 15/969,514.

(56) References Cited

OTHER PUBLICATIONS

US Patent Application filed May 4, 2022, entitled "Premises Management Configuration and Control", U.S. Appl. No. 17/736,408.
US Patent Application filed May 8, 2023, entitled "Communication Protocols in Integrated Systems", U.S. Appl. No. 18/314,002.
US Patent Application filed May 8, 2023, entitled "Integrated Cloud System With Lightweight Gateway for Premises Automation", U.S. Appl. No. 18/313,728.
US Patent Application filed May 8, 2023, entitled "Security Network Integrating Security System and Network Devices", U.S. Appl. No. 18/313,817.
US Patent Application filed May 10, 2021, entitled "Management of a Security System at a Premises", U.S. Appl. No. 17/316,402.
US Patent Application filed May 11, 2020, entitled "Control System User Interface", U.S. Appl. No. 16/871,151.
US Patent Application filed May 12, 2020, entitled "IP Device Discovery Systems and Methods", U.S. Appl. No. 15/930,029.
US Patent Application filed May 12, 2023, entitled "Virtual Device Systems and Methods", U.S. Appl. No. 18/316,580.
US Patent Application filed May 16, 2022, entitled "Automation System With Mobile Interface", U.S. Appl. No. 17/744,858.
US Patent Application filed May 19, 2020, entitled "User Interface in a Premises Network", U.S. Appl. No. 16/878,099.
US Patent Application filed May 23, 2018, entitled "Networked Touchscreen With Integrated Interfaces", U.S. Appl. No. 15/987,638.
US Patent Application filed May 23, 2022, entitled "Premise Management Systems and Methods", U.S. Appl. No. 17/664,524.
US Patent Application filed May 26, 2020, entitled "Premises Management Configuration and Control", U.S. Appl. No. 16/882,876.
"Application" The Authoritative Dictionary of IEEE Standard Terms. 7th ed. 2000.
"icon", Newton's Telecom Dictionary, 21st ed., Mar. 2005.
"Modular programming", The Authoritative Dictionary of IEEE Standard Terms. 7th ed. 2000.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
6270 Touch Screen Keypad Notes, Honeywell, Sep. 2006.
Alarm.com—Interactive Security Systems, Elders [retrieved on Nov. 4, 2003], 1 page.
Alarm.com—Interactive Security Systems, Frequently Asked Questions [retrieved on Nov. 5, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Associate. Merriaim-Webster.com Dictionary, Merriam-Webster, https://web.archive.org/web/20061209213742/https://www.meniam-webster.com/dictionary/associate. Dec. 9, 2006.
AU application filed on Feb. 28, 2017, entitled "Control System User Interface", 2017201365.
AU application filed on Mar. 8, 2017, entitled "Integrated Security Network with Security Alarm Signaling System", 2017201585.
CA application filed on Aug. 15, 2017, entitled "Automation System User Interface", 2976682.
CA application filed on Aug. 16, 2017, entitled "Automation System User Interface", 2976802.
Chapter 6, Securing TCP/IP, pp. 135-164, Oct. 12, 2004.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Control Panel Standard—Features for False Alarm Reduction, The Security Industry Association, SIA 2009, pp. 1-48.
CorAccess Systems, Companion 6 User Guide, Jun. 17, 2002.
Court action filed for U.S. Pat. No. 7,262 690; U.S. Pat. No. 7,911,341; U.S. Pat. No. 8,073,931; U.S. Pat. No. 8,335,842; U.S. Pat. No. 8,473,619; U.S. Pat. No. 8,478,844 in U.S. District Court, Estern District of Virginia, Case No. 1:13-CV-00834, between *iControl Networks, Inc.* (Plaintiff) vs *Alarm.com Incorporated et al.* (Defendant) on Jul. 10, 2013.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.
Dragging The Authoritative Dictionary of IEEE Standard Terms. 7th ed. 2000, p. 337.
Elwahab et al. ; Device, System and . . . Customer Premises Gateways, Sep. 27, 2001; WO 01/71489.
EP application filed on Jun. 9, 2016, entitled, "Data Model for Flome Automation", 16808247.7.
EP application filed on Aug. 16, 2017, entitled, "Automation System User Interface", 17186497.8.
EP examination report issued in EP08797646.0, dated May 17, 2017, 11 pages.
Examination Report under Section 18(3) re for UK Patent Application No. GB0620362.4, mailed on Aug. 13, 2007.
Examination Report under Section 18(3) re for UK Patent Application No. GB0724248.0, mailed on Jun. 4, 2008.
Examination Report under Section 18(3) re for UK Patent Application No. GB0724248.0, mailed on Jan. 30, 2008.
Examination Report under Section 18(3) re for UK Patent Application No. GB0724760.4, mailed on Jan. 30, 2008.
Examination Report under Section 18(3) re for UK Patent Application No. GB0800040.8, mailed on Jan. 30, 2008.
Faultline, "AT&T Targets video home security as next broadband market"; Nov. 2, 2006; The Register; 2 Pages.
File, The Authoritative Dictionary of IEEE Standard Terms. 7th ed. 2000, p. 432.
Final Office Action mailed Aug. 1, 2011 for U.S. Appl. No. 12/630,092, filed Dec. 3, 2009.
Final Office Action mailed Jun. 1, 2009 for U.S. Appl. No. 11/084,232, filed Mar. 16, 2005.
Final Office Action mailed Jun. 5, 2012 for U.S. Appl. No. 12/771,071, filed Apr. 30, 2010.
Final Office Action mailed May 9, 2013 for U.S. Appl. No. 12/189,780, filed Aug. 11, 2008.
Final Office Action mailed May 9, 2013 for U.S. Appl. No. 12/952,080, filed Nov. 22, 2010.
Final Office Action mailed Jan. 10, 2011 for U.S. Appl. No. 12/189,785, filed Aug. 11, 2008.
Final Office Action mailed Jun. 10, 2011 for U.S. Appl. No. 11/084,232, filed Mar. 16, 2005.
Final Office Action mailed Jan. 13, 2011 for U.S. Appl. No. 12/189,780, filed Aug. 11, 2008.
Final Office Action mailed Oct. 17, 2012 for U.S. Appl. No. 12/637,671, filed Dec. 14, 2009.
Final Office Action mailed Sep. 17, 2012 for U.S. Appl. No. 12/197,958, filed Aug. 25, 2008.
Final Office Action mailed Mar. 21, 2013 for U.S. Appl. No. 12/691,992, filed Jan. 22, 2010.
Final Office Action mailed Jul. 23, 2013 for U.S. Appl. No. 13/531,757, filed Jun. 25, 2012.
Final Office Action mailed Feb. 26, 2013 for U.S. Appl. No. 12/771,471, filed Apr. 30, 2010.
Final Office Action mailed Jun. 29, 2012 for U.S. Appl. No. 12/539,537, filed Aug. 11, 2009.
Final Office Action mailed Dec. 31, 2012 for U.S. Appl. No. 12/770,365, filed Apr. 29, 2010.
Final Office Action mailed Oct. 31, 2012 for U.S. Appl. No. 12/771,624, filed Apr. 30, 2010.
Final Office Action mailed Feb. 16, 2011 for U.S. Appl. No. 12/019,568, filed Jan. 24, 2008.
Final Office Action mailed Jul. 12, 2010 for U.S. Appl. No. 12/019,554, filed Jan. 24, 2008.
US Patent Application filed Jan. 4, 2024, entitled "Media Content Management", U.S. Appl. No. 18/403,953.
US Patent Application filed Feb. 7, 2024, entitled "Defining and Implementing Sensor Triggered Response Rules", U.S. Appl. No. 18/435,908.

(56) References Cited

OTHER PUBLICATIONS

US Patent Application filed Feb. 29, 2024, entitled "Virtual Device Systems and Methods", U.S. Appl. No. 18/591,562.
PCT Application filed on Jun. 9, 2016, entitled "Virtual Device Systems and Methods", PCT/US2016/036674.
PCT Application filed on Jun. 29, 2016, entitled "Integrated Cloud System for Premises Automation", PCT/US2016/040046.
PCT Application filed on Jun. 30, 2016, entitled "Integrated Cloud System with Lightweight Gateway for Premises Automation", PCT/US2016/040451.
PCT Application filed on Jul. 7, 2016, entitled "Automation System User Interface with Three-Dimensional Display", PCT/US2016/041353.
PCT Application filed on Aug. 16, 2016, entitled "Automation System User Interface", PCT/US2016/047172.
PCT Application filed on Aug. 17, 2016, entitled "Automation System User Interface", PCT/US2016/047262.
PCT Application filed on Oct. 13, 2016, entitled "Coordinated Control of Connected Devices in a Premise", PCT/US2016/056842.
PCT Application filed on Nov. 17, 2016, entitled "Mobile Premises Automation Platform", PCT/US2016/062519.
Prashyanusorn et al., "Sustainable tourism using security cameras with privacy protecting ability", Journal of Information Security, 2010, vol. 1, pp. 68-73.
Requirement for Restriction/Election mailed Jan. 22, 2013 for U.S. Appl. No. 13/104,932, filed May 10, 2011.
Requirement for Restriction/Election mailed Jan. 22, 2013 for U.S. Appl. No. 13/104,936, filed May 10, 2011.
Requirement for Restriction/Election mailed Oct. 24, 2012 for U.S. Appl. No. 12/750,470, filed Mar. 30, 2010.
Security for the Future, Introducing 5804B0-Advanced two-way wireless remote technology, Advertisement, ADEMCO Group, Syosset, NY, circa 1997.
Shang, Wei-Lai, "Study on Application Embedded Intelligent Area System", Journal of Anyang Institute of Technology, Dec. 2010, vol. 9, No. 6, pp. 56-57 and 65.
South African Patent App. No. 2013/02668, corresponds to WO2012/040653, Mar. 2012.
Supplemental European Search Report for Application No. EP05725743.8 mailed on Sep. 14, 2010, 2 pages.
Supplementary European Search Report for Application No. EP10819658, mailed on Mar. 10, 2015, 2 pages.
Supplementary European Search Report for Application No. EP11827671, mailed on Mar. 10, 2015, 2 pages.
Supplementary Partial European Search Report for Application No. EP09807196, mailed on Nov. 17, 2014, 5 pages.
Supplementary European Search Report for Application No. EP2191351, mailed on Jun. 23, 2014, 2 pages.
Supplementary Non-Final Office Action mailed Oct. 28, 2010 for U.S. Appl. No. 12/630,092, filed Dec. 3, 2009.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United States Patent and Trademark Office—Before the Patent Trial and Appeal Board, Alarm.com (U.S. Pat. No. 8,350,69461) (inventors Stephen Scott Trundle & Alison Jane Slavin) V iControl Networks, Inc. (U.S. Appl. No. 13/311,365) (Inventors: Poul j. Dawes, Jim Fulker, Carolyn Wales, Reza Raji, and Gerald Gutt), Patent Interference 106,001 (HH6) (Technology Center 24000), Mar. 31, 2015.
US Patent Application filed Jan. 3, 2019, entitled "Methods and Systems for Data Communication", U.S. Appl. No. 16/239,114.
US Patent Application filed Jan. 5, 2023, entitled "Systems and Methods for Device Communication", U.S. Appl. No. 18/150,316.
US Patent Application filed Jan. 11, 2021, entitled "Premise Management Systems and Methods", U.S. Appl. No. 17/145,773.
US Patent Application filed Jan. 13, 2023, entitled "Communication Protocols in Integrated Systems", U.S. Appl. No. 18/154,590.
US Patent Application filed Jan. 14, 2022, entitled "Mobile Premises Automation Platform", U.S. Appl. No. 17/576,336.
US Patent Application filed Jan. 19, 2023, entitled "Premises Management Configuration and Control", U.S. Appl. No. 18/157,030.
US Patent Application filed Jan. 22, 2019, entitled "Data Model for Home Automation", U.S. Appl. No. 16/254,535.
US Patent Application filed Jan. 22, 2019, entitled "Premises System Automation", U.S. Appl. No. 16/254,480.
US Patent Application filed Jan. 23, 2020, entitled "Forming a Security Network Including Integrated Security System Components and Network Dev", U.S. Appl. No. 16/750,976.
US Patent Application filed Jan. 24, 2023, entitled "Server-Based Notification of Alarm Event Subsequent to Communication Failure With Armed Security System", U.S. Appl. No. 18/158,876.
US Patent Application filed Jan. 25, 2019, entitled Communication Protocols in Integrated Systems, U.S. Appl. No. 16/257,706.
US Patent Application filed Jan. 26, 2023, entitled "System for Data Routing in Networks", U.S. Appl. No. 18/159,869.
US Patent Application filed Jan. 28, 2019, entitled "Automation System User Interface With Three-Dimensional Display", U.S. Appl. No. 16/258,858.
US Patent Application filed Feb. 2, 2018, entitled "Three-Way Switch", U.S. Appl. No. 15/887,535.
US Patent Application filed Feb. 6, 2020, entitled "Activation of Gateway FDevice", U.S. Appl. No. 16/784,159.
US Patent Application filed Feb. 8, 2022, entitled "Server-Based Notification of Alarm Event Subsequent to Communication Failure With Armed Security System", U.S. Appl. No. 17/650,324.
US Patent Application filed Feb. 8, 2023, entitled "Management of a Security System at a Premises", U.S. Appl. No. 18/166,052.
US Patent Application filed Feb. 8, 2023, entitled "Premises Management Configuration and Control", U.S. Appl. No. 18/166,046.
US Patent Application filed Feb. 9, 2021, entitled "Premises Management Networking", U.S. Appl. No. 17/171,398.
US Patent Application filed Feb. 13, 2023, entitled "Premise Management Systems and Methods", U.S. Appl. No. 18/168,314.
US Patent Application filed Mar. 2, 2017, entitled "Generating Risk Profile Using Data of Home Monitoring and Security System", U.S. Appl. No. 15/447,982.
US Patent Application filed Mar. 2, 2020, entitled "Communication Protocols in Integrated Systems", U.S. Appl. No. 16/807,100.
US Patent Application filed Mar. 2, 2020, entitled "Coordinated Control of Connected Devices in a Premise", U.S. Appl. No. 16/807,028.
US Patent Application filed Mar. 7, 2014, entitled "Activation of Gateway Device", U.S. Appl. No. 14/201,162.
US Patent Application filed Mar. 7, 2014, entitled "Communication Protocols in Integrated Systems", U.S. Appl. No. 14/200,921.
US Patent Application filed Mar. 7, 2014, entitled "Device Integration Framework", U.S. Appl. No. 14/201,227.
US Patent Application filed Mar. 7, 2014, entitled "Integrated Security and Control System With Geofencing", U.S. Appl. No. 14/201,189.

\* cited by examiner

BIDIRECTIONAL SECURITY SENSOR COMMUNICATION FOR A PREMISES SECURITY SYSTEM

CROSS REFERENCE TO RELATED APPLICATIONS

This application is a continuation of U.S. patent application Ser. No. 12/970,313, filed Dec. 16, 2010, now U.S. Pat. No. 11,750,414, issued Sep. 5, 2023, which is hereby incorporated by reference in its entirety.

FIELD OF THE INVENTION

Embodiments of the present invention relate generally to the field of premises security, monitoring and automation, and specifically to a security system providing two-way communication between security sensors and a security controller.

BACKGROUND OF THE INVENTION

A security system alerts occupants of a dwelling and emergency authorities of a violation of premises secured by the system. A typical security system includes a controller connected by wireless or wired connections to sensors deployed at various locations throughout the secured premises. In a home, sensor devices are usually deployed in doorways, windows, and other points of entry. Motion sensors can also be placed strategically within the home to detect unauthorized movement, while smoke and heat sensors can detect the presence of fire.

In a typical security system, sensor devices are configured only to transmit sensor event information to a monitoring controller. The sensor devices have a simple processor to interpret sensor event triggers, and have a unidirectional transmitter to provide event information to the monitoring controller. Having only a unidirectional transmitter makes it impossible for a bidirectional dialog to take place between the sensor and monitoring controller.

Bidirectional communication between a sensor device and a monitoring controller enables a sensor device to verify that event information has been delivered to the monitoring controller (e.g., through an acknowledgement message from the controller). Further, the monitoring controller can provide messages to one or more sensor devices allowing for control of a sensor device output (e.g., lighting of an LED during an alarm state or triggering a siren) or providing configuration information. Bidirectional communication between a monitoring controller and a sensor device can also permit pushing of firmware updates. It is therefore desirable to enable two-way communication between a monitoring controller and sensor devices coupled to that monitoring controller.

SUMMARY OF THE INVENTION

Embodiments of the present invention provide a security system architecture that includes bidirectional communication between a sensor control device and one or more sensor devices coupled to the controller. Embodiments of the present invention provide such functionality by virtue of a bidirectional wireless transceiver and processor in each sensor device. Embodiments of the present invention further provide this functionality by virtue of a coordinating transceiver coupled to the security system controller for communication with the sensor devices.

One embodiment of the present invention provides a sensor control device that is configured to transmit a data packet on a wireless network to a sensor device. The sensor device includes a transceiver configured to receive the data packet, a processor configured to process the data packet and further configured to perform an action in response to information in the data packet, and a sensor connected to the processor.

One aspect of the present invention provides for an output device coupled to the sensor device processor, and the processor configured to cause the output device to perform an output operation in response to the information in the data packet. Another aspect of the present invention provides for a memory coupled to the sensor device processor, where the memory stores firmware instructions executed by the sensor device processor. In response to receiving the data packet, the sensor device processor stores second firmware instructions in the memory. Those second firmware instructions can be stored in the memory, for example, by erasing or overwriting the first firmware instructions.

Another aspect of the present invention provides for the sensor device transmitting a second data packet on the wireless network in response to receiving the first data packet. This second data packet can be an acknowledgement packet. The sensor control device can receive the second data packet and process the second data packet. In response to receiving the second data packet, the sensor control device can generate and transmit a third data packet.

In a further aspect of the present invention, the sensor device is configured to receive an event signal from a sensor, generate a second data packet in response to that event signal, and transmit a second data packet on the wireless network using the second transceiver. The sensor control device is further configured to receive the second data packet and to process the second data packet, and to generate and transmit a third data packet in response to the second data packet.

The foregoing is a summary and thus contains, by necessity, simplifications, generalizations and omissions of detail. Consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a security system architecture that includes two-way communication between a security system controller and one or more sensor devices coupled to the controller. Embodiments of the present invention provide such functionality by virtue of a bidirectional wireless transceiver and processor in each sensor device. Embodiments of the present invention further provide this functionality by virtue of a coordinating transceiver coupled to the security system controller for communication with the sensor devices.

Architectural Overview

Embodiments of the present invention provide a security controller that enables two-way communication with sensor devices. One example of such a controller is a configurable security, monitoring and automation (SMA) controller that provides not only for communicating with and interpreting signals from sensor and other devices within a dwelling, but also for accessing and monitoring those sensor and other devices from locations remote to the dwelling. Embodiments of the SMA controller provide such capability through linkages to external servers via access networks such as the Internet, provider network, or a cellular network. The external servers provide a portal environment through which a user can, for example, monitor the state of sensors coupled to the SMA controller in real-time, configure the controller, and provide controlling information to the SMA controller. The servers can further automatically provide information to a user via remote devices such as mobile phones, computers, and pagers. The servers further provide a connection to a traditional security central station, which can then contact authorities in the event of an alarm condition being detected by the SMA controller in the dwelling.

Figure 1:
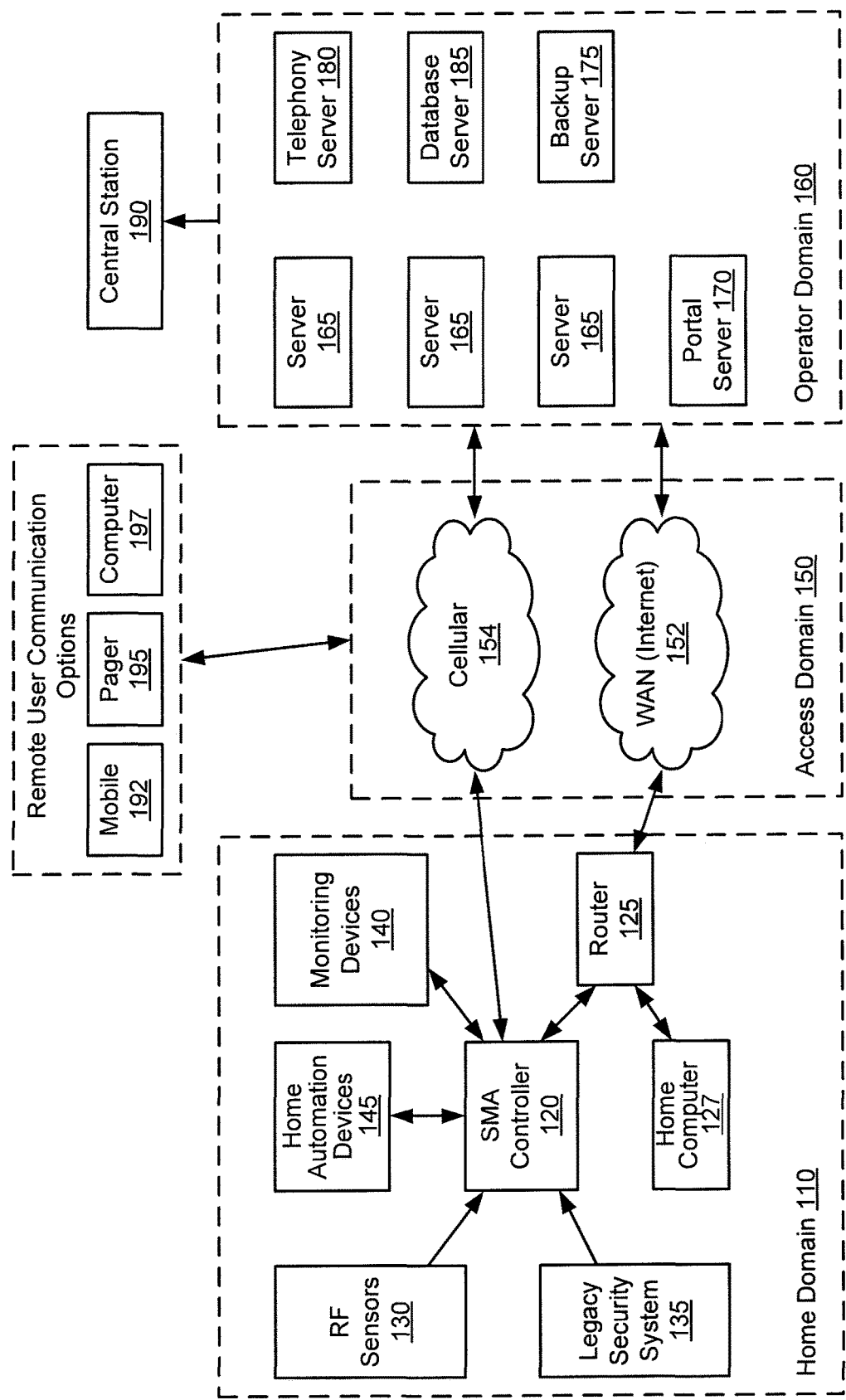
FIG. 1 is a simplified block diagram illustrating an architecture including a set of logical domains and functional entities within which embodiments of the present invention interact.

FIG. 1 is a simplified block diagram illustrating an architecture including a set of logical domains and functional entities within which embodiments of the present invention interact. A home domain 110 includes an embodiment of the SMA controller 120. The home domain is coupled via an access domain 150 to an operator domain 160 that includes various servers. The servers are in turn coupled to a central station 190 and to various remote user communication options.

The home domain refers to a collection of security, monitoring and automation entities within a dwelling or other location having SMA devices. SMA controller 120 is a device that provides an end-user SMA interface to the various SMA entities (e.g., radio-frequency sensor devices) within home domain 110. SMA controller 120 further acts as a gateway interface between home domain 110 and operator domain 160. SMA controller 120 provides such gateway access to operator domain 160 via a network router 125. Network router 125 can be coupled to SMA controller 120 and to home network devices such as home computer 127 via either hard wired or wireless connections. A network router 125 coupled to a broadband modem (e.g., a cable modem or DSL modem) serves as one link to networks in access domain 150.

SMA devices within home domain 110 can include a variety of RF or wireless sensor devices 130 whose signals are received and interpreted by SMA controller 120. As will be discussed in greater detail below, the SMA controller can also transmit signals to one or more of the RF sensor devices to effect, for example, state changes, signal acknowledgements and firmware upgrades. RF sensor devices 130 can include, for example, door or window sensors, motion detectors, smoke detectors, glass break detectors, inertial detectors, water detectors, carbon dioxide detectors, and key fob devices. SMA controller 120 can be configured to react to a change in state of any of these detectors. In addition to acting and reacting to changes in state of RF sensor devices 130, SMA controller 120 also can be coupled to a legacy security system 135. SMA controller 120 controls the legacy security system by interpreting signals from sensors coupled to the legacy security system and reacting in a user-configured manner. SMA controller 120, for example, will provide alarm or sensor state information from legacy security system 135 to servers in operator domain 160 that may ultimately inform central station 190 to take appropriate action.

SMA controller 120 can also be coupled to one or more monitoring devices 140. Monitoring devices 140 can include, for example, still and video cameras that provide images that are viewable on a screen of SMA controller 120 or a remotely connected device. Monitoring devices 140 can be coupled to SMA controller 120 either wirelessly (e.g., WiFi via router 125) or other connections.

Home automation devices 145 can also be coupled to and controlled by SMA controller 120. SMA controller 120 can be configured to interact with a variety of home automation protocols, such as, for example, Z-Wave and ZigBee.

Embodiments of SMA controller 120 can be configured to communicate with a variety of RF or wireless sensor devices and are not limited to the sensor devices, monitoring devices and home automation devices discussed above. A person of ordinary skill in the art will appreciate that embodiments of the present invention are not limited to or by the above-discussed devices and sensors, and can be applied to other areas and devices.

Embodiments of SMA controller 120 can be used to configure and control home security devices (e.g., 130 and 135), monitoring devices 140 and automation devices 145, either directly or by providing a gateway to remote control via servers in operator domain 160. SMA controller 120 communicates with servers residing in operator domain 160 via networks in access domain 150. Broadband communication can be provided by coupling SMA controller 120 with a network router 125, which in turn is coupled to a wide area network 152, such as a provider network or the Internet, via an appropriate broadband modem. The router can be coupled to the wide area network through cable broadband, DSL, and the like. Wide area network 152, in turn, is coupled to servers in operator domain 160 via an appropriate series of routers and firewalls (not shown). SMA controller 120 can include additional mechanisms to provide a communication with the operator domain. For example, SMA controller 120 can be configured with a cellular network transceiver that permits communication with a cellular network 154. In turn, cellular network 154 can provide access via routers and firewalls to servers in operator domain 160. Embodiments of SMA controller 120 are not limited to providing gateway functionality via cellular and dwelling-based routers and modems. For example, SMA gateway 120 can be configured with other network protocol controllers such as WiMAX satellite-based broadband, direct telephone coupling, and the like.

Operator domain 160 refers to a logical collection of SMA servers and other operator systems in an operator's network that provide end-user interfaces, such as portals accessible to subscribers of the SMA service, that can configure, manage and control SMA elements within home domain 110. Servers in operator domain 160 can be maintained by a provider (operator) of subscriber-based services for SMA operations. Examples of providers include cable providers, telecommunications providers, and the like. A production server architecture in operator domain 160 can support SMA systems in millions of home domains 110.

Individual server architectures can be of a variety of types, and in one embodiment, the server architecture is a tiered Java2 Enterprise Edition (J2EE) service oriented architecture. Such a tiered service oriented architecture can include an interface tier, a service tier, and a data access logic tier. The interface tier can provide entry points from outside the server processes, including, for example, browser web applications, mobile web applications, web services, HTML, XHTML, SOAP, and the like. A service tier can provide a variety of selectable functionality passed along by the operator to the end user. Service tiers can relate to end user subscription levels offered by the operator (e.g., payment tiers corresponding to "gold" level service, "silver" level service and "bronze" level service). Finally the data access logic tier provides access to various sources of data including database servers.

FIG. 1 illustrates an example set of servers that can be provided in operator domain 160. Servers 165 can support all non-alarm and alarm events, heartbeat, and command traffic between the various servers and SMA controllers 120. Servers 165 can also manage end-user electronic mail and SMS notification, as well as integration with provider billing, provisioning, inventory, tech support systems, and the like.

A portal server 170 can provide various user interface applications, including, for example, a subscriber portal, a mobile portal, and a management portal. A subscriber portal is an end-user accessible application that permits an end-user to access a corresponding SMA controller remotely via standard web-based applications. Using such a subscriber portal provides access to the same SMA functions that an interface directly coupled to the SMA controller would provide, plus additional functions such as alert and contact management, historical data, widget and camera management, account management, and the like. A mobile portal can provide all or part of the access available to an end-user via the subscriber portal. A mobile portal can be limited, however, to capabilities of an accessing mobile device (e.g., touch screen or non-touch screen cellular phones). A management portal provides an operator representative access to support and manage SMA controllers in home domains 110 and corresponding user accounts via a web-based application. The management portal can provide tiers of management support so that levels of access to user information can be restricted based on authorization of a particular employee.

Telephony server 180 can process and send information related to alarm events received from SMA controllers 120 to alarm receivers at central monitoring station 190. A server 165 that processes the alarm event makes a request to telephony server 180 to dial the central station's receiver and send corresponding contact information. Telephony server 180 can communicate with a plurality of central stations 190. Server 165 can determine a correct central station to contact based upon user account settings associated with the transmitting SMA controller.

A backup server 175 can be provided to guarantee that an alarm path is available in an event that one or more servers 165 become unavailable or inaccessible. A backup server 175 can be co-located to the physical location of servers 165 to address scenarios in which one or more of the servers fail. Alternatively, a backup server 175 can be placed in a location remote from servers 165 in order to address situations in which a network failure or a power failure causes one or more of servers 165 to become unavailable. SMA controllers 120 can be configured to transmit alarm events to a backup server 175 if the SMA controller cannot successfully send such events to servers 165.

A database server 185 provides storage of all configuration and user information accessible to other servers within operator domain 160. Selection of a type of database provided by database server 185 can be dependent upon a variety of criteria, including, for example, scalability and availability of data. One embodiment of the present invention uses database services provided by an ORACLE database.

A server 165 in operator domain 160 provides a variety of functionality. Logically, a server 165 can be divided into the following functional modules: a broadband communication module, a cellular communication module, a notification module, a telephony communication module, and an integration module.

The broadband communication module manages broadband connections and message traffic from a plurality of SMA controllers 110 coupled to server 165. Embodiments of the present invention provide for the broadband channel to be a primary communication channel between an SMA controller 120 and servers 165. The broadband communication module handles a variety of communication, including, for example, all non-alarm and alarm events, broadband heartbeat, and command traffic between server 165 and SMA controller 120 over the broadband channel.

The cellular communication module manages cellular connections and message traffic from SMA controllers 120 to a server 165. Embodiments of the present invention use the cellular channel as a backup communication channel to the broadband channel. Thus, if a broadband channel becomes unavailable, communication between an SMA controller and a server switches to the cellular channel. At this time, the cellular communication module on the server handles all non-alarm and alarm events, and command traffic from an SMA controller. When a broadband channel is active, heartbeat messages can be sent periodically on the cellular channel in order to monitor the cellular channel.

A notification module of server 165 determines if and how a user should be notified of events generated by their corresponding SMA controller 120. A user can specify who to notify of particular events or event types and how to notify the user (e.g., telephone call, electronic mail, text message, page, and the like), and this information is stored by a database server 185. When events such as alarm or non-alarm events are received by a server 165, those events can be past asynchronously to the notification module, which determines if, who and how to send those notifications based upon the user's configuration.

The telephony communication module provides communication between a server 165 and telephony server 180. When a server 165 receives and performs initial processing of alarm events, the telephony communication module forwards those events to a telephony server 180 which in turn communicates with a central station 190, as discussed above.

The integration module provides infrastructure and interfaces to integrate a server 165 with operator business systems, such as, for example, billing, provisioning, inventory, tech support, and the like. An integration module can provide a web services interface for upstream integration that operator business systems can call to perform operations like creating and updating accounts and querying information stored in a database served by database server 185. An integration module can also provide an event-driven framework for downstream integration to inform operator business systems of events within the SMA system.

SMA Controller Architecture

Figure 2:
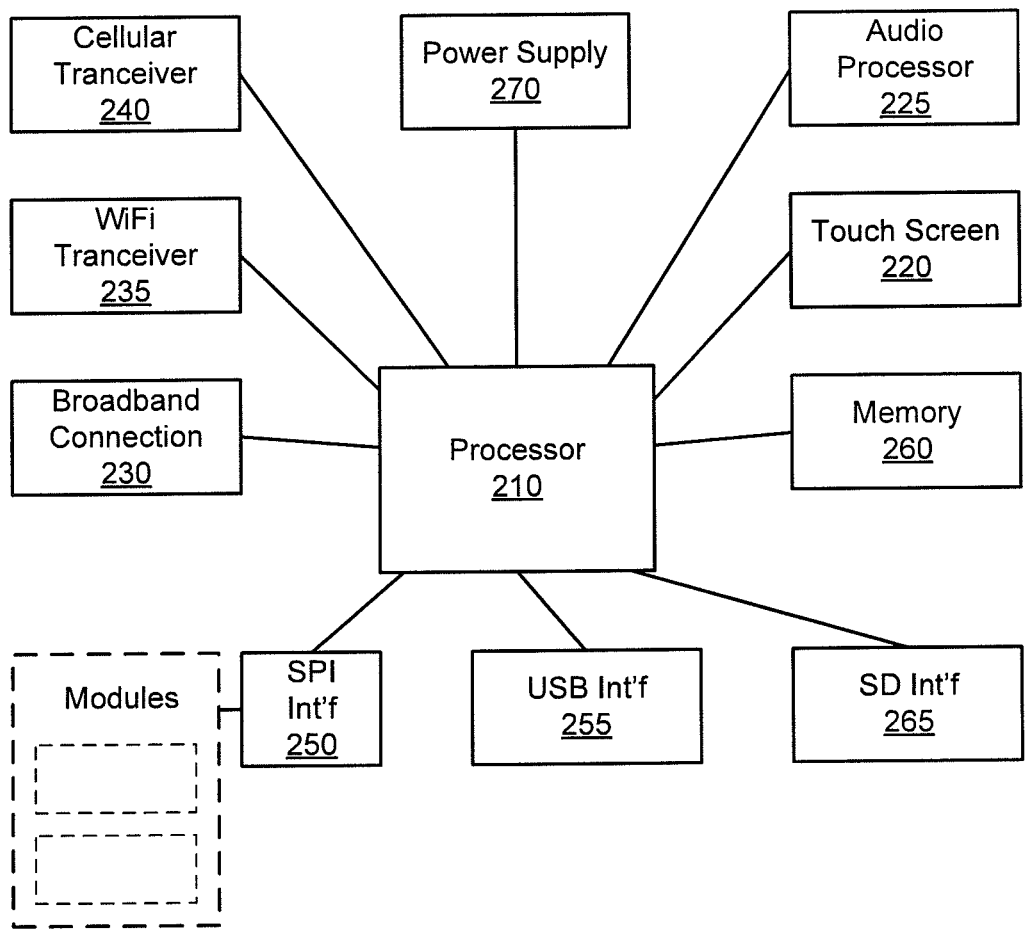
FIG. 2 is a simplified block diagram illustrating a hardware architecture of an SMA controller, according to one embodiment of the present invention.

FIG. 2 is a simplified block diagram illustrating a hardware architecture of an SMA controller, according to one embodiment of the present invention. A processor 210 is coupled to a plurality of communications transceivers, interface modules, memory modules, and user interface modules. Processor 210, executing firmware discussed below, performs various tasks related to interpretation of alarm and non-alarm signals received by SMA controller 120, interpreting reactions to those signals in light of configuration information either received from a server (e.g., server 165) or entered into an interface provided by SMA controller 120 (e.g., a touch screen 220). Embodiments of the present invention can use a variety of processors, for example, an ARM core processor such as a FREESCALE i.MX35 multimedia applications processor.

SMA controller 120 can provide for user input and display via a touch screen 220 coupled to processor 210. Processor 210 can also provide audio feedback to a user via use of an audio processor 225. Audio processor 225 can, in turn, be coupled to a speaker that provides sound in home domain 110. SMA controller 120 can be configured to provide a variety of sounds for different events detected by sensors associated with the SMA controller. Such sounds can be configured by a user so as to distinguish between alarm and non-alarm events.

As discussed above, an SMA controller 120 can communicate with a server 165 using different network access means. Processor 210 can provide broadband access to a router (e.g., router 125) via an Ethernet broadband connection PHY 130 or via a WiFi transceiver 235. The router can then be coupled to or be incorporated within an appropriate broadband modem. Cellular network connectivity can be provided by a cellular transceiver 240 that is coupled to processor 210. SMA controller 120 can be configured with a set of rules that govern when processor 210 will switch between a broadband connection and a cellular connection to operator domain 160.

In order to communicate with the various sensor and other devices within home domain 110, processor 210 can be coupled to one or more transceiver modules via, for example, a serial peripheral interface such as a SPI bus 250. Such transceiver modules permit communication with sensor devices of a variety of protocols in a configurable manner. Embodiments of the present invention can use a transceiver that communicates using a low-rate wireless personal area network protocol (e.g., ZigBee), for example, to communicate with RF sensor devices 130 and home automation devices 145. The transceiver can be coupled to processor 210 via SPI 250 or alternatively can be directly coupled to processor 210. If SMA controller 120 is coupled to a legacy security system 135, then a module permitting coupling to the legacy security system can be coupled to processor 210 via SPI 250. Other protocols can be provided for via such plug-in modules including, for example, digital enhanced cordless telecommunication devices (DECT). In this manner, an SMA controller 120 can be configured to provide for control of a variety of devices and protocols known both today and in the future. In addition, processor 210 can be coupled to other types of devices (e.g., transceivers or computers) via a universal serial bus (USB) interface 255.

In order to locally store configuration information for SMA controller 120, a memory 260 is coupled to processor 210. Additional memory can be coupled to processor 210 via, for example, a secure digital interface 265. A power supply 270 is also coupled to processor 210 and to other devices within SMA controller 120 via, for example, a power management controller module.

SMA controller 120 is configured to be a customer premises equipment device that works in conjunction with server counterparts in operator domain 160 in order to perform functions required for security monitoring and automation. Embodiments of SMA controller 120 provide a touch screen interface (e.g., 220) into all the SMA features. Via the various modules coupled to processor 210, the SMA controller bridges the sensor network, the control network, and security panel network to broadband and cellular networks. SMA controller 120 further uses the protocols discussed above to carry the alarm and activity events to servers in the operator domain for processing. These connections also carry configuration information, provisioning commands, management and reporting information, security authentication, and any real-time media such as video or audio.

Figure 3:
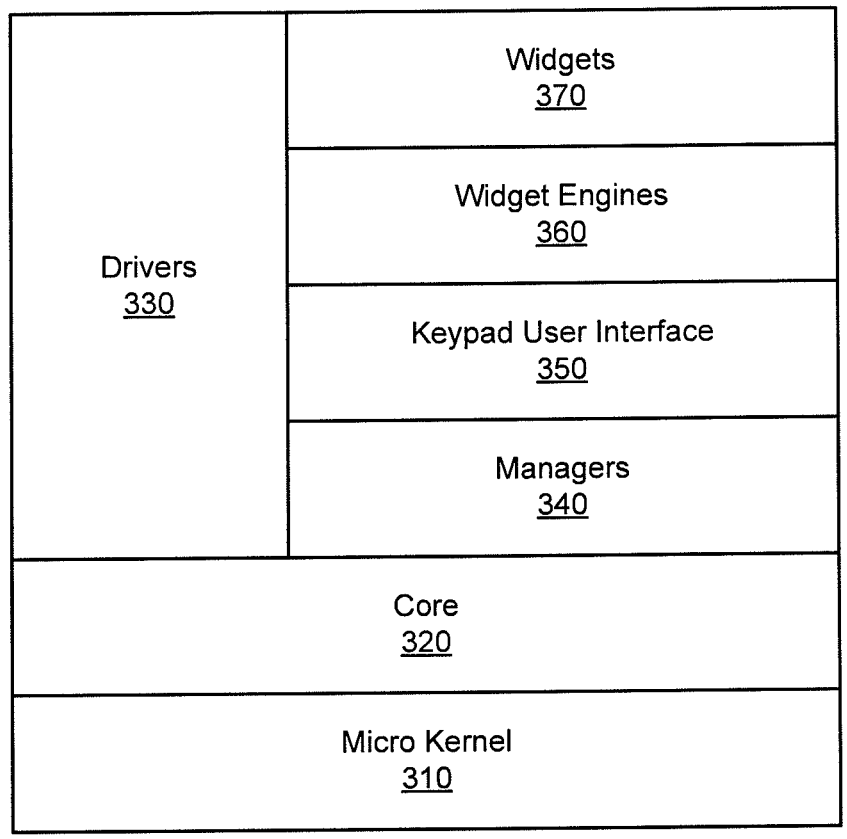
FIG. 3 is a simplified block diagram illustrating a logical stacking of an SMA controller's firmware architecture, usable with embodiments of the present invention.

FIG. 3 is a simplified block diagram illustrating a logical stacking of an SMA controller's firmware architecture, usable with embodiments of the present invention. Since SMA controller 120 provides security functionality for home domain 110, the SMA controller should be a highly available system. High availability suggests that the SMA controller be ready to serve an end-user at all times, both when a user is interacting with the SMA controller through a user interface and when alarms and other non-critical system events occur, regardless of whether a system component has failed. In order to provide such high availability, SMA controller 120 runs a micro-kernel operating system 310. An example of a micro-kernel operating system usable by embodiments of the present invention is a QNX real-time operating system. Under such a micro-kernel operating system, drivers, applications, protocol stacks and file systems run outside the operating system kernel in memory-protected user space.

Such a micro-kernel operating system can provide fault resilience through features such as critical process monitoring and adaptive partitioning. As a result, components can fail, including low-level drivers, and automatically restart without affecting other components or the kernel and without requiring a reboot of the system. A critical process monitoring feature can automatically restart failed components because those components function in the user space. An adaptive partitioning feature of the micro kernel operating system provides guarantees of CPU resources for designated components, thereby preventing a component from consuming all CPU resources to the detriment of other system components.

A core layer 320 of the firmware architecture provides service/event library and client API library components. A client API library can register managers and drivers to handle events and to tell other managers or drivers to perform some action. The service/event library maintains lists of listeners for events that each manager or driver detects and distributes according to one of the lists.

Driver layer 330 interacts with hardware peripherals of SMA controller 120. For example, drivers can be provided for touch screen 220, broadband connection 230, WiFi transceiver 235, cellular transceiver 240, USB interface 255, SD interface 265, audio processor 225, and the various modules coupled to processor 210 via SPI interface 250. Manager layer 340 provides business and control logic used by the other layers. Managers can be provided for alarm activities, security protocols, keypad functionality, communications functionality, audio functionality, and the like.

Keypad user interface layer 350 drives the touch screen user interface of SMA controller 120. An example of the touch screen user interface consists of a header and a footer, widget icons and underlying widget user interfaces. Keypad user interface layer 350 drives these user interface elements by providing, for example, management of what the system Arm/Disarm interface button says and battery charge information, widget icon placement in the user face area between the header and footer, and interacting with widget engine layer 360 to display underlying widget user interface when a widget icon is selected.

In embodiments of the present invention, typical SMA controller functions are represented in the touch screen user interface as widgets (or active icons). Widgets provide access to the various security monitoring and automation control functions of SMA controller 120 as well as providing support for multi-media functionality through widgets that provide, for example, news, sports, weather and digital picture frame functionality. A main user interface screen can provide a set of icons, each of which represents a widget. Selection of a widget icon can then launch the widget. Widget engine layer 360 includes, for example, widget engines for native, HTML and FLASH-based widgets. Widget engines are responsible for displaying particular widgets on the screen. For example, if a widget is developed in HTML, selection of such a widget will cause the HTML widget engine to display the selected widget or touch screen 220. Information related to the various widgets is provided in widget layer 370.

Figure 4:
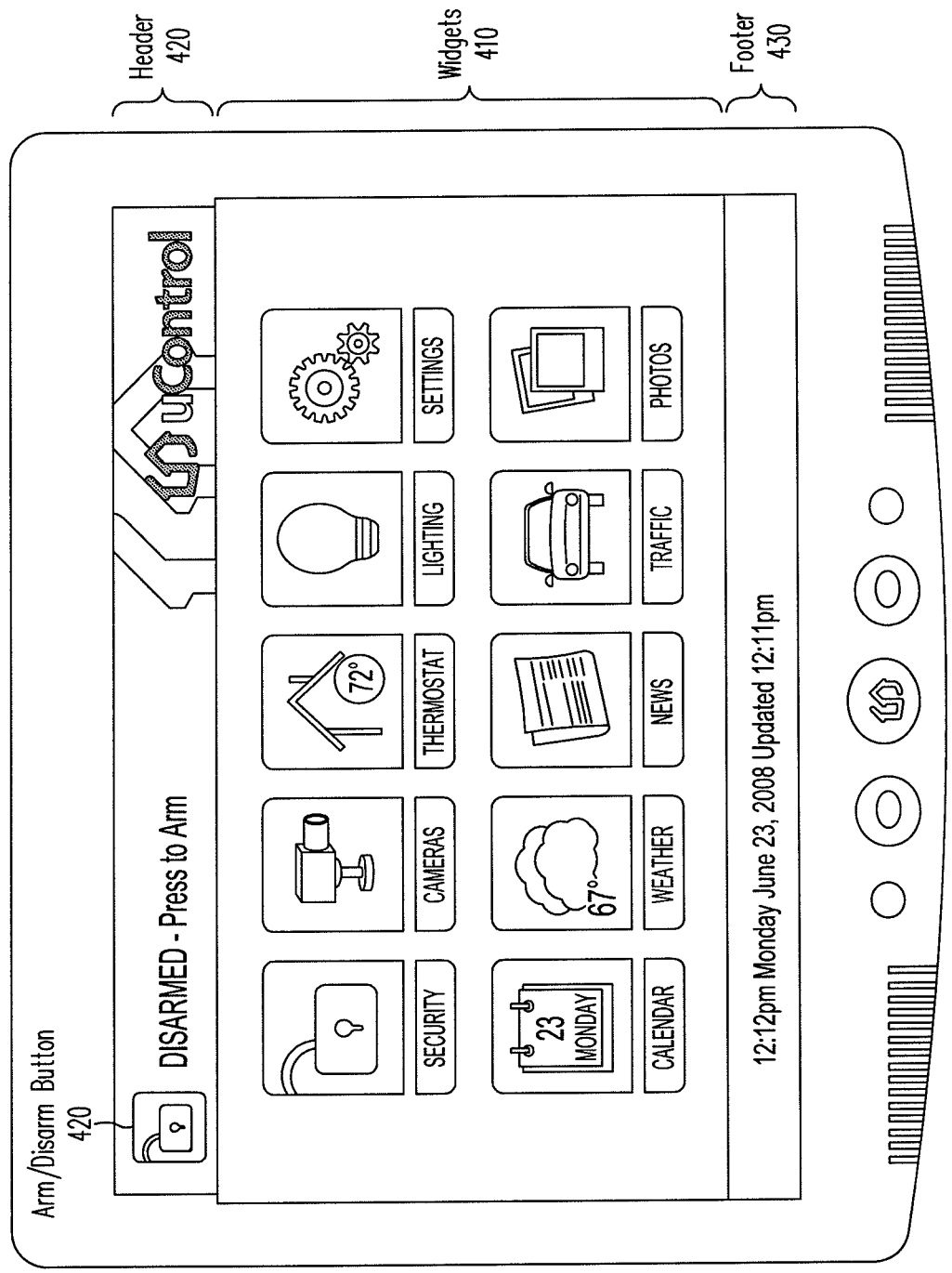
FIG. 4 is an illustration of an example user interface for an SMA controller 120, according to an embodiment of the present invention.

FIG. 4 is an illustration of an example user interface for an SMA controller 120, according to an embodiment of the present invention. The illustrated user interface provides a set of widget icons 410 that provide access to functionality of SMA controller 120. As illustrated, widgets are provided to access security functionality, camera images, thermostat control, lighting control, and other settings of the SMA controller. Additional widgets are provided to access network-based information such as weather, news, traffic, and digital picture frame functionality. A header 420 provides access to an Arm/Disarm button 425 that allows for arming the security system or disarming it. Additional information can be provided in the header, such as, for example, network status messages. A footer 430 can provide additional status information such as time and date, as displayed.

A user can select widgets corresponding to desired functionality. Embodiments of the present invention provide for access to widgets via portal server 170. A provider of operator domain 160 can determine functionality accessible to users, either for all users or based upon tiers of users (e.g., subscription levels associated with payment levels). A user can then select from the set of accessible widgets and the selected widgets will be distributed and displayed on the user interface of SMA controller 120. Configurability of SMA controller 120 is also driven by user determined actions and reactions to sensor stimulus.

SMA Controller Configurability

In accord with embodiments of the present invention, SMA controller 120 can be configured by a user in order to provide desired functionality in home domain 110. In addition to the hardware configurable options discussed above (e.g., modules coupled to SPI interface 250), SMA controller 120 provides for additional configuration through the use of software and/or firmware. For example, SMA controller 120 can be configured to receive signals from a variety of security sensor devices (e.g., RF sensor devices 130) and to associate those sensor devices with the physical environment of home domain 110. In addition, SMA controller 120 can be configured to receive still and video information from one or more cameras, provide a variety of programs and utilities to a user, and is configurable to communicate with a variety of home automation devices.

Figure 5:
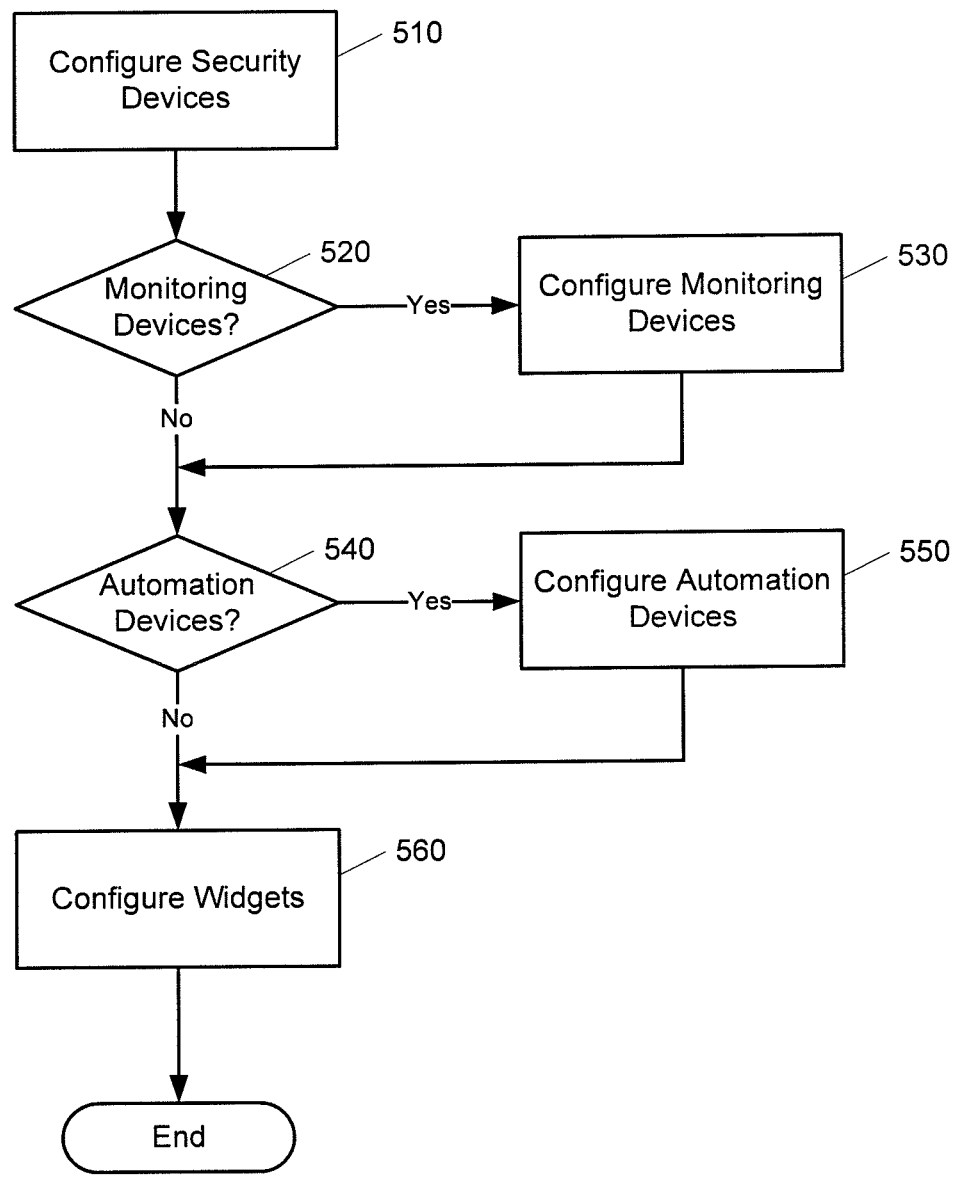
FIG. 5 is a simplified flow diagram illustrating steps performed in a configuration process of an SMA controller, in accord with embodiments of the present invention.

FIG. 5 is a simplified flow diagram illustrating steps performed in a configuration process of an SMA controller, in accord with embodiments of the present invention. Embodiments of an SMA controller will typically be configured with security sensor information, either from RF sensor devices 130 or from a legacy security system 135. Therefore, an SMA controller will be configured to access and interpret information related to those security sensor devices (510).

A determination can then be made as to whether or not a user is including security cameras in home domain 110 (520). If cameras are included in the home domain, then a series of steps related to camera configuration is performed (530). Similarly, a determination can be made as to whether or not home automation devices are to be controlled by the SMA controller (540). If so, then a series of steps can be performed to configure the SMA controller to access those home automation devices (550). A user can then perform steps necessary to configuring widgets accessible via the SMA controller (560).

SMA controller 120 can be configured to receive and interpret signals from a variety of security sensor devices. Such sensor devices can include, for example, door/window sensor devices that can detect opening and closing of a door or window, motion detectors that can detect movement in an area of interest, smoke detectors, glass break detectors, inertia detectors, and key fobs. In order to usefully interpret signals from such detectors, embodiments of SMA controller 120 can search for signals from such sensors and be configured with information related to the location and tasks of those sensors.

Figure 6:
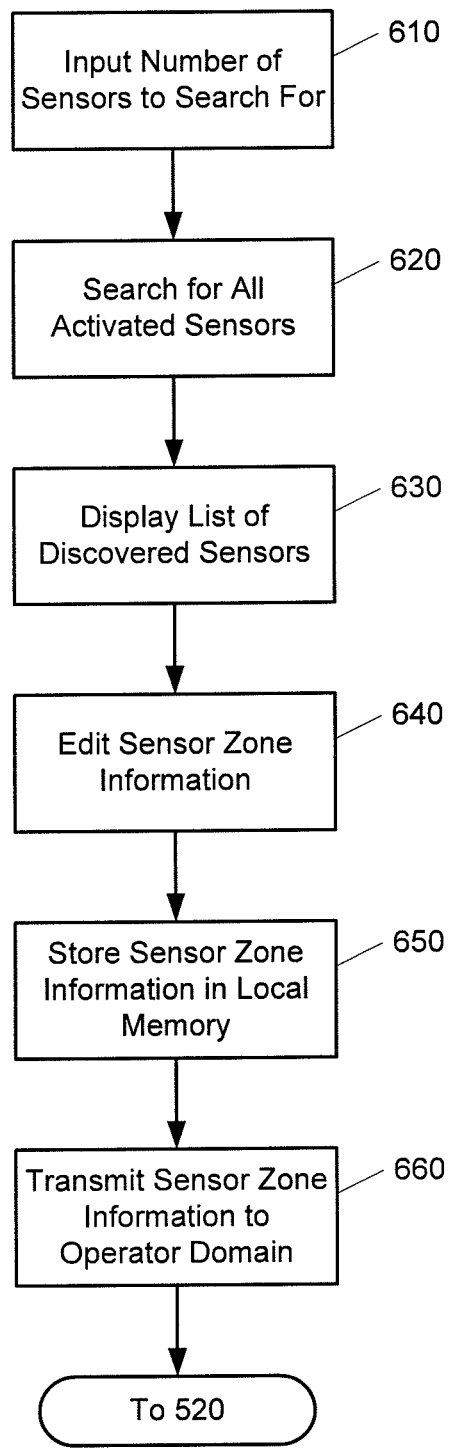
FIG. 6 is a simplified flow diagram illustrating steps performed in configuring security sensor devices, in accord with embodiments of the present invention.

FIG. 6 is a simplified flow diagram illustrating steps performed in configuring security sensor devices (e.g., 510), in accord with embodiments of the present invention. A user of a security system incorporating SMA controller 120 (e.g., an owner or resident of home domain 110) can decide, based upon the needs within the home domain, the types and number of security sensor devices needed to secure the home domain. SMA controller 120, via a touch screen input device, for example, can be told how many such sensor devices to search for (610). The SMA controller can then search for all activated sensor devices providing a linking message to the SMA controller (620). Such a linking message can provide sensor information including, for example, a unique identification number for the sensor device and sensor type information. A touch screen interface for SMA controller 120 can then provide to the user a display indicating information related to all sensor devices found during the search (630).

Once presented with information related to all the located sensor devices, a user can then edit that information to provide specifics as to physical, or zone, location of the sensor device within the home domain and other characteristics related to the zone of the sensor (640). For example, a touch screen display 220 coupled to SMA controller 120 can provide a list of all located sensor devices from which the user can select a specific sensor device to define or edit information related to that sensor device. The information related to the sensor devices and zones is then stored in a local memory of the SMA controller 120 (e.g., memory 260) (650). The SMA controller can also transmit the sensor zone information to be stored in a server in operator domain 160 via an available broadband connection (660).

Figure 7:
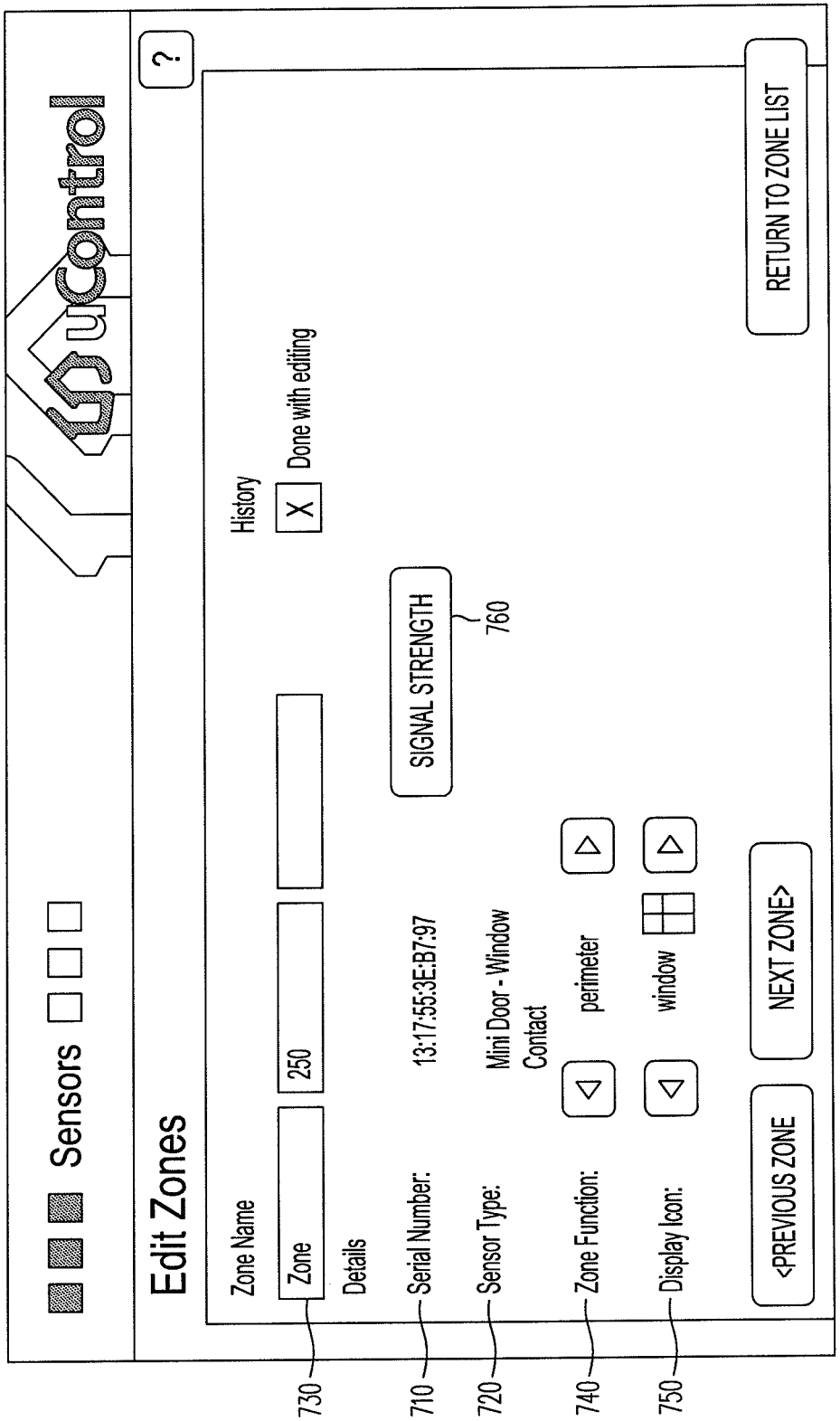
FIG. 7 is an illustration of a display that can be provided by embodiments of the present invention to permit editing of sensor device information.

FIG. 7 is an illustration of a display that can be provided by embodiments of the present invention to permit editing of sensor device information (e.g., sensor zone information). As illustrated, the display can provide information such as the unique identifier of the sensor (serial number 710) and the sensor type (sensor type 720). As indicated above, unique identifier and sensor type information is provided by the sensor during the search and location process. Through a display such as that illustrated in FIG. 7, a user can define additional zone characteristics related to the sensor. For example, a user can define or select a zone name 730 to associate with the sensor device. Such a zone name can be entered by a user through the use of a touch screen-based keyboard or selected from a list of common names displayed on the touch screen.

A zone function 740 can also be provided to be associated with the sensor device. A zone function determines behavior of the zone and is dependent on the zone type. For example, a door/window sensor can function as an entry/exit zone or as a perimeter zone. Each zone type can have one or more configurable zone functions. For example, a motion detector can have a zone function of interior follower, a smoke/heat detector can have a zone function of 24-hour fire monitoring, a glass break detector can have a zone function of a perimeter zone, and an inertia detector can have an entry/exit zone function or a perimeter zone function.

Selection of a zone function definition alters how the security system acts and reacts to signals received from a sensor in that zone. The following table illustrates examples of zone functions and their associated action/reaction definitions.

TABLE 1

| Zone Function | Definition |
| --- | --- |
| Entry/Exit | Allow exiting the home domain when the system is arming and will begin an entry delay when opened if the system is armed. Zone can be bypassed and can have specific tones assigned for open and close events. |
| Perimeter | Generate an alarm immediately if tripped while the system is armed. Can be bypassed and can have specific tones assigned for open and close events. |
| Interior Follower | Protect the internal spaces of the home domain and trigger an immediate alarm if the system is armed in away mode. Zone is not armed when the system is in armed stay mode. Can be bypassed and can have specific activity/non activity tones assigned. |
| 24-Hour Fire | Generate an immediate fire alarm if triggered. Zone cannot be bypassed. |
| 24-Hour Monitor | Generate notifications in the home and will beep the keypad but will not sound the full alarm. Can be bypassed. |
| 24-Hour Environmental | Generates notifications, beeps keypads, and sounds the siren to let people within the home domain know to evacuate the premises. Cannot be bypassed. |
| 24-Hour Inform | Will never generate an alarm, even if the system is armed. Upon triggering of the sensor will make the configured sound and send events to the operator domain. Can be bypassed. |

By defining such zones, a user can control how the security functions of SMA controller 120 react to various sensor triggers.

A user can also configure a display icon 750 associated with the sensor zone. In many cases, the available icons will be limited to one type of icon that graphically relates to the sensor type. But, for example, with a door/window sensor, icons can be made available that illustrate a door or a window as appropriate. FIG. 7 further illustrates a signal strength button 760 that, when selected, can illustrate strength of the signal between the wireless hub located within SMA controller 120 and the associated sensor.

The sensor zone information entered through the use of a display such as that illustrated in FIG. 7 can be stored in local data tables that are stored in memory 260 of SMA controller 120 (650). In addition, sensor zone information can also be transmitted via access domain 150 to servers in operator domain 160 for storage (e.g., database server 185) (660). By storing the sensor zone information in servers in the operator domain, the information is available to a user accessing a portal server 170. A user could then edit the sensor zone information through use of the portal rather than the SMA controller interface. Further, sensor zone information stored on database server 185 is retained even if an SMA controller suffers from an event that makes the SMA controller unusable. In such an event, a new SMA controller can be installed in home domain 110 and the information stored in operator domain 160 can be provided to the new SMA controller. This eliminates a need to manually reconfigure the new SMA controller with all sensor information.

Bidirectional Sensor Communication

Traditional security systems allow only for one-way communication between sensor devices and a sensor monitoring controller. In such a system, the controller can only react to received signals and cannot either provide feedback to the transmitting sensor device or communicate with that sensor device or other sensor devices to perform follow up operations. Embodiments of the present invention allow for more sophisticated interaction between a security controller and sensor devices by providing two-way communication.

Through the use of two-way communication between a controller and sensor devices, the controller can confirm receipt of an event signal through the use of, for example, an acknowledgement packet. In such a system, should a sensor device not receive an acknowledgement packet, the sensor can transmit one or more subsequent event packets until an acknowledgement is received. Alternatively, a sensor device can operate in a secondary mode should an acknowledgement packet not be received (e.g., take steps to alternatively sound a siren coupled to the sensor device). Two-way communication also allows for control of sensor state by the controller. For example, a security controller can send a message to a sensor to turn on an LED light, or sound a siren, or trigger emergency lighting. In some instances, two-way communication can also permit firmware updates to be pushed to sensors by the security controller.

Security sensor devices used in conjunction with residential security systems are typically small, battery-powered devices. Messages communicated from a sensor device to a security controller typically are small packets conveying identification and event information. These characteristics constrain communication solutions to satisfying low power, low data rates, and low data complexity in transmission. These constraints are well suited to a low rate-wireless personal area network (LR-WPAN) in which the security controller can be a coordinating node and the sensor devices can communicate just with the security controller or also with each other (e.g., a network conforming to the IEEE 802.15.4 standard).

Figure 8:
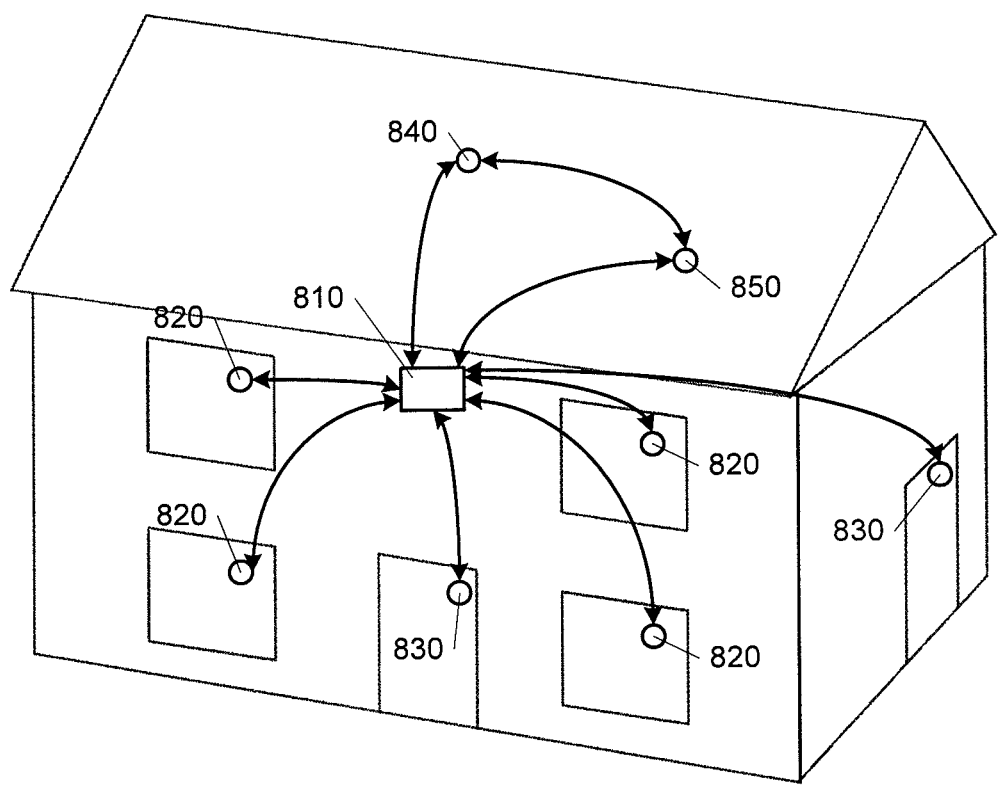
FIG. 8 is a simplified block diagram illustrating one example of a security sensor network configuration usable in conjunction with embodiments of the present invention.

FIG. 8 is a simplified block diagram illustrating one example of a security sensor network configuration usable with embodiments of the present invention. In FIG. 8 a security controller 810 (e.g., in one embodiment an SMA controller 120) functions as a coordinating node for the sensor network. As a coordinating node, the security controller can initiate configuration of the network by, for example, naming the network, defining the packet structure for communications within the network (e.g., whether or not to use a superframe under IEEE 802.15.4) and avoiding conflicts with any other personal area networks detected. As the network controller, the security controller can also transmit, receive, terminate, and route communications around the configured network. By its nature, security controller 810 can communicate with every security device in the network.

The network illustrated in FIG. 8 includes a set of window sensors 820 and door sensors 830 that communicate with security controller 810 in a star configuration, in which the security controller is the hub of the star. In a star network, the sensors can engage in bidirectional communication with the security controller, but cannot communicate with one another. This type of communication is similar to that performed by reduced function devices.

The network diagram in FIG. 8 also illustrates sensors 840 and 850, which communicate not only with security controller 810 but also with one another. This type of peer-to-peer communication is similar to that performed by fully functional devices having a higher degree of sophistication than the reduced function devices. One example of sensor devices that can incorporate this type of communication is a smoke or fire sensor (e.g., 840) that can directly trigger a RF connected siren (e.g., 850) upon detecting smoke or fire in the premises. Another example of devices that can benefit from such direct communication is an infrared motion sensor (e.g., 840) activating another monitoring device (e.g., a camera at 850) upon detecting motion in a particular area.

Figure 9:
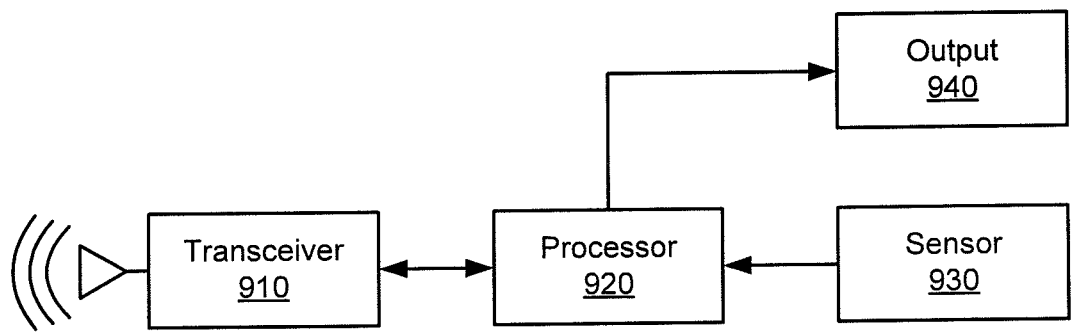
FIG. 9 is a simplified block diagram illustrating an example of a sensor device configured in accord with embodiments of the present invention.

FIG. 9 is a simplified block diagram illustrating an example of a sensor configured in accord with embodiments of the present invention. The sensor includes a transceiver 910, a processor 920, a sensor element 930, and an output 940. Transceiver 910 is configured to transmit and receive data on an appropriate frequency band (e.g., 902-928 MHz or 2400-2483.5 MHz) using an appropriate channel, as configured by the network coordinating node. Transceiver 910 is coupled to processor 920, which controls the operations of the sensor. The combination of processor 920 and transceiver 910 provide a communication stack that includes both physical layer and medium access control layer functionality. Processor 920 is configured to interpret signals from sensor element 930 to which the processor is coupled, assemble the data frame to be transmitted from transmitter 910, and control any output device 940 coupled to processor 920.

Processor 920 is generally specifically configured to perform with the type of sensor operations expected of the sensor. For example, a door/window sensor can have a different processor than a smoke detector or an infrared motion sensor. Alternatively, a more generally applicable processor can be configured in different ways for different applications. In addition, functionality of processor 920 and sensor element 930 may be combined in a single component. Embodiments of the present invention are not limited to a particular configuration or separation of functional responsibilities between modules in a sensor.

Sensor element 930 is configured to provide event information to processor 920. Sensor element 930 will take different forms depending upon the functional expectation for the sensor. For example, a door/window sensor device may be triggered by a change in the presence of a magnetic field. Alternatively, an impact sensor may be a read triggered by vibration, or a motion sensor may be triggered by detection of a heat source.

Similarly, output device 940 will conform to a desired function for output in the sensor. For example, output device 940 can be a simple LED indicator showing that the sensor device has been triggered. Alternatively, output device 940 can be a light source to provide emergency lighting in the case of detection of smoke by a smoke sensor device. Output device 940 can also provide an audible signal, such as a siren. The triggering of the output device can be performed by the processor effecting a state change to circuitry controlling the output device. That state change can be triggered either directly by an event from sensor element 930 or by a controlling signal received by transceiver 910. Another alternative output device can be a home automation device (e.g., 145), which typically does not have a sensor, but will control connected devices (e.g., lights, air conditioning/heating, and the like).

Figure 10:
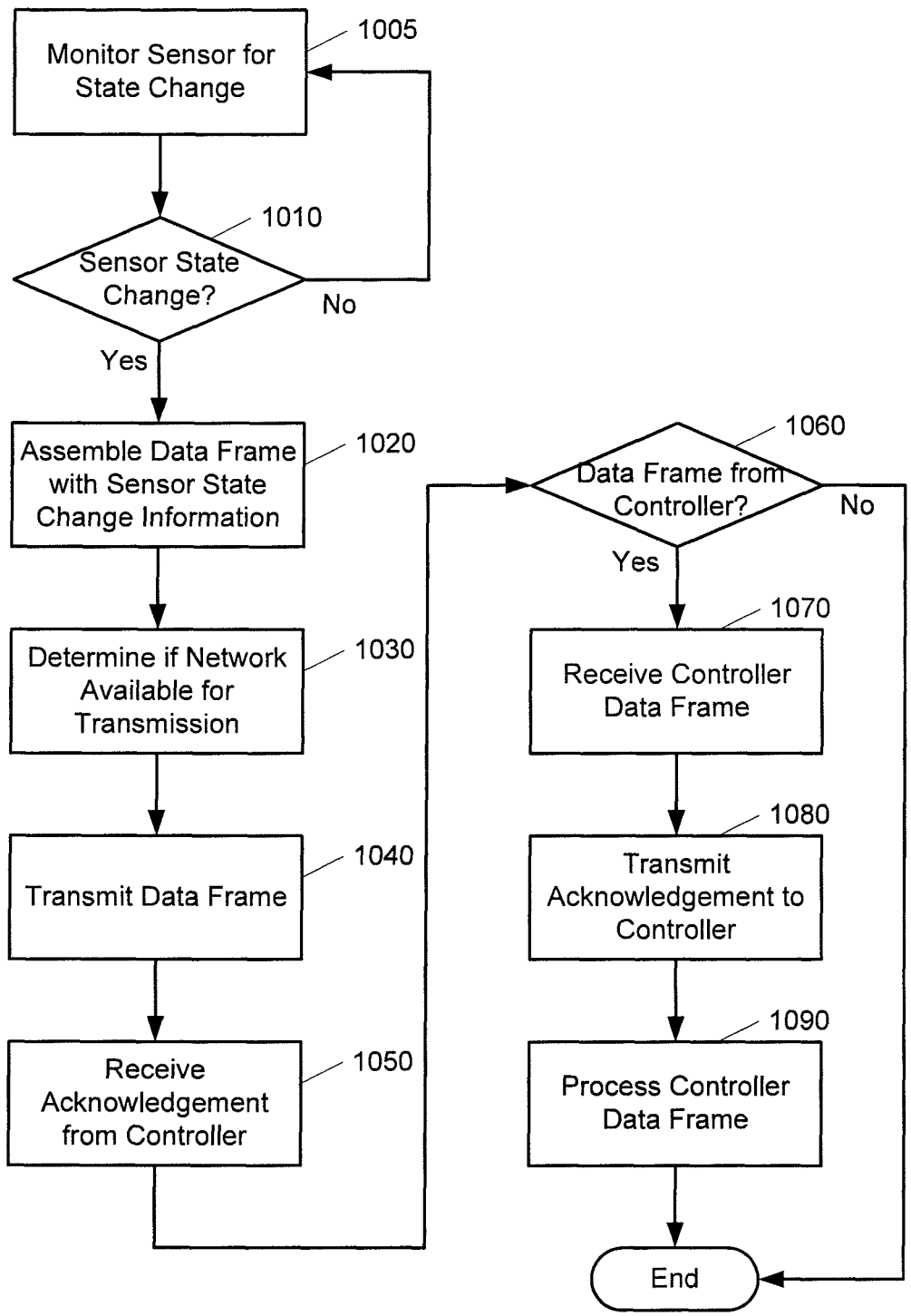
FIG. 10 is a simplified flow diagram illustrating a sequence of events involved in communication of a sensor event to a security controller and a response thereto, in accord with embodiments of the present invention.

FIG. 10 is a simplified flow diagram illustrating a sequence of events involved in communication of a sensor event to a sensor controller and a response thereto, in accord with embodiments of the present invention. The sensor in the sensor device is monitored for a state change indicating a triggering event (1005). If a sensor state change is detected by a sensor device (1010), a data frame is assembled that includes sensor state change information and any identification information necessary (1020).

The sensor device can then determine if the network is available for transmission of the data frame (1030). Such a determination can be performed by using the sensor device transceiver to listen on the network for an idle channel. If the channel is idle, then the data frame can be transmitted. Otherwise, if the channel is not idle then the sensor device can wait a period of time and check the network again to determine if an idle channel is present and available for transmission of the data frame. It should be understood that there are numerous methods for determining channel availability on networks such as a low rate-wireless personal area network, including beacon enabled and non-beacon enabled protocols. Embodiments of the present invention are not limited to a particular method for determining network availability beyond the constraints discussed above with regard to limited power and data rate resources. As discussed above, once an available channel in the network is detected, the data frame can be transmitted (1040).

Upon receipt of the transmitted data frame, the sensor controller can send an acknowledgement packet back to the transmitting sensor device. This acknowledgement packet can be received by the sensor device (1050). In some embodiments of the present invention, a sensor device can be configured to repeat transmission of a sensor event data frame after a period of time if the acknowledgement is not received from the security controller. In this manner, transmission of sensor events can be assured. In some embodiments of the present invention, a sensor device can be programmed to take alternative action should an acknowledgement packet not be received from the sensor controller. For example, a siren output device coupled to a sensor can be triggered in the absence of receipt of an acknowledgement packet. Another type of response can be transmission of a packet to another device if the transmitting sensor device is capable of such transmission (e.g., a fully functioning device as in devices 840 and 850).

In addition to providing an acknowledgement to a sensor device, a sensor controller can also embed a data message in the acknowledgement packet. The data message can be, for example, either a command for the sensor device to take action or an instruction to expect additional information from the security controller. Subsequently, a sensor device can receive an additional data frame from the sensor controller (1060). If a data frame is received (1070), the sensor device can transmit an acknowledgement packet to the controller (1080). The controller data frame can then be processed by the sensor device processor (1090). In response to information from the controller data frame, the sensor device processor can take appropriate action (e.g., activating the sensor device output 940 or reset the sensor 930 to determine if the sensor event is still present).

Figure 11:
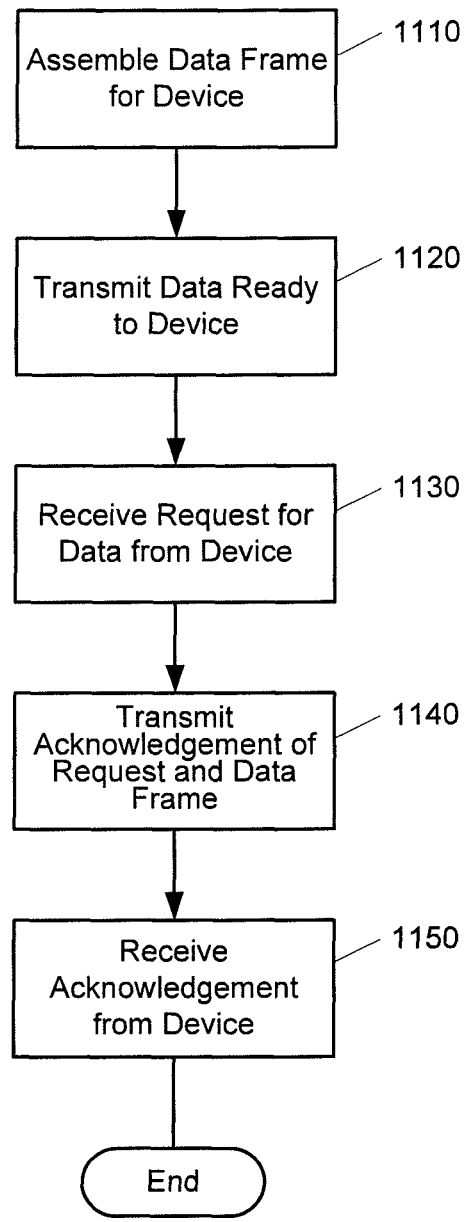
FIG. 11 is a simplified flow diagram illustrating an example of security controller communication to a sensor device, in accord with embodiments of the present invention.

FIG. 11 is a simplified flow diagram illustrating an example of sensor controller communication to a sensor device, in accord with embodiments of the present invention. As discussed above, the sensor controller can send different types of packets to sensors in the security network. The result of receipt of these packets by the sensor devices can affect, for example, a state change to trigger a sensor device output and can provide more sophisticated information such as firmware updates. The sensor controller assembles a data frame appropriate for the particular action desired to be performed by the sensor device (1110). The sensor controller can then transmit a data ready indicator to the target sensor device, if the target sensor device is constantly listening for a transmission from the sensor controller (1120). Alternatively, some sensor devices will not constantly listen for a transmission from the sensor controller, instead these sensor devices conserve power by staying in a low power state waiting for a sensor event. Such devices may only receive data frame transmissions from a sensor controller subsequent to sending a message of their own to the sensor controller. As discussed above, a sensor controller can send an acknowledgement packet with an embedded message indicating that the sensor device should prepare to receive additional data frames from the sensor controller. Typically, a battery powered sensor device will not be configured to constantly listen for a transmission from a sensor controller, while a sensor device connected to building power will be configured to constantly listen.

When the target sensor device is ready to receive data, the target sensor device can then transmit a request for data to the security controller, which is then received by the security controller (1130). In response to receiving the request for data, the security controller can acknowledge the request and transmit the assembled data frame to the target sensor device (1140). Once the data frame is received by the target sensor device, the target sensor device transmits an acknowledgement which is received by the security controller (1150). As with the transmission from the sensor device, the security controller determines prior to transmission of a data frame whether the network has an idle channel slot available to transmit the data frame. The detection method used is dependent upon the chosen protocols for the security network, and embodiments of the present invention are not limited to a particular protocol.

Provision of two-way communication enabled by embodiments of the present invention allows for a more sophisticated interaction between sensor devices and the security controller than is permitted by one-way communication. Examples of such two-way communication have been provided above. As a further example of sophisticated interaction between a remote sensor device and the security controller is in a so-called "smash and grab" scenario. A security network can be configured with not only door/window sensors but also an external siren. If a door/window sensor detects an event, then that event information is transmitted to the security controller. The security controller can then provide an initial signal to the external siren, which triggers an entry delay timer in the external siren. If the external siren fails to receive a message from the security controller by the timer expiration time, the external siren will be sounded.

Another example of functionality provided by a two-way communication environment involves the use of a key fob remote device. The security controller can be configured to arm in response to a key fob trigger. The security controller can then transmit a message back to the key fob confirming arming of the system. This message can change a state of an LED output in the key fob, thereby providing a user of the key fob with confirmation that the system became armed. A key fob and security controller can also be configured to provide status information in response to a request from the key fob. For example, an LED can flash a sequence indicating the alarm panel status or a more sophisticated output can be provided on the key fob, if desired.

Examples of embodiments of the present invention have been provided using particular configurations illustrated in Figures and terminology associated with certain communications protocols. It should be recognized that embodiments of the present invention are not limited to a particular network configuration or a specific network communication protocol.

An Example Computing and Network Environment

As shown above, the present invention can be implemented using a variety of computer systems and networks. An example of one such computing and network environment is described below with reference to FIGS. 12 and 13.

Figure 12:
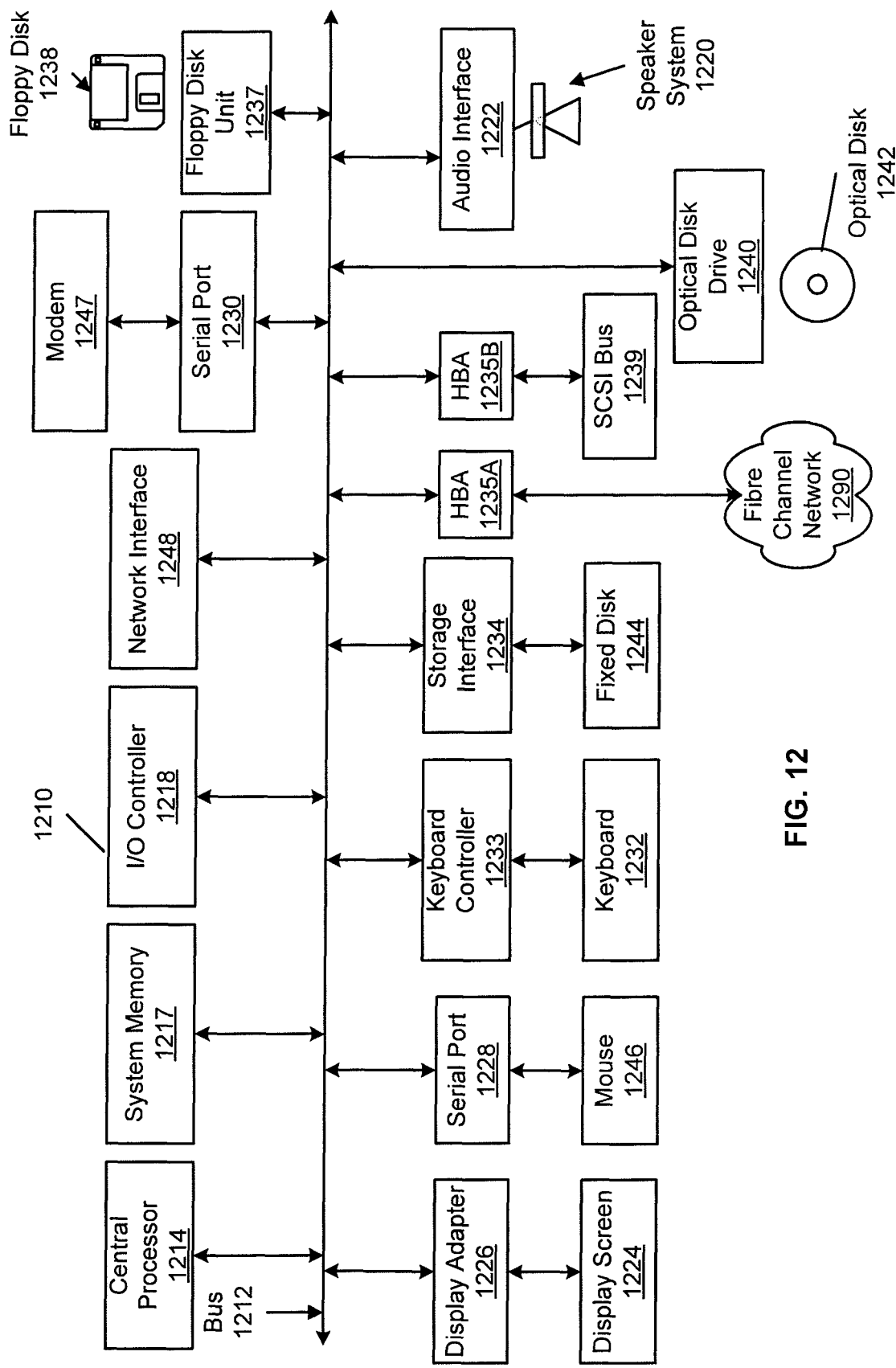
FIG. 12 depicts a block diagram of a computer system suitable for implementing aspects of the present invention.

FIG. 12 depicts a block diagram of a computer system 1210 suitable for implementing aspects of the present invention (e.g., servers 165, portal server 170, backup server 175, telephony server 180, and database server 185). Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer-readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer-readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present invention. The devices and subsystems can be interconnected in different ways from that shown in FIG. 12. The operation of a computer system such as that shown in FIG. 12 is readily known in the art and is not discussed in detail in this application. Code to implement the present invention can be stored in computer-readable storage media such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
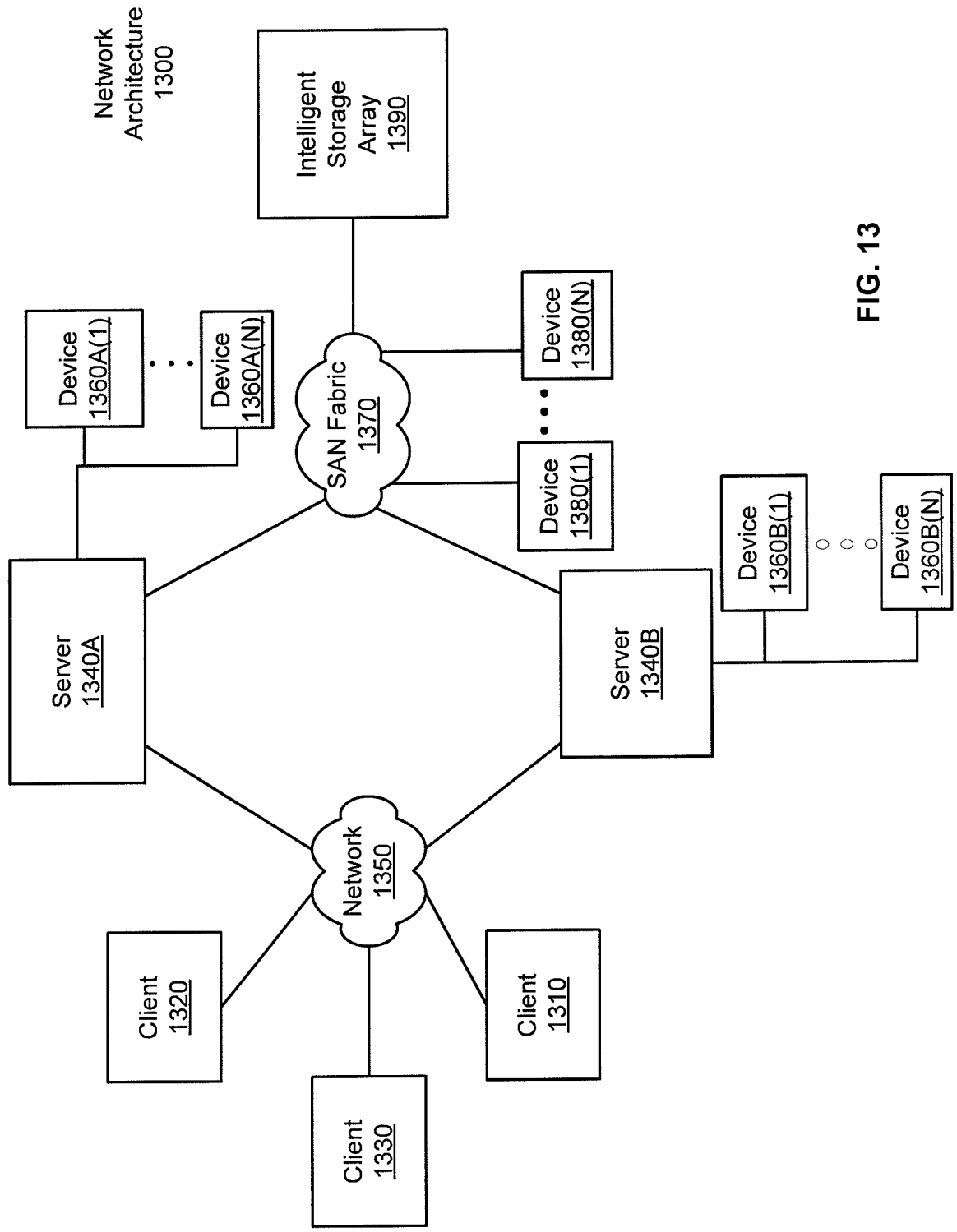
FIG. 13 is a block diagram depicting a network architecture suitable for implementing aspects of the present invention.

FIG. 13 is a block diagram depicting a network architecture 1300 in which client systems 1310, 1320 and 1330, as well as storage servers 1340A and 1340B (any of which can be implemented using computer system 1210), are coupled to a network 1350. Storage server 1340A is further depicted as having storage devices 1360A(1)-(N) directly attached, and storage server 1340B is depicted with storage devices 1360B(1)-(N) directly attached. Storage servers 1340A and 1340B are also connected to a SAN fabric 1370, although connection to a storage area network is not required for operation of the invention. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1210, modem 1247, network interface 1248 or some other method can be used to provide connectivity from each of client computer systems 1310, 1320 and 1330 to network 1350. Client systems 1310, 1320 and 1330 are able to access information on storage server 1340A or 1340B using, for example, a web browser or other client software (not shown). Such a client allows client systems 1310, 1320 and 1330 to access data hosted by storage server 1340A or 1340B or one of storage devices 1360A(1)-(N), 1360B(1)-(N), 1380(1)-(N) or intelligent storage array 1390. FIG. 13 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, and media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein. Non-transitory computer-readable media include all forms of computer-readable media except for a transitory propagating signal.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed:

1. A system comprising:
   a sensor device configured to:
      determine a premises event associated with a premises;
      send, to a sensor control device, an event signal indicative of the premises event;
      receive, from the sensor control device, one or more signals comprising a first acknowledgement that the sensor control device received the event signal and an indication to expect additional data; and
      receive, from the sensor control device, the additional data; and
   the sensor control device configured to:
      receive, from the sensor device, the event signal;
      send, based on receiving the event signal, the first acknowledgement; and
      send, to the sensor device, the additional data.

2. The system of claim 1, wherein the sensor device is configured to send the event signal based on receiving a request.

3. The system of claim 1, wherein the event signal comprises a data frame.

4. The system of claim 1, wherein the sensor device is configured to determine whether the premises event is still active.

5. The system of claim 1, wherein the sensor device is configured to send, based on receiving the first acknowledgment, one or more signals comprising a second acknowledgement, wherein the second acknowledgment comprises an acknowledgement that the sensor device received the first acknowledgement.

6. The system of claim 5, wherein the sensor control device is configured to:
   receive the second acknowledgement;
   determine the additional data based on receiving the second acknowledgement; and
   send the additional data.

7. The system of claim 1, wherein the sensor device is configured to:
   determine, in a first mode, the premises event;
   based on the premises event, switch to a second mode, wherein the second mode is different than the first mode; and
   send, in the second mode, the event signal.

8. A method comprising:
   determining, by a sensor device, a premises event at a premises;
   sending, to a sensor control device, an event signal indicative of the premises event;
   receiving, from the sensor control device, one or more signals comprising a first acknowledgement, wherein the first acknowledgement comprises an acknowledgement that the sensor control device received the event signal and an indication to expect additional data; and
   receiving, from the sensor control device the additional data.

9. The method of claim 8, wherein the method further comprises determining whether the premises event is still active.

10. The method of claim 8, wherein the additional data is configured to cause the sensor device to store firmware instructions in a memory of the sensor device.

11. The method of claim 8, wherein the indication to expect additional data comprises an indication for the sensor device to enter a data ready state, wherein the data ready state enables the sensor device to receive the additional data.

12. The method of claim 8, wherein the additional data comprises an indication to trigger an output of the sensor device, wherein the output comprises at least one of a light, an audio output, a display panel, or a home automation device.

13. The method of claim 8, wherein the sensor control device comprises a touchscreen.

14. A sensor device comprising:
   one or more processors; and
   memory storing instructions that, when executed by the one or more processors, cause the sensor device to:
      determine a premises event at a premises; and
      send, to a sensor control device, an event signal indicative of the premises event;
      receive, from the sensor control device, one or more signals comprising a first acknowledgement, wherein the first acknowledgement comprises an acknowledgement that the sensor control device received the event signal and an indication to expect additional data; and
      receive, from the sensor control device the additional data.

15. The sensor device of claim 14, wherein the instructions, when executed by the one or more processors, further cause the sensor device to perform an output operation based on receiving the additional data.

16. The sensor device of claim 14, wherein the additional data comprises an update configured to modify a configuration of the sensor device; and
   wherein the instructions, when executed by the one or more processors, further cause the sensor device to modify, based on receiving the additional data, the configuration of the sensor device.

17. The sensor device of claim 14, wherein the sensor device comprises at least one of a motion sensor, a smoke sensor, a fire sensor, a door sensor, or a window sensor.

18. The sensor device of claim 14, wherein the indication to expect additional data comprises an indication to operate in a data ready state; and
   wherein the instructions, when executed by the one or more processors, enable the sensor device to receive data when the sensor device is in the data ready state.

19. The sensor device of claim 14, wherein the additional data comprises an indication for the sensor device to send, to the sensor control device, one or more signals comprising a second acknowledgment, wherein the second acknowledgment comprises an acknowledgment of receipt of the first acknowledgement.

20. A control device comprising:
   one or more processors; and
   memory storing instructions that, when executed by the one or more processors, cause the control device to:
      receive, from a sensor device, an event signal indicative of a premises event associated with a premises;
      send, based on receiving the event signal and to the sensor device, a first acknowledgement that the event signal was received and an indication to expect additional data; and
      send, to the sensor device, the additional data.

21. The control device of claim 20, wherein the additional data comprises an indication for the sensor device to send, to the sensor control device, one or more signals comprising a second acknowledgment, wherein the second acknowledgment comprises an acknowledgment of receipt of the first acknowledgement.

22. The control device of claim 21, wherein the instructions, when executed by the one or more processors, further cause the control device to:
   receive, from the sensor device, the second acknowledgement; and
   determine the additional data based on receiving the second acknowledgement.

23. A method comprising:
   receiving, by a control device and from a sensor device, an event signal indicative of a premises event associated with a premises;
   sending, by the control device and based on receiving the event signal and to the sensor device, a first acknowledgement that the event signal was received and an indication to expect additional data; and
   sending, by the control device and to the sensor device, the additional data.

24. The method of claim 23, wherein the event signal comprises a data frame.

25. The method of claim 23, wherein the additional data comprises an indication for the sensor device to send, to the sensor control device, one or more signals comprising a second acknowledgment, wherein the second acknowledgment comprises an acknowledgment of receipt of the first acknowledgement.

26. The method of claim 25, further comprising:
   receiving, by the control device and from the sensor device, the second acknowledgement; and
   determining the additional data based on receiving the second acknowledgement.

27. A non-transitory computer-readable medium storing instructions that, when executed, cause:
   receiving, by a control device and from a sensor device, an event signal indicative of a premises event associated with a premises;
   sending, by the control device and based on receiving the event signal and to the sensor device, a first acknowledgement that the event signal was received and an indication to expect additional data; and sending, by the control device and to the sensor device, the additional data.

28. The non-transitory computer-readable medium of claim 27, wherein the event signal comprises a data frame.

29. The non-transitory computer-readable medium of claim 27, wherein the additional data comprises an indication for the sensor device to send, to the sensor control device, one or more signals comprising a second acknowledgment, wherein the second acknowledgment comprises an acknowledgment of receipt of the first acknowledgement.

30. The non-transitory computer-readable medium of claim 29, wherein the instructions, when executed, further cause:

receiving, by the control device and from the sensor device, the second acknowledgement; and determining, by the control device, the additional data based on receiving the second acknowledgement.

31. A non-transitory computer-readable medium storing instructions that, when executed, cause:

determining, by a sensor device, a premises event at a premises;

sending, to a sensor control device, an event signal indicative of the premises event;

receiving, from the sensor control device, one or more signals comprising a first acknowledgement, wherein the first acknowledgement comprises an acknowledgement that the sensor control device received the event signal and an indication to expect additional data; and receiving, from the sensor control device the additional data.

32. The non-transitory computer-readable medium of claim 31, wherein the method further comprises determining whether the premises event is still active.

33. The non-transitory computer-readable medium of claim 31, wherein the additional data is configured to cause the sensor device to store firmware instructions in a memory of the sensor device.

34. The non-transitory computer-readable medium of claim 31, wherein the indication to expect additional data comprises an indication for the sensor device to enter a data ready state, wherein the data ready state enables the sensor device to receive the additional data.

35. The non-transitory computer-readable medium of claim 31, wherein the additional data comprises an indication to trigger an output of the sensor device, wherein the output comprises at least one of a light, an audio output, a display panel, or a home automation device.

36. The non-transitory computer-readable medium of claim 31, wherein the sensor control device comprises a touchscreen.

* * * * *